(12) United States Patent
Rufitskiy et al.

(10) Patent No.: US 12,395,670 B2
(45) Date of Patent: Aug. 19, 2025

(54) METHOD AND APPARATUS FOR AFFINE BASED INTER PREDICTION OF CHROMA SUBBLOCKS

(71) Applicant: HUAWEI TECHNOLOGIES CO., LTD., Guangdong (CN)

(72) Inventors: Vasily Alexeevich Rufitskiy, Moscow (RU); Timofey Mikhailovich Solovyev, Munich (DE); Alexey Konstantinovich Filippov, Moscow (RU); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/427,975

(22) Filed: Jan. 31, 2024

(65) Prior Publication Data

US 2024/0187634 A1 Jun. 6, 2024

Related U.S. Application Data

(63) Continuation of application No. 17/407,548, filed on Aug. 20, 2021, now Pat. No. 11,924,457, which is a
(Continued)

(51) Int. Cl.
*H04N 19/513* (2014.01)
*H04N 19/159* (2014.01)
(Continued)

(52) U.S. Cl.
CPC ......... *H04N 19/513* (2014.11); *H04N 19/159* (2014.11); *H04N 19/176* (2014.11); *H04N 19/186* (2014.11); *H04N 19/30* (2014.11)

(58) Field of Classification Search
CPC .... H04N 19/176; H04N 19/70; H04N 19/105; H04N 19/52; H04N 19/159;
(Continued)

(56) References Cited

U.S. PATENT DOCUMENTS 9,743,091 B2    8/2017 Kim et al.
2017/0105014 A1    4/2017 Lee et al.
(Continued)

FOREIGN PATENT DOCUMENTS

CA    3025490 A1    12/2017
CN    104885463 A    9/2015
(Continued)

OTHER PUBLICATIONS

Liu et al. "Versatile Video Coding (Draft 6)" Joint Video Experts Team (JVET) of ITU-T SG 16 WP 3 and ISO/IEC JTC 1/SC 29/WG 1115th Meeting: Gothenburg, SE, Jul. 3-12, 2019, Document: JVET-O2001-vE, 455 Pages.*

(Continued)

*Primary Examiner* — Nathnael Aynalem

(57) ABSTRACT

The present invention relates to method and apparatus for motion vector derivation for affine based inter prediction of chroma subblocks based on chroma format. The method includes: determining chroma scaling factors in horizontal and vertical directions based on chroma format information, wherein the chroma format information indicates a chroma format of a current picture which the current image block belongs to; determining a set (S) of luma subblocks of the luma block based on values of the chroma scaling factors; determining a motion vector for a chroma subblock of the chroma block based on motion vectors of one or more luma subblocks in the set (S) of luma subblocks.

22 Claims, 32 Drawing Sheets

Related U.S. Application Data continuation of application No. PCT/CN2020/076493, filed on Feb. 24, 2020.

(60) Provisional application No. 62/824,302, filed on Mar. 26, 2019, provisional application No. 62/823,653, filed on Mar. 25, 2019, provisional application No. 62/809,551, filed on Feb. 22, 2019.

(51) Int. Cl.
  *H04N 19/176* (2014.01)
  *H04N 19/186* (2014.01)
  *H04N 19/30* (2014.01)

(58) Field of Classification Search
  CPC .. H04N 19/186; H04N 19/593; H04N 19/137; H04N 19/17; H04N 19/96; H04N 19/577; H04N 19/11; H04N 19/50; H04N 19/543; H04N 19/573; H04N 19/103; H04N 19/172; H04N 19/513; H04N 19/61; H04N 19/55; H04N 19/517; H04N 19/05; H04N 19/51
  USPC ............................................ 375/240–240.29
  See application file for complete search history.

(56) References Cited

U.S. PATENT DOCUMENTS

| | | | |
|---|---|---|---|
| 2017/0374384 A1 | 12/2017 | Xiu et al. | |
| 2018/0205946 A1 | 7/2018 | Zhang et al. | |
| 2020/0382795 A1* | 12/2020 | Zhang | H04N 19/537 |
| 2021/0152816 A1* | 5/2021 | Zhang | H04N 19/159 |
| 2021/0409753 A1 | 12/2021 | Rufitskiy et al. | |

FOREIGN PATENT DOCUMENTS

| | | |
|---|---|---|
| CN | 107211147 A | 9/2017 |
| CN | 109076210 A | 12/2018 |
| CN | 113412624 A | 9/2021 |
| EP | 3884675 A1 | 9/2021 |
| JP | 7332703 B2 | 8/2020 |
| JP | 2022515754 A | 2/2022 |
| RU | 2654525 C1 | 5/2018 |
| WO | 2017143467 A1 | 8/2017 |
| WO | 2020131583 A1 | 6/2020 |

OTHER PUBLICATIONS

Document: JVET-M0192_WD, Anish Tamse et al., CE2-related: MV Derivation for Affine Chroma, Joint Video Experts Team (JVET) of ITU-T SG 16 WP 3 and ISO/IEC JTC 1/SC 29/WG 11, 13th Meeting: Marrakech, MA, Jan. 9-18, 2019, total 8 pages.
ITU-T H.264 (Apr. 2017), Series H: Audiovisual and Multimedia Systems, Infrastructure of audiovisual services—Coding of moving video, Advanced video coding for generic audiovisual services, total 812 pages.
ITU-T H.265 (Feb. 2018), Series H: Audiovisual and Multimedia Systems Infrastructure of audiovisual services—Coding of moving video, High efficiency video coding, total 692 pages.
International Search Report and Written Opinion issued in PCT/CN2020/076493, dated Apr. 28, 2020, 11 pages.
Y-W Chen (Kwai) et al: "CE2-related: Affine mode simplifications", 13. JVET Meeting; Jan. 9, 2019-Jan. 18, 2019; Marrakech; (The Joint Video Exploration Team of 1S0/IEC JTC1/SC29/WG11 and ITU-T SG.16), No. JVET-M0228 Jan. 13, 2019 (Jan. 13, 2019), XP030201914, 15 pages.
Bross B et al: "Versatile Video Coding (Draft 4)", 13. JVET Meeting; Jan. 9, 2019-Jan. 18, 2019; Marrakech; (The Joint Video Exploration Team of ISO/IEC JTC1/SC29/WG11 and ITU-T SG. 16), No. JVET-M1001 Feb. 19, 2019 (Feb. 19, 2019), XP030202591, 252 pages.
Extended European Search Report issued in EP20759795.6, dated Jun. 1, 2022, 11 pages.
Wang Shuhui, Design and Implementation for Chroma Extensions Video Coding Based on AVS2 Platform, Journal of Electronics and Information Technology, Dec. 2018, with an English abstract total 9 pages.
JVET-M0228, Yi-Wen Chen, CE2-related: Affine mode modifications, Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.
Office Action issued in CN202080016147.3, dated Nov. 30, 2022, 6 pages.
Benjamin Bross et al.,"Versatile Video Coding (Draft 4)", Joint Video Experts Team (JVET) of ITU-T SG 16 WP 3 and ISO/IEC JTC 1/SC 29/WG 11,13th Meeting: Marrakech, MA, Jan. 9-18, 2019, JVET-M1001-v7, total: 304 pages.
Alexey Filippov et al.,"Support of 4:4:4 and 4:2:2 chroma formats in VVC", Joint Video Experts Team (JVET) of ITU-T SG 16 WP 3 and ISO/IEC JTC 1/SC 29/WG 11,14th Meeting: Geneva, CH, Mar. 19-27, 2019, total: JVET-N0671-v4, total: 7 pages.
Communication pursuant to Article 94(3) EPC issued in EP20759795.6, dated Feb. 13, 2023, 5 pages.
Bross, B. et al., "Versatile Video Coding (Draft 4)", 13. JVET Meeting; Jan. 9, 2019-2019018; Marrakech; (The Joint Video Exploration Team of ISO/IEC JTC1/SC29/WG11 and ITU-T SG. 16), No. JVET-M1001, Feb. 19, 2019 (Feb. 19, 2019), pp. 1-254, Oct. 25, 2022 (Oct. 25, 2022) 3,131,028 2 Retrieved from the Internet: URL: https://jvet-experts.org/doc_end_user/documents/13_Marrakech/wg11/JVET-M1001-v4.zip JVET-M1001-v3.docx [retrieved on Oct. 6, 2022].
Tamse, A. et al., "CE2-related: MV Derivation for Affine Chroma", 13. JVET Meeting; Jan. 9, 2019-Jan. 18, 2019; Marrakech; (The Joint Video Exploration Team of ISO/IEC JTC1/SC29/WG11 and ITU-T SG. 16), No. JVET-M0192, Jan. 13, 2019 (Jan. 13, 2019), pp. 1-10, Retrieved from the Internet: URL: https://jvet-experts.org/doc_end_user/documents/13_Marrakech/wg11/JVET-M0192-v4.zip JVET-M0192_WD-r1.docx [retrieved on Oct. 6, 2022.
Canada Office Action issued in CN3131028, dated Oct. 25, 2022, 9 pages.
Wang, Suhong et al., Simplification of MV Derivation for Affine Chroma, Joint Video Experts Team (JVET) of ITU-T SG 16 WP 3 and ISO/IEC JTC 1/SC 29/WG 11 17th Meeting: Brussels, BE, Jan. 7-17, 2020, [JVET-Q0324-v1], JVET-Q0324 (version 1), ITU-T, Dec. 31, 2019, URL:https://jvet-experts.org/doc_end_user/documents/17_Brussels/wg11/JVET-Q0324-v1.zip>: JVET-Q0324-v1.docx: pp. 1-10.
Tamse, Anish and Park, Min Woo, Proposed WD for CE2-related: MV Derivation for Affine Chroma, Joint Video Experts Team (JVET) of ITU-T SG 16 WP 3 and ISO/IEC JTC 1/SC 29/WG 11 13th Meeting: Marrakech, MA, Jan. 9-18, 2019, [JVET-M0192_WD], JVET-M0192 (version 4), ITU-T, Jan. 13, 2019 URL:http://jvet-experts.org/doc_end_user/documents/13_Marrakech/wg11/JVET-M0192-v4.zip>: JVET-M0192-v1.docx: pp. 1-5, JVET-M0192_WD-r1.docx: pp. 1-8.
Office Action issued in JP2021-549409, dated Jan. 4, 2023 with English translation, 10 pages.
Office Action issued in RU2021127615, dated Jul. 7, 2023 with English translation, 16 pages.
Search Report issued in RU2021127615, dated Jul. 6, 2023 with English translation, 6 pages.
Bross et al. Joint Video Expert s Team (JVET) of ITU-T SG 16 WP 3 and ISO/IEC JTC 1/SC 29/WG 11 13th Meeting: Marrakech, MA, Jan. 9-18, 2019, Document: JVET-M1001-v3, 254 Pages. (Year: 2019).
Benjamin Bross et al:"Versatile Video Coding (Draft 5)." Document: JVET-N1001-v9 Joint Video Experts Team (JVET) of ITU-T SG 16 WP 3 and ISO/IEC JTC 1/SC 29/WG 11 14th Meeting: Geneva, CH, Mar. 19-27, 2019. total 405 pages.
Notice of Allowance issued in JP2023-130773, dated Dec. 3, 2024, 4 pages.

(56) References Cited

OTHER PUBLICATIONS

Benjamin Bross, et al., "Versatile Video Coding (Draft 4)", JVET-M1001-v2, Joint Video Experts Team (JVET) of ITU-T SG 16 WP 3 and ISO/IEC JTC 1/SC 29/WG 11, JVET-N0165 (version 5), Mar. 21, 2019, total 17 pages.

Office Action issued in JP2023-130773, dated Jun. 25, 2024, with English translation, 12 pages.

\* cited by examiner

FIG. 14C

METHOD AND APPARATUS FOR AFFINE BASED INTER PREDICTION OF CHROMA SUBBLOCKS

CROSS-REFERENCE TO RELATED APPLICATIONS

This application is a continuation of U.S. patent application Ser. No. 17/407,548, filed on Aug. 20, 2021, which is a continuation of International Application No. PCT/CN2020/076493, filed on Feb. 24, 2020, which claims the priority to U.S. Provisional Patent Application No. 62/809,551, filed Feb. 22, 2019 and Patent Application No. 62/823,653, filed Mar. 25, 2019 and Patent Application No. 62/824,302, filed Mar. 26, 2019. All of the aforementioned patent applications are hereby incorporated by reference in their entireties.

TECHNICAL FIELD

Embodiments of the present disclosure generally relate to the field of picture processing and more particularly to affine based inter prediction (affine motion compensation), in particular, method and apparatus for motion vector derivation for affine based inter prediction of chroma subblocks based on chroma format, and method and apparatus for affine based inter prediction of chroma subblocks.

BACKGROUND

Video coding (video encoding and/or decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands for higher video quality, improved compression and decompression techniques with a higher compression ratio and little to no sacrifice in picture quality are desirable.

Particularly, the current Versatile Video Coding and Test Model (VTM) coder mainly supports chroma format 4:2:0 as the input picture format. The VTM coder crash may happen when the input chroma format becomes 4:4:4. To avoid such an issue, a coder that supports other chroma formats (such as, 4:4:4 or 4:2:2) is highly desirable and even mandatory for a wide variety of applications.

SUMMARY

In view of the above-mentioned challenges, a modification to video coding process to support multiple chroma formats is proposed in the present disclosure. In particular, embodiments of the present application aim to provide an apparatus, an encoder, a decoder and corresponding methods for motion vector derivation for affine based inter prediction of chroma subblocks based on a chroma format, that may be one of multiple supported chroma formats, so as to improve coding performance.

Embodiments of the invention are defined by the features of the independent claims, and further advantageous implementations of the embodiments by the features of the dependent claims.

Particular embodiments are outlined in the attached independent claims, with other embodiments in the dependent claims.

The foregoing and other objects are achieved by the subject matter of the independent claims. Further implementation forms are apparent from the dependent claims, the description and the figures.

According to a first aspect of the present disclosure, it is provided a method of chroma motion vector derivation used in affine based inter prediction of a current image block comprises a luma block and a co-located chroma block, the method comprising determining chroma scaling factors (i.e. the value of the chroma scaling factors) in horizontal and vertical directions based on chroma format information, wherein the chroma format information indicates a chroma format of a current picture which the current image block belongs to; determining a set (S) of luma subblocks of the luma block based on values of the chroma scaling factors; and determining a motion vector for a chroma subblock of the chroma block based on motion vectors of one or more luma subblocks (e.g. one or two luma subblocks) in the set (S) of luma subblocks.

In the presented disclosure, because a (luma or chroma) block or subblock can be represented by its location, position or index, selecting/determining a block or subblock implies that the position or location or the index of the block or subblock is selected or determined.

It is noted that the term "block", "coding block" or "image block" used in the present disclosure can represent a transform units (TU), a prediction unit (PU), a coding unit (CU) etc. In Versatile Video Coding (VVC), transform units and coding units are generally aligned with each other except when TU tiling or sub block transform (SBT) is used. As such, the terms "block," "image block," "coding block," and "transform block" may be used interchangeably in the present disclosure; and the terms "block size," and "transform block size" may be used interchangeably in the present disclosure. The terms "sample" and "pixel" may also be used interchangeably in the present disclosure.

The present disclosure is directed to a method to consider the chroma format of the picture when obtaining chroma motion vectors from luma motion vectors. By taking an average of luma motion vectors, linear subsampling of luma motion field is performed. When chroma color planes have the same height as the luma plane, it is found more appropriate to select motion vectors from luma blocks that are horizontally adjacent, so that they have the same vertical position. Selecting luma motion vectors depending on the picture chroma format leads to a more accurate chroma motion field due to a more accurate luma motion vector field subsampling. This dependency on chroma format enables the selection of the most appropriate luma blocks when averaging luma motion vectors to generate the chroma motion vector. As a consequence of a more accurate motion field interpolation, prediction error is reduced, which leads to a technical result of a compression performance improvement, thus coding performance is improved.

In a possible implementation form of the method according to the first aspect, the set (S) of luma subblocks is determined based on values of the chroma scaling factors in horizontal and vertical directions; That is, the one or more luma subblocks (such as, one or two luma subblocks) are determined based on values of the chroma scaling factors in horizontal and vertical directions.

In a possible implementation form of the method according to the first aspect, the chroma scaling factors in horizontal and vertical directions are represented by the variables SubWidthC and SubHeightC.

In a possible implementation form of the method according to the first aspect, a position of each of the luma subblocks is represented by a subblock index in a horizontal direction and a subblock index in a vertical direction, and a position of each of the chroma subblocks is represented by a subblock index in the horizontal direction and a subblock index in the vertical direction.

In a possible implementation form of the method according to the first aspect, the positions of each of the one or more luma subblocks (such as one or two luma subblocks) in the set(S) is represented by a subblock index in a horizontal direction and a subblock index in a vertical direction.

In a possible implementation form of the method according to any preceding implementation of the first aspect or the first aspect as such, if both the variables SubWidthC and SubHeightC are equal to 1, the set of luma subblocks (S) comprises:
a luma subblock indexed by $S_0$=(xSbIdx, ySbIdx);
if at least one of SubWidthC and SubHeightC is not equal to 1, the set of luma subblocks (S) comprises:
a first luma subblock indexed by $S_0$=

$((x\text{SbIdx}>>(\text{SubWidth}C-1)<<(\text{SubWidth}C-1)),$ $(y\text{SbIdx}>>(\text{SubHeight}C-1)<<(\text{SubHeight}C-1))),$ and a second luma subblock indexed by $S_1$=

$((x\text{SbIdx}>>(\text{SubWidth}C-1)<<(\text{SubWidth}C-1))+(\text{SubWidth}C-1),$ $(y\text{SbIdx}>>(\text{SubHeight}C-1)<<(\text{SubHeight}C-1))+(\text{SubHeight}C-1))$ wherein SubWidthC and SubHeightC represent the respectively chroma scaling factors in horizontal and vertical directions;
xSbIdx and ySbIdx represent a subblock index in the horizontal direction and a subblock index in the vertical direction for a luma subblock in the set (S), respectively; "<<" represents a left arithmetic shift and ">>" represents a right arithmetic shift; and xSbIdx=0 . . . numSbX−1 and ySbIdx=0 . . . numSbY−1, and numSbX indicates the number of the luma subblocks in the luma block along the horizontal direction and numSbY indicates the number of the luma subblocks in the luma block along the vertical direction.

In a possible implementation form of the method according to any preceding implementation of the first aspect or the first aspect as such, the numbers of the chroma subblocks in horizontal and vertical directions are the same as the numbers of the luma subblocks in horizontal and vertical directions, respectively.

In a possible implementation form of the method according to any preceding implementation of the first aspect or the first aspect as such, wherein if both SubWidthC and SubHeightC are equal to 1, the set of luma subblocks (S) comprises:
a luma subblock indexed by $S_0$=(xCSbIdx, yCSbIdx);
if at least one of SubWidthC and SubHeightC is not equal to 1, the set of luma subblocks (S) comprises:
a first luma subblock indexed by $S_0$=

$((x\text{CSbIdx}>>(\text{SubWidth}C-1)<<(\text{SubWidth}C-1)),$ $(y\text{CSbIdx}>>(\text{SubHeight}C-1)<<(\text{SubHeight}C-1))),$ and a second luma subblock indexed by $S_1$=

$(x\text{CSbIdx}>>(\text{SubWidth}C-1)<<(\text{SubWidth}C-1))+(\text{SubWidth}C-1),$ $(y\text{CSbIdx}>>(\text{SubHeight}C-1)<<(\text{SubHeight}C-1))+(\text{SubHeight}C-1))$ wherein the variables SubWidthC and SubHeightC represent respectively the chroma scaling factors in horizontal and vertical directions; xCSbIdx and yCSbIdx represent a subblock index in horizontal direction and a subblock index in vertical direction, respectively, for a luma subblock in the set (S); and xCSbIdx=0 . . . numCSbX−1 and yCSbIdx=0 . . . numCSbY−1, and numCSbX indicates the number of the chroma subblocks in the chroma block along the horizontal direction and numCSbY indicates the number of the chroma subblocks in the chroma block along the vertical direction.

In a possible implementation form of the method according to any preceding implementation of the first aspect or the first aspect as such, wherein a size of each of the chroma subblocks is the same as a size of each of the luma subblocks. It is allowed that when a number of chroma subblocks is defined to be equal to the number of luma subblocks, and when a chroma color plane size is equal to luma plane size (such as the chroma format of the input picture being 4:4:4), motion vectors of adjacent chroma subblocks may assume the same value. When implementing this processing step, an optimization could be performed by skipping the repeated values calculation step.

The proposed invention discloses a method to define a size of chroma subblock equal to a size of luma subblock. In this case, implementation could be simplified by unifying luma and chroma processing, and redundant motion vector calculations are naturally avoided.

In a possible implementation form of the method according to any preceding implementation of the first aspect or the first aspect as such, in the case that a size of each of the chroma subblocks is the same as a size of each of the luma subblocks, the number of chroma subblocks in the horizontal direction depends on the number of the luma subblocks in the horizontal direction and the value of the chroma scaling factor in the horizontal direction;
the number of chroma subblocks in vertical direction depends on the number of the luma subblocks in the vertical direction and the value of the chroma scaling factor in the vertical direction.

In a possible implementation form of the method according to any preceding implementation of the first aspect or the first aspect as such, xCSbIdx is obtained based on xSbIdx and a step value of SubWidth; and yCSbIdx is obtained based on ySbIdx and a step value of SubHeightC.

In a possible implementation form of the method according to any preceding implementation of the first aspect or the first aspect as such, $$numCSbX = numSbX >> (SubWidthC-1)$$

$$numCSbY = numSbY >> (SubHeightC-1);$$

numCSbX and numCSbY represent the number of chroma subblocks in horizontal and vertical directions, respectively; and numSbX and numSbY represent the number of the luma subblocks in the luma block in horizontal and vertical directions, respectively.

In a possible implementation form of the method according to any preceding implementation of the first aspect or the first aspect as such, for the chroma block, the set of luma subblocks (S) comprises one or more of subblocks indexed by:

$$S_0 = (xSbIdxL, ySbIdxL),$$

$$S_1 = (xSbIdxL, ySbIdxL+(SubHeightC-1)),$$

$$S_2 = (xSbIdxL+(SubWidthC-1), ySbIdxL), \text{ or}$$

$$S_3 = (xSbIdxL+(SubWidthC-1), ySbIdxL+(SubHeightC-1)).$$

wherein the luma block position or index $S_0$ is represented by a subblock index xSbIdxL in the horizontal direction and a subblock index ySbIdxL in the vertical direction;

for the chroma block position (such as [xSbIdxL][ySbIdxL] in mvCLX[xSbIdxL][ySbIdxL], the luma block position or index $S_1$ is represented by a subblock index in the horizontal direction, xSbIdxL, and a subblock index in the vertical direction, ySbIdxL+(SubHeightC-1);

the luma block position or index $S_2$ is represented by a subblock index in the horizontal direction, xSbIdxL+(SubWidthC-1), and a subblock index in the vertical direction, ySbIdxL;

the luma block position or index $S_3$ is represented by a subblock index in the horizontal direction, xSbIdxL+(SubWidthC-1), and a subblock index in vertical direction, ySbIdxL+(SubHeightC-1).

In a possible implementation form of the method according to any preceding implementation of the first aspect or the first aspect as such, wherein the set of luma subblocks (S) comprises two luma subblocks indexed by:

$$S_0 = (xSbIdxL, ySbIdxL), \text{ and}$$

$$S_1 = (xSbIdxL+(SubWidthC-1), ySbIdxL+(SubHeightC-1)).$$

wherein the luma block position or index $S_0$ is represented by a subblock index xSbIdxL in the horizontal direction and a subblock index ySbIdxL in the vertical direction;

the luma block position or index $S_1$ is represented by a subblock index in the horizontal direction, xSbIdxL+(SubWidthC-1), and a subblock index in the vertical direction, ySbIdxL+(SubHeightC-1).

In a possible implementation form of the method according to any preceding implementation of the first aspect or the first aspect as such, wherein in the case that the chroma format is 4:4:4, the set (S) comprise (consist of) one luma subblock which is co-located with the chroma subblock;

wherein in the case that the chroma format is 4:2:2, the set (S) comprise two luma subblocks which are horizontally adjacent;

wherein in the case that the chroma format is 4:2:0, the set (S) comprise two luma subblocks which are diagonal.

In a possible implementation form of the method according to any preceding implementation of the first aspect or the first aspect as such, wherein if there are more than one luma subblock in the set (S), the determining a motion vector for the chroma subblock based on the motion vector of at least one luma subblock in a set (S) of luma subblocks, comprises:

averaging of motion vectors of the luma subblocks in the set S; and deriving the motion vector for the chroma subblock based on the average luma motion vector.

In a possible implementation form of the method according to any preceding implementation of the first aspect or the first aspect as such, averaging of motion vectors of the luma subblocks in the set S comprise:

averaging of horizontal components of the motion vectors of the luma subblocks in the set S; and/or, averaging of vertical components of the motion vectors of the luma subblocks in the set S.

In a possible implementation form of the method according to any preceding implementation of the first aspect or the first aspect as such, wherein the averaging of motion vectors of the luma subblocks in the set S comprise checking whether a sum of motion vectors of the luma subblocks in the set S is greater than or equal to 0.

In a possible implementation form of the method according to any preceding implementation of the first aspect or the first aspect as such, wherein the averaging of motion vectors of the luma subblocks in the set S comprises:

$$\Sigma_i mvLX[S_i^x][S_i^y]S_i^xS_i^y mvLX[S_i^x][S_i^y]S_i^xS_i^y mvAvgLX =$$

$$\Sigma_i mvLX[S_i^x][S_i^y]S_i^xS_i^y mvLX[S_i^x][S_i^y]S_i^xS_i^y \text{ if } mvAvgLX[0] \text{ is greater than or equal to 0 then}$$

$$\Sigma_i mvLX[S_i^x][S_i^y]S_i^xS_i^y mvLX[S_i^x][S_i^y]S_i^xS_i^y mvAvgLX[0] = (mvAvgLX[0]+(N>>1)-1)>>\log 2(N), \text{otherwise,}$$

$$\Sigma_i mvLX[S_i^x][S_i^y]S_i^xS_i^y mvLX[S_i^x][S_i^y]S_i^xS_i^y mvAvgLX[0] = -((-mvAvgLX[0]+(N>>1)-1)>>\log 2(N))$$

$$\Sigma_i mvLX[S_i^x][S_i^y]S_i^xS_i^y mvLX[S_i^x][S_i^y]S_i^xS_i^y \text{ if } mvAvgLX[1] \text{ is greater than or equal to 0 then}$$

$$\Sigma_i mvLX[S_i^x][S_i^y]S_i^xS_i^y mvLX[S_i^x][S_i^y]S_i^xS_i^y mvAvgLX[1] = (mvAvgLX[1]+(N>>1)-1)>>\log 2(N), \text{otherwise,}$$

$$\Sigma_i mvLX[S_i^x][S_i^y]S_i^xS_i^y mvLX[S_i^x][S_i^y]S_i^xS_i^y mvAvgLX[1] = -((-mvAvgLX[1]+(N>>1)-1)>>\log 2(N)),$$

$\Sigma_i mvLX[S_i^x][S_i^y] S_i^xS_i^y mvLX[S_i^x][S_i^y]S_i^xS_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in the set of luma subblocks (S) in a motion vector array, is a motion vector of luma subblock with indices and, N is a number of elements (e.g. luma subblocks) in the set of luma subblocks (S), log 2(N) represents the logarithm of N to the base 2 and is the power to which the number 2 is raised to obtain the value N and ">>" is a right arithmetic shift.

In a possible implementation form of the method according to any preceding implementation of the first aspect or the first aspect as such, N is equal to 2.

In a possible implementation form of the method according to any preceding implementation of the first aspect or the first aspect as such, the averaging of motion vectors of the luma subblocks in the set S comprises:

$$mvAvgLX = mvLX[(xSbIdx >> (SubWidthC-1)) << (SubWidthC-1))]$$

$$[(ySbIdx >> (SubHeightC-1)) << (SubHeightC-1))] +$$

$$mvLX[(xSbIdx >> (SubWidthC-1)) << (SubWidthC-1)) + (SubWidthC-1)]$$

$$[(ySbIdx >> (SubHeightC-1)) << (SubHeightC-1)) + (SubHeightC-1)]$$

if mvAvgLX[0] >= 0 then $$mvAvgLX[0] = (mvAvgLX[0] + 1 - (mvAvgLX[0] >= 0)) >> 1$$

if mvAvgLX[1] >= 0 then $$mvAvgLX[1] = (mvAvgLX[1] + 1 - (mvAvgLX[1] >= 0)) >> 1$$

wherein mvAvgLX[0] is a horizontal component of the averaged motion vector mvAvgLX, mvAvgLX[1] is a vertical component of the averaged motion vector mvAvgLX; wherein SubWidthC and SubHeightC represent the chroma scaling factors in horizontal and vertical directions respectively; xSbIdx and ySbIdx represent a subblock index in horizontal direction and vertical direction, respectively, for a luma subblock in the set (S), "<<" is a left arithmetic shift and ">>" is a right arithmetic shift.

In a possible implementation form of the method according to any preceding implementation of the first aspect or the first aspect as such, if Case 1: mvAvgLX[0]>=0, then the value for "(mvAvgLX[0]>=0)"=1; if case2: mvAvgLX[0]<0, then the value for "(mvAvgLX[0]>=0)"=0;

In a possible implementation form of the method according to any preceding implementation of the first aspect or the first aspect as such, the averaging of motion vectors of the luma subblocks in the set S comprises
when the sum of motion vectors of the luma subblocks in the set S is greater than or equal to 0, the sum of motion vectors of the luma subblocks in the set S is divided by right shifting operation depending on the number of elements (e.g. luma subblocks) in the set of luma subblocks (S).

In a possible implementation form of the method according to any preceding implementation of the first aspect or the first aspect as such, the determining chroma scaling factors in horizontal and vertical directions based on chroma format information, comprises: determining the chroma scaling factors in horizontal and vertical directions based on a mapping between the chroma format information and the chroma scaling factors in horizontal and vertical directions.

In a possible implementation form of the method according to any preceding implementation of the first aspect or the first aspect as such, further comprising generating a prediction of the chroma subblock based on the determined motion vector.

In a possible implementation form of the method according to any preceding implementation of the first aspect or the first aspect as such, the chroma format comprises one of a YUV 4:2:2 format, a YUV 4:2:0 format or a YUV 4:4:4 format.

The method according to any preceding implementation of the first aspect or the first aspect as such implemented by an encoding device.

The method according to any preceding implementation of the first aspect or the first aspect as such implemented by a decoding device.

According to a second aspect of the invention, an apparatus for affine based inter prediction of a current image block comprises co-located luma and chroma blocks, is provided, wherein the apparatus comprising
 a determining module configured to determine chroma scaling factors in horizontal and vertical directions based on chroma format information, wherein the chroma format information indicates a chroma format of a current picture which the current image block belongs to; and determine a set (S) of luma subblocks of the luma block based on values of the chroma scaling factors; and
 a motion vector derivation module configured to determine a motion vector for a chroma subblock of the chroma block based on motion vectors of one or more luma subblocks in the set (S) of luma subblocks.

The method according to the first aspect of the invention can be performed by the apparatus according to the second aspect of the invention. Further features and implementation forms of the apparatus according to the second aspect of the invention correspond to the features and implementation forms of the method according to the first aspect of the invention.

According to a third aspect the invention relates to an apparatus for decoding a video stream includes a processor and a memory. The memory is storing instructions that cause the processor to perform the method according to the first aspect.

According to a fourth aspect the invention relates to an apparatus for encoding a video stream includes a processor and a memory. The memory is storing instructions that cause the processor to perform the method according to the first aspect.

According to a fifth aspect, a computer-readable storage medium having stored thereon instructions that, when executed, cause one or more processors configured to code video data is proposed. The instructions cause the one or more processors to perform a method according to the first aspect or any possible embodiment of the first aspect.

According to a sixth aspect, the invention relates to a computer program comprising program code for performing the method according to the first or second aspect or any possible embodiment of the first aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIG. 14C shows an example of subdivision of a 16×16 luma block into subblocks and the subdivision of a chroma block co-located with the luma block when the chroma format is YUV 4:4:4;

Figure 1A:
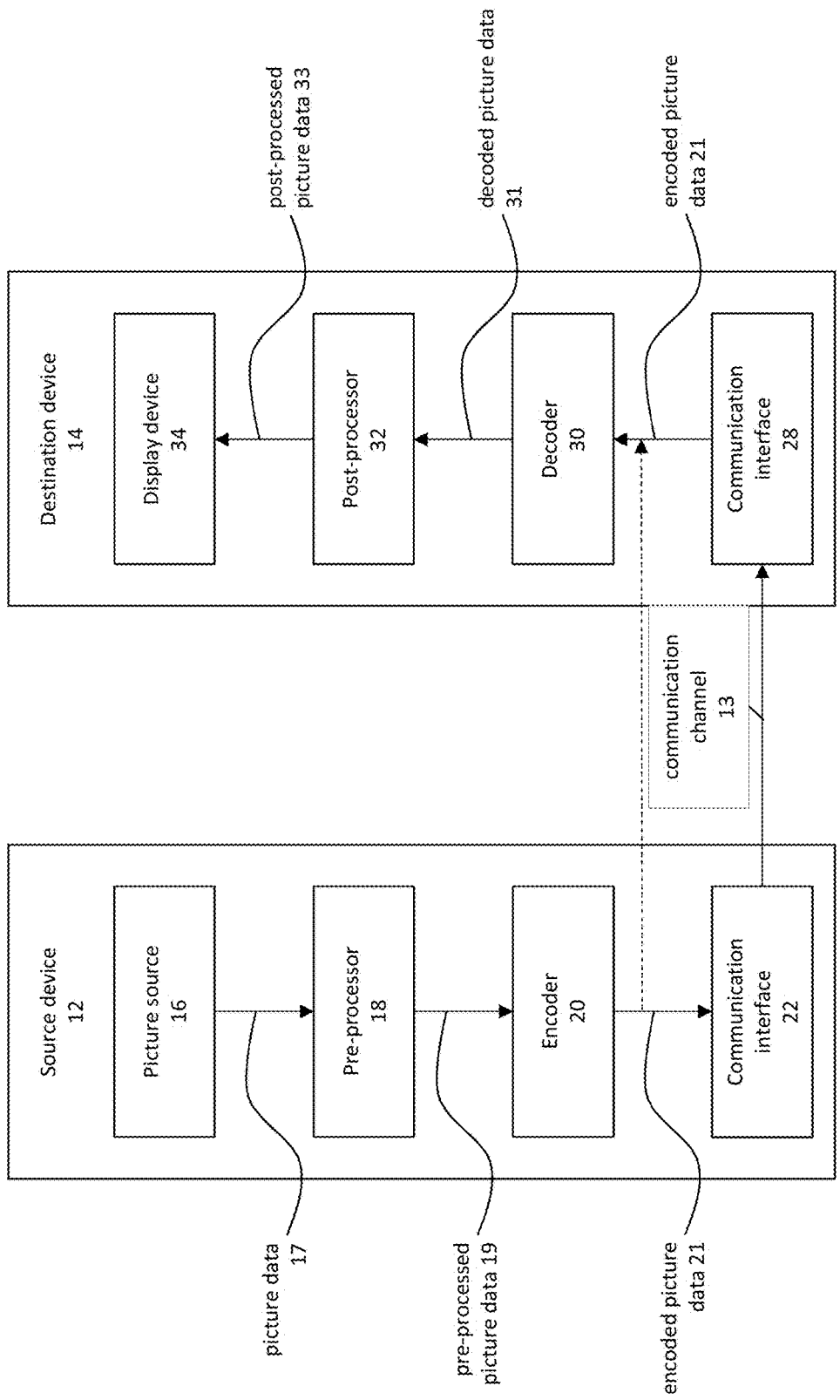
FIG. 1A is a block diagram showing an example of a video coding system configured to implement embodiments presented herein.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of using the term "picture", the term "frame" or "image" may be used as synonyms in the field of video coding. Video coding (or coding in general) comprises two parts: video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

The present disclosure relates to improvements in the process of inter-prediction. In particular, the present disclosure relates to improvements in the derivation process for chroma motion vectors. Particularly, the present disclosure relates to improvements in the process of motion vector derivation of affine chroma blocks (such as, chroma subblocks). More particularly, the present disclosure relates to improvements in the process of motion vector derivation for affine based inter prediction of chroma subblocks based on chroma format.

Disclosed herein are improved mechanisms to support multiple chroma formats for derivation process for chroma motion vectors.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or coding system 10 for short) that may utilize techniques of this present application. Video encoder 20 (or encoder 20 for short) and video decoder 30 (or decoder 30 for short) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 21.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 21 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may comprise, for example, liquid crystal displays (LCD), organic light emitting diodes (OLED) displays, plasma displays, projectors, micro LED displays, liquid crystal on silicon (LCoS), digital light processor (DLP) or any kind of other display(s).

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
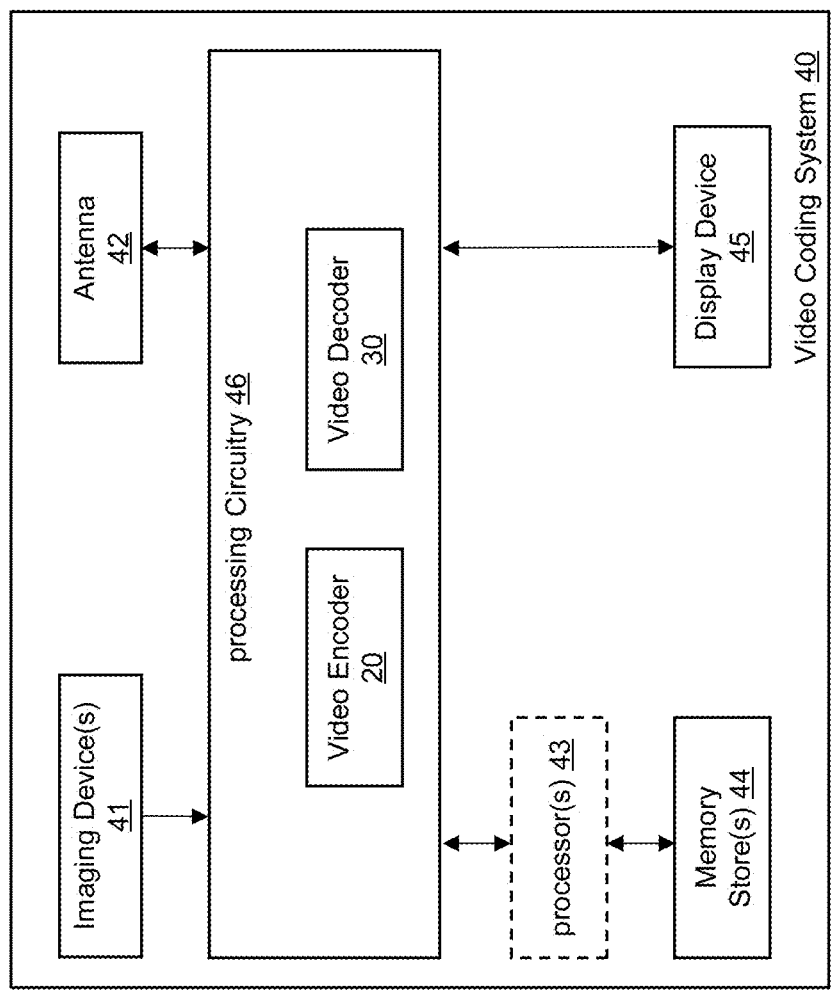
FIG. 1B is a block diagram showing another example of a video coding system configured to implement embodiments presented herein.

The encoder 20 (e.g. a video encoder 20) or the decoder 30 (e.g. a video decoder 30) or both the encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
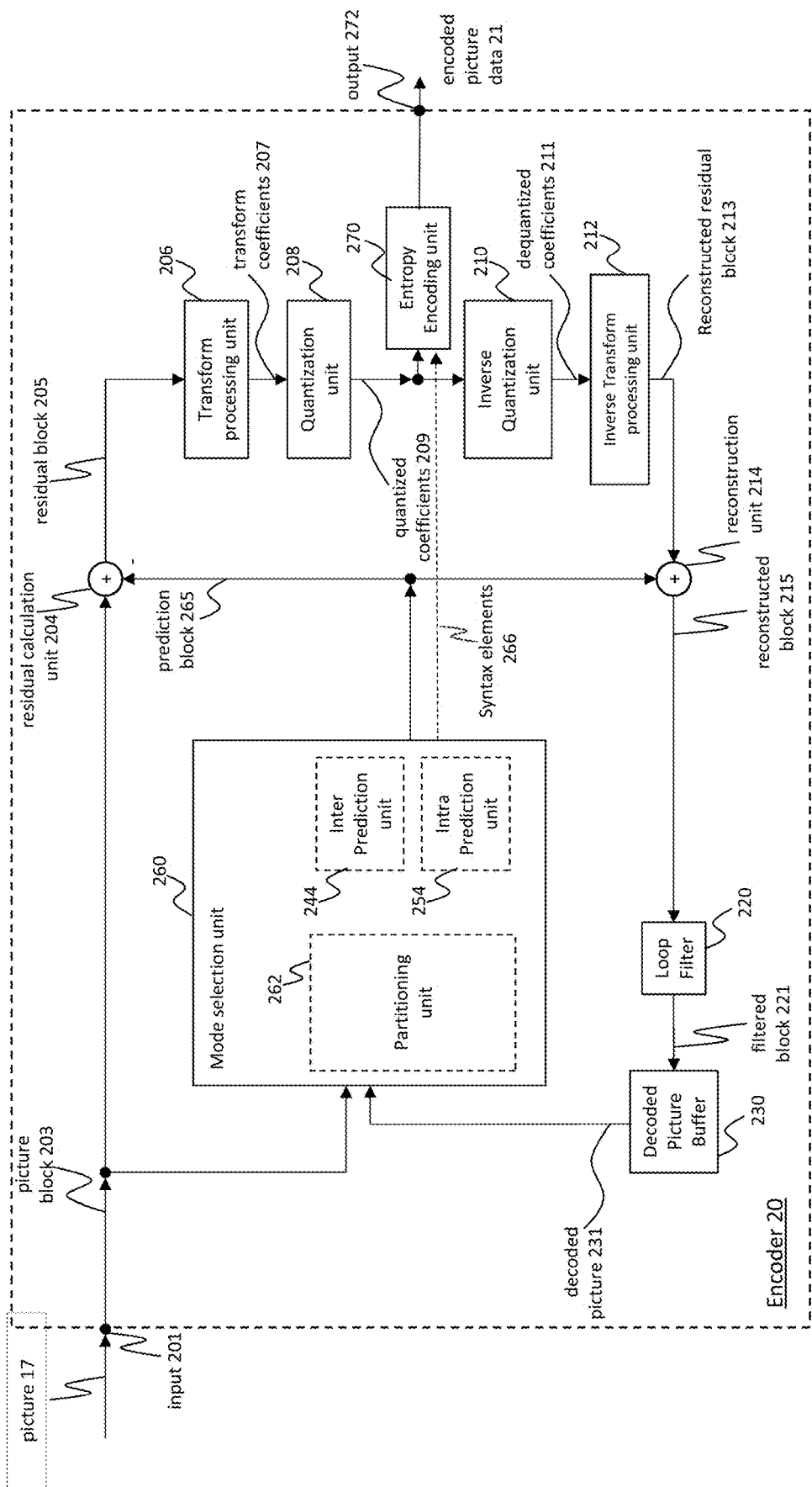
FIG. 2 is a block diagram showing an example of a video encoder configured to implement embodiments presented herein.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
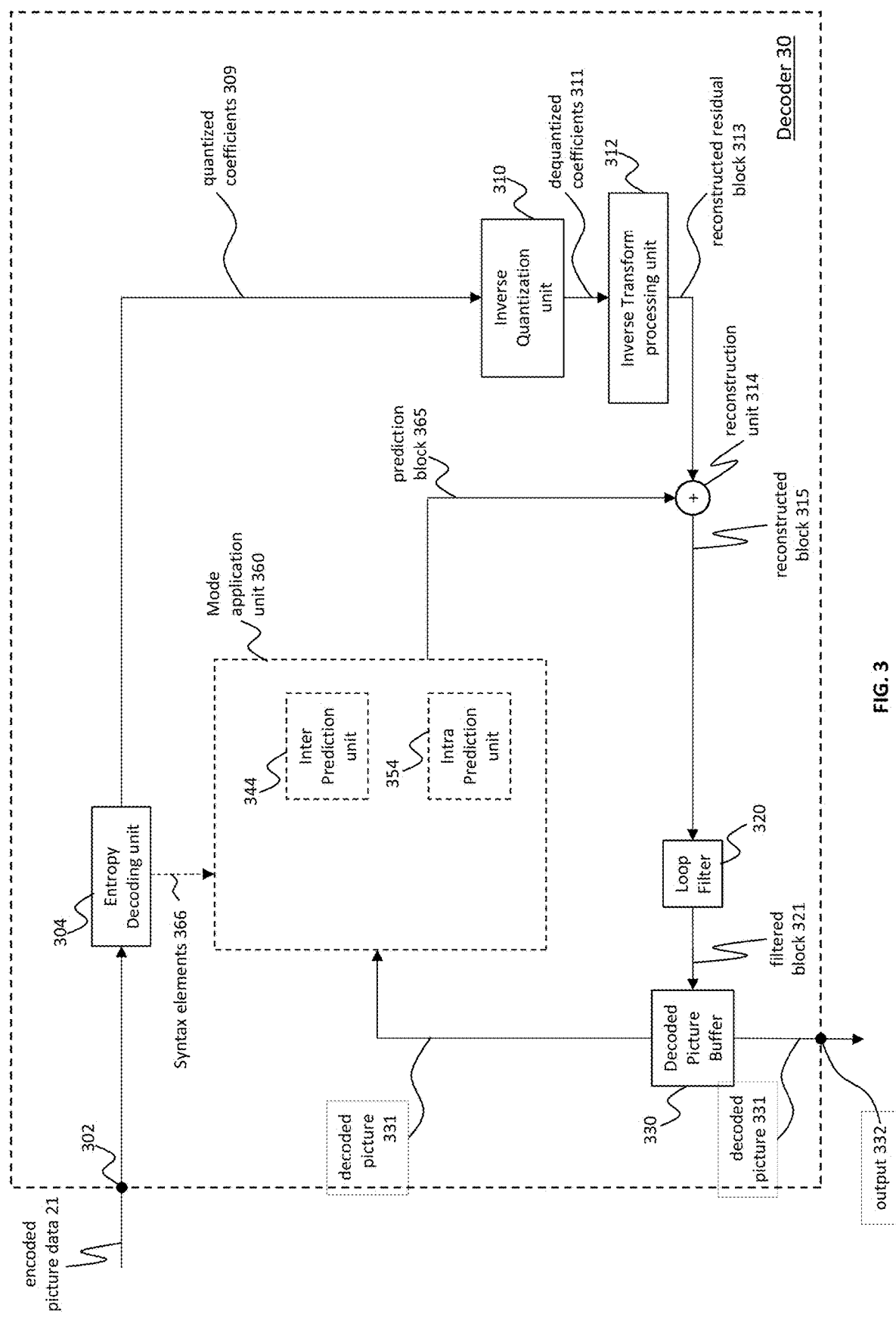
FIG. 3 is a block diagram showing an example structure of a video decoder configured to implement embodiments presented herein.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as a pixel (a short form of a picture element) or a pel. The number of samples in the horizontal and vertical direction (or axis) of the array or picture define the size and/or resolution of the picture. For representation of color, typically three color components are employed, i.e. the picture may be represented or include three sample arrays. In an RGB format or a color space, a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or luma for short) component Y represents the brightness or grey level intensity (e.g. like in a grey-scale picture), while the two chrominance (or chroma for short) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder 20 may be configured to receive directly a block 203 of the picture 17, e.g. one, several or all blocks forming the picture 17. The picture block 203 may also be referred to as a current picture block or a picture block to be coded.

Like the picture 17, the picture block 203 again is or can be regarded as a two-dimensional array or a matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as a residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, a bit depth of the transform coefficients, a tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (comprising the transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding dequantization and/or the inverse quantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for the quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (comprising the quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond to the transform coefficients 207, although typically not identical to the transform coefficients due to the loss by quantization.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 211) in the sample domain. The reconstructed residual block 213 may also be referred to as a transform block 213.

Reconstruction

The reconstruction unit 214 (e.g. an adder or a summer 214) is configured to add the transform block 213 (i.e. a reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or a "loop filter" 220 for short), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (comprising loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises a partitioning unit 262, an inter-prediction unit 244 and an intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265. As will be discussed in detail below, the embodiments presented herein provide an improvement to the inter-prediction unit 244 by providing more accurate motion vector prediction used by the inter-prediction unit when performing the inter prediction, for example, the affine based inter prediction or sub-block based inter prediction.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 262) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as a coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of the video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, a skip mode and/or a direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists. In the present disclosure, improvements to the inter prediction (especially, affine based inter prediction or sub-block based inter prediction) are made by supporting multiple chroma formats and by refining affine sub-block motion vector derivation process. In particular, an improved method and apparatus for motion vector derivation for affine based inter prediction of chroma subblocks based on a chroma format will be introduced as below.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to the video decoder 30, or stored in a memory for later transmission or retrieval by the video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example video decoder 30 that is configured to implement the techniques of this present application. The video decoder 30 is configured to receive encoded picture data 21 (e.g. encoded bitstream 21), e.g. encoded by the encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to the video encoder 20 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of the video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), an intra prediction parameter (e.g., an intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by the video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening filter, a smoothing filter or a collaborative filter, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in the decoded picture buffer 330, which stores the decoded pictures 331 as reference pictures for subsequent motion compensation for other pictures and/or for output respectively display.

The decoder 30 is configured to output the decoded picture 331, e.g. via output 272, for presentation or viewing to a user.

Prediction

The inter prediction unit 344 may be identical to the inter prediction unit 244 (in particular to the motion compensation unit) and the intra prediction unit 354 may be identical to the intra prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of a motion vector is bitDepth, then the range is $-2^{(bitDepth-1)} \sim 2^{(bitDepth-1)}-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux=(mvx+2^{bitDepth})\% \, 2^{bitDepth} \qquad (1)$$

$$mvx=(ux>=2^{bitDepth-1})?(ux-2^{bitDepth}):ux \qquad (2)$$

$$uy=(mvy+2^{bitDepth})\% \, 2^{bitDepth} \qquad (3)$$

$$mvy=(uy>=2^{bitDepth-1})?(uy-2^{bitDepth}):uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\% \, 2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\% \, 2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: remove the overflow MSB by clipping the value $$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
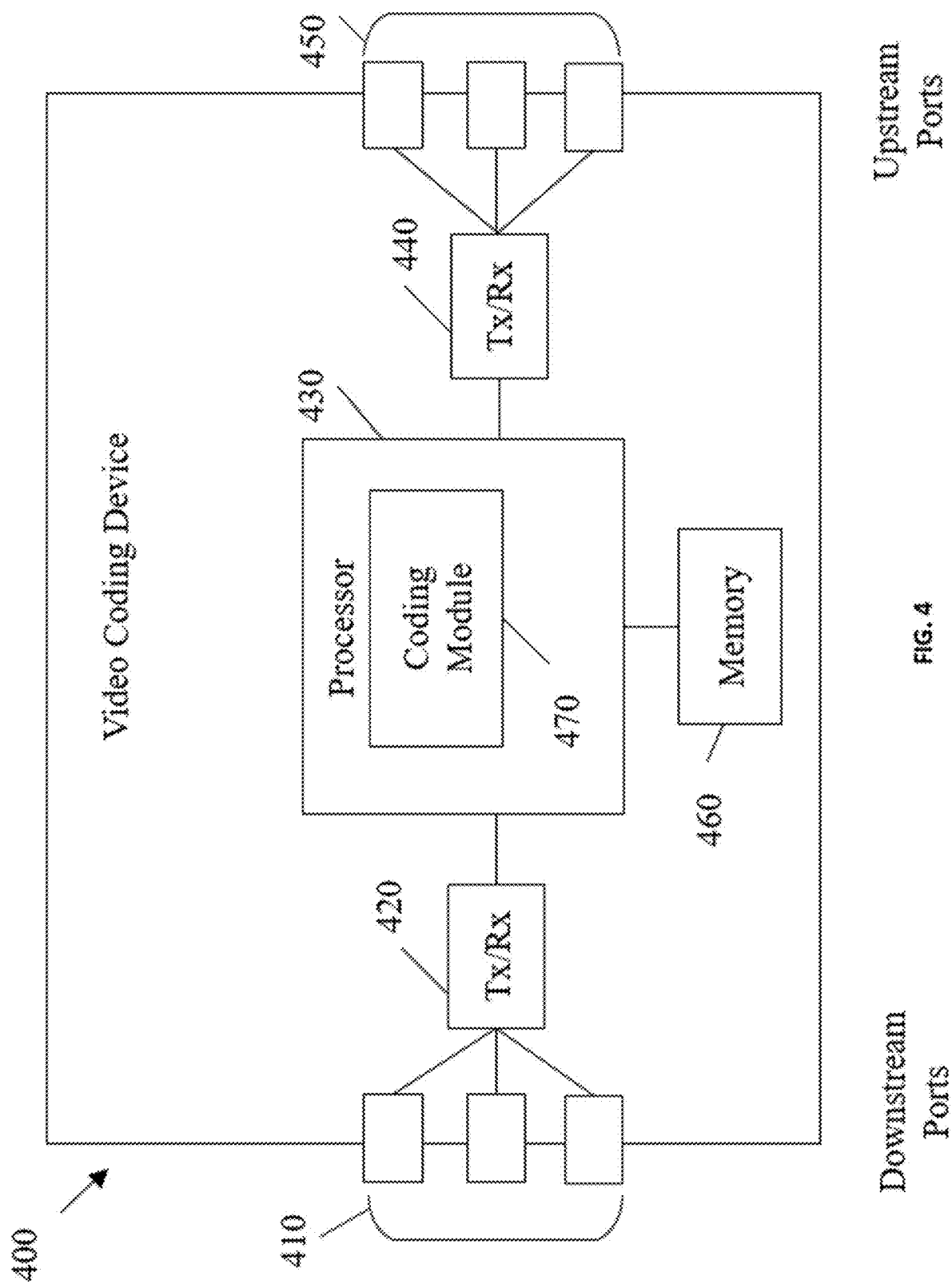
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
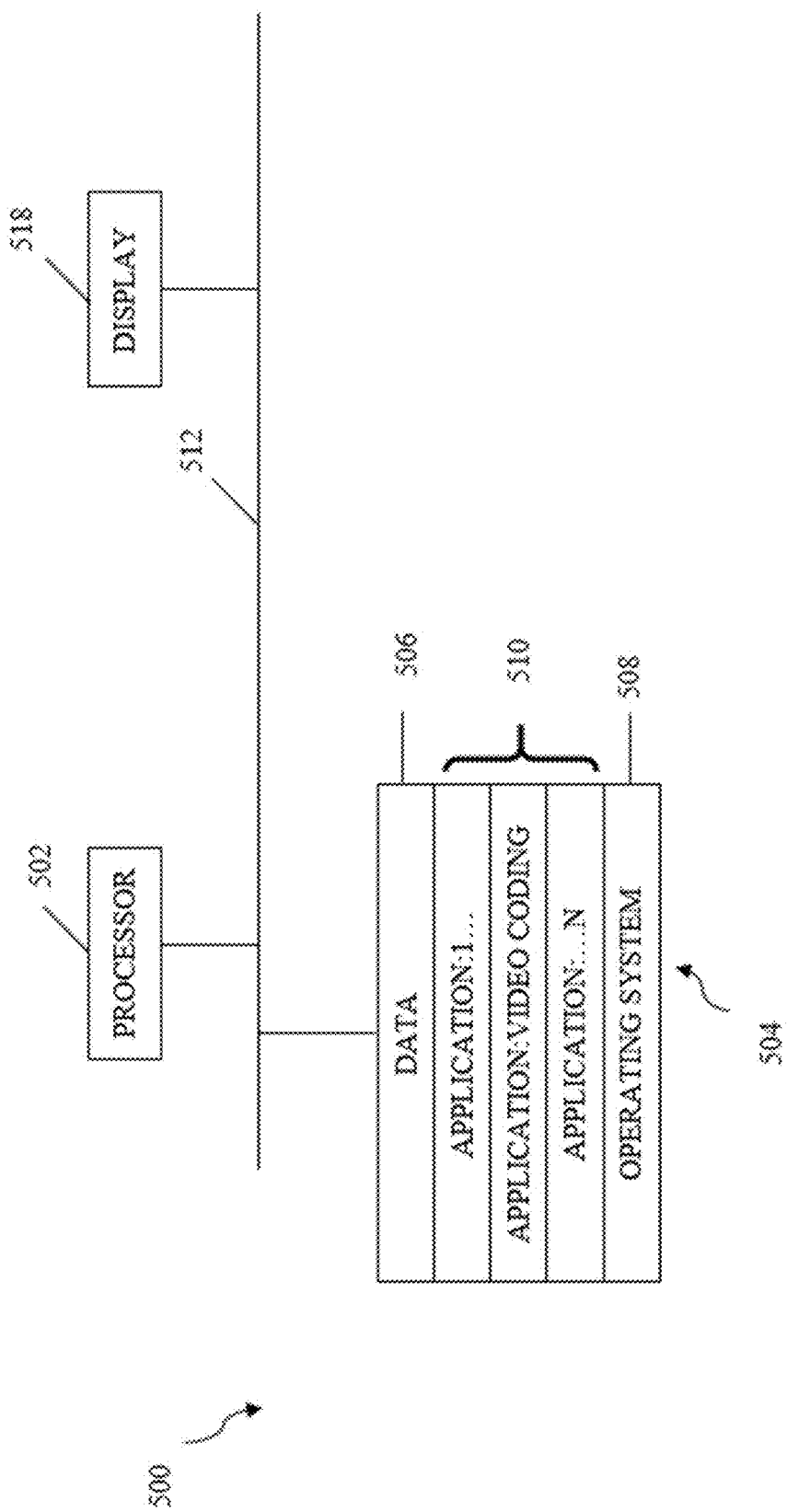
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

The embodiments presented herein will be described in more detail as follows. A video source that is represented by a bitstream can include a sequence of pictures in decoding order. Each of the pictures (which can be a source picture or a decoded picture) includes one or more of the following sample arrays:

Luma (Y) only (monochrome).
Luma and two chroma (YCbCr or YCgCo).
Green, blue, and red (GBR, also known as RGB).
Arrays representing other unspecified monochrome or tri-stimulus colour samplings (for example, YZX, also known as XYZ).

For convenience of notation and terminology in the present disclosure, the variables and terms associated with these arrays are referred to as luma (or L or Y) and chroma, where the two chroma arrays are referred to as Cb and Cr.

Figure 9A:
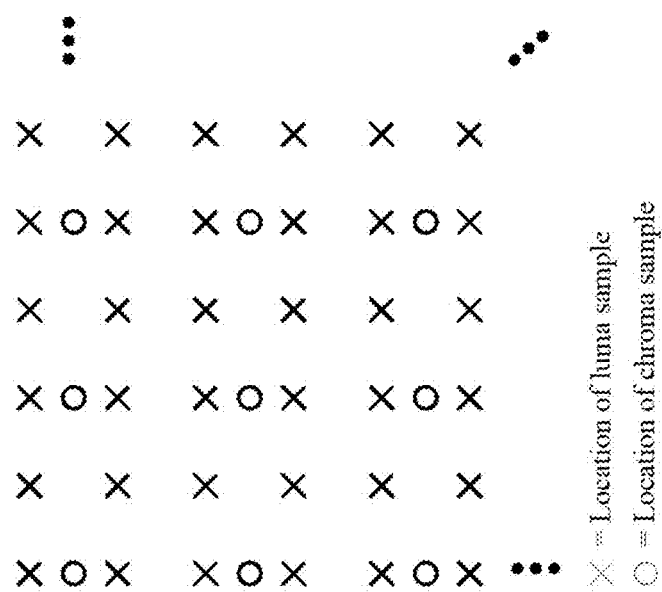
FIG. 9A shows an example about a nominal vertical and horizontal locations of 4:2:0 luma and chroma samples in a picture.
Figure 9B:
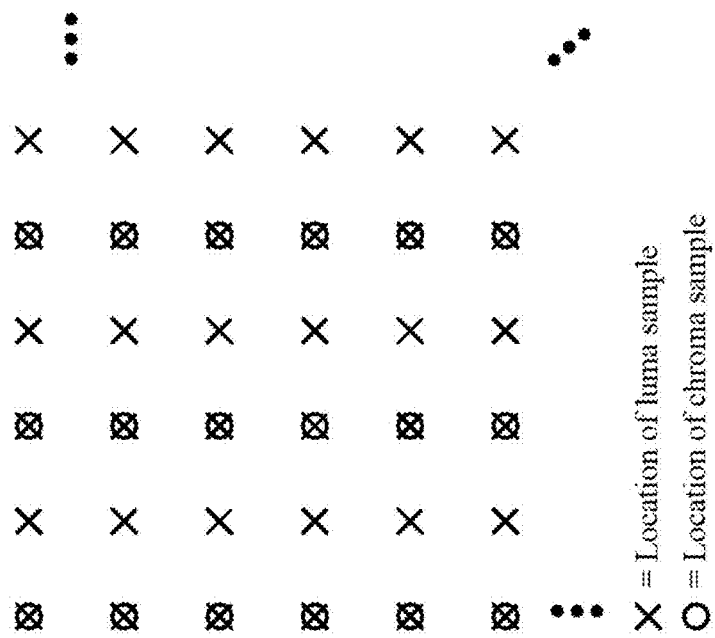
FIG. 9B shows an example about a nominal vertical and horizontal locations of 4:2:2 luma and chroma samples in a picture.
Figure 9C:
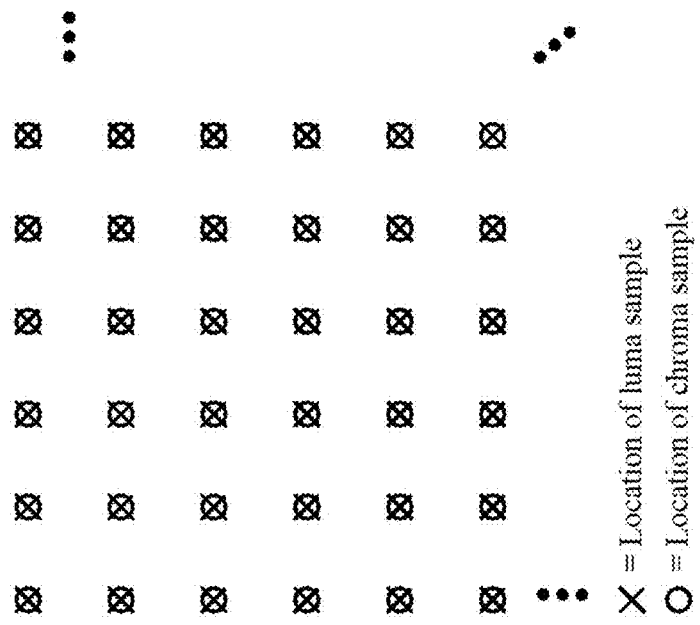
FIG. 9C shows an example about a nominal vertical and horizontal locations of 4:4:4 luma and chroma samples in a picture.

FIG. 9A illustrates chroma component location in case of 4:2:0 sampling scheme. Examples for other sampling schemes are shown in FIGS. 9B and 9C.

Figure 9D:
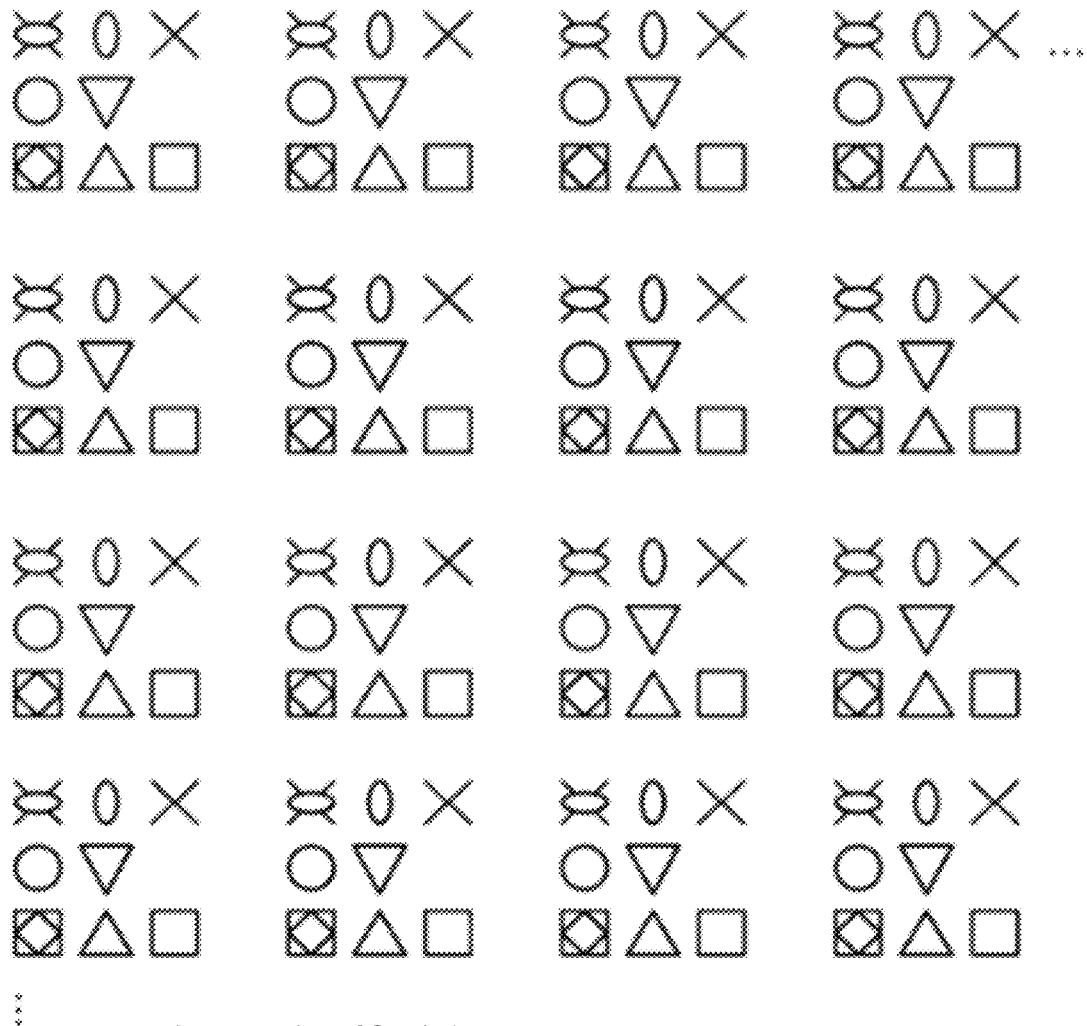
FIG. 9D illustrates various sampling patterns.

As shown in FIG. 9A, in the 4:2:0 sampling scheme, there may be a shift between the Luma and Chroma component grids. In a block of 2×2 pixels, the Chroma components are actually shifted by half a pixel vertically compared to the Luma component (see FIG. 9A). Such shift may have an influence on the interpolation filters when down-sampling the picture, or when up-sampling the picture. In FIG. 9D, various sampling patterns are represented, in case of interlaced image. This means that the parity, i.e. whether the pixels are on the top or bottom fields of an interlaced image, is also taken into account.

According to Versatile Video Coding (VVC) specification draft, a special flag "sps_cclm_colocated_chroma_flag" is signalled on the level of sequence parameters. The "sps_cclm_colocated_chroma_flag" flag equal to 1 specifies that the top-left downsampled luma sample in cross-component linear model intra prediction is co-located with the top-left luma sample. sps_cclm_colocated_chroma_flag equal to 0 specifies that the top-left downsampled luma sample in cross-component linear model intra prediction is horizontally co-sited with the top-left luma sample but vertically shifted by 0.5 units of luma samples relatively to the top-left luma sample.

Affine Motion Compensated Prediction

Figure 6B:
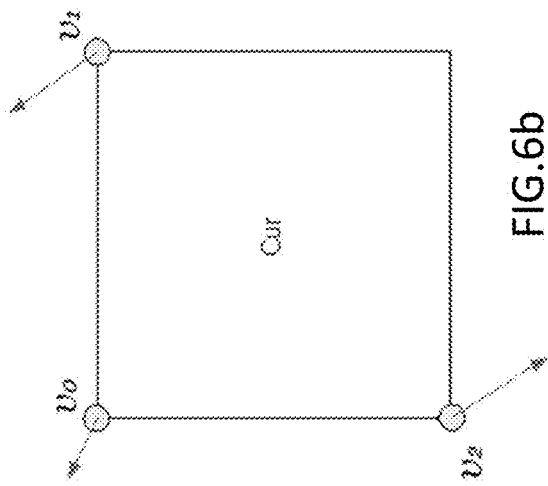
FIG. 6b shows an example about a control point motion vector positions for 6-parameter affine motion model.
Figure 6A:
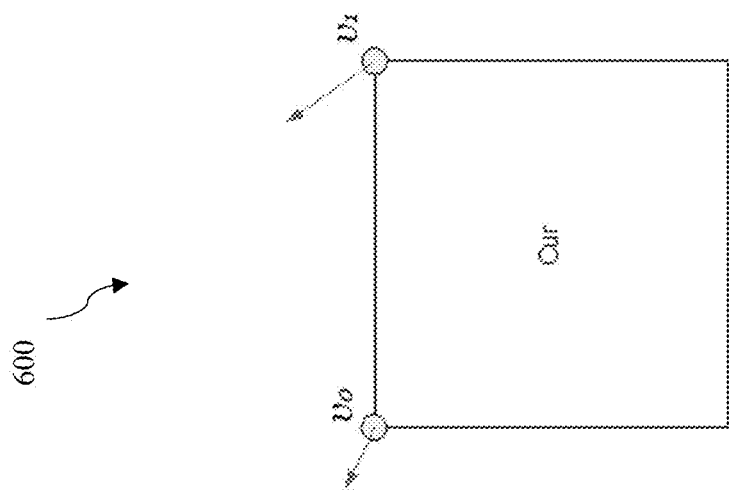
FIG. 6a shows an example about a control point motion vector positions for 4-parameter affine motion model.

In the real world, there are many kinds of motion, e.g. zoom in/out, rotation, perspective motions, a translation motion, and the other irregular motions. In HEVC (ITU-T H.265), only a translation motion model is utilized for motion compensation prediction (MCP). In the VVC, affine transform motion compensation prediction is applied. The affine motion field of the block is described by two or three control point motion vectors (CPMV) which correspond to the four parameters affine motion model and the six parameters affine motion model respectively. CPMV positions for a 4-parameter affine motion model are depicted in FIG. 6a and CPMV positions for a 6-parameter affine motion model are depicted in FIG. 6b.

In the case of 4-parameter motion model, the motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where (v0x, v0y) is the motion vector of the top-left corner control point, and (v1x, v1y) is a motion vector of the top-right corner control point. (vx, vy) is the motion vector at a given location (x, y) in the block. A Rate distortion cost (RDC) check is used to determine which motion vector pair is selected as the control point motion vectors of the current CU.

CPMVs can be derived based on motion information of neighboring blocks (for example, in a process of subblock merge mode). Alternatively, or additionally, CPMVs can be derived by deriving CPMV predictors (CPMVP) and obtaining difference between CPMV and CPMVP from the bitstream.

Figure 7:
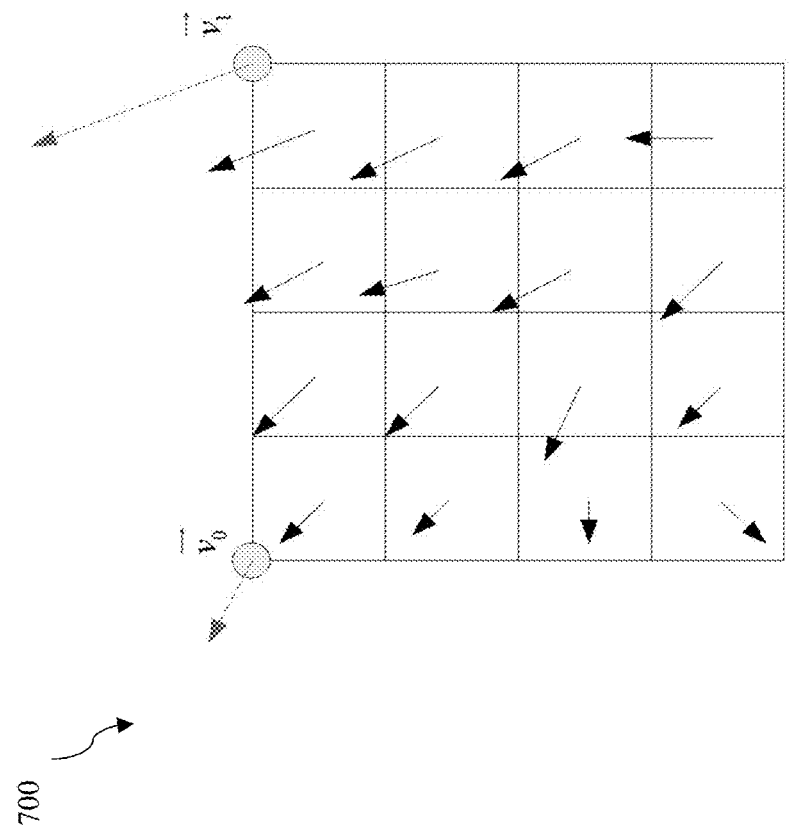
FIG. 7 shows an example of a subblock motion vector field for affine motion model.

In order to simplify the motion compensation prediction, block based affine transform prediction is applied. For example, to derive the motion vector of each 4×4 sub-block, a motion vector of the center sample of each sub-block, as shown in FIG. 7, is calculated according to the above Equation (1), and rounded to 1/16 fraction accuracy. The motion compensation interpolation filters are applied to generate the prediction of each sub-block with the derived motion vector.

After motion compensation prediction (MCP), the higher accuracy motion vector of each sub-block is rounded and saved as the same accuracy as the normal motion vector with accuracy.

Figure 8:
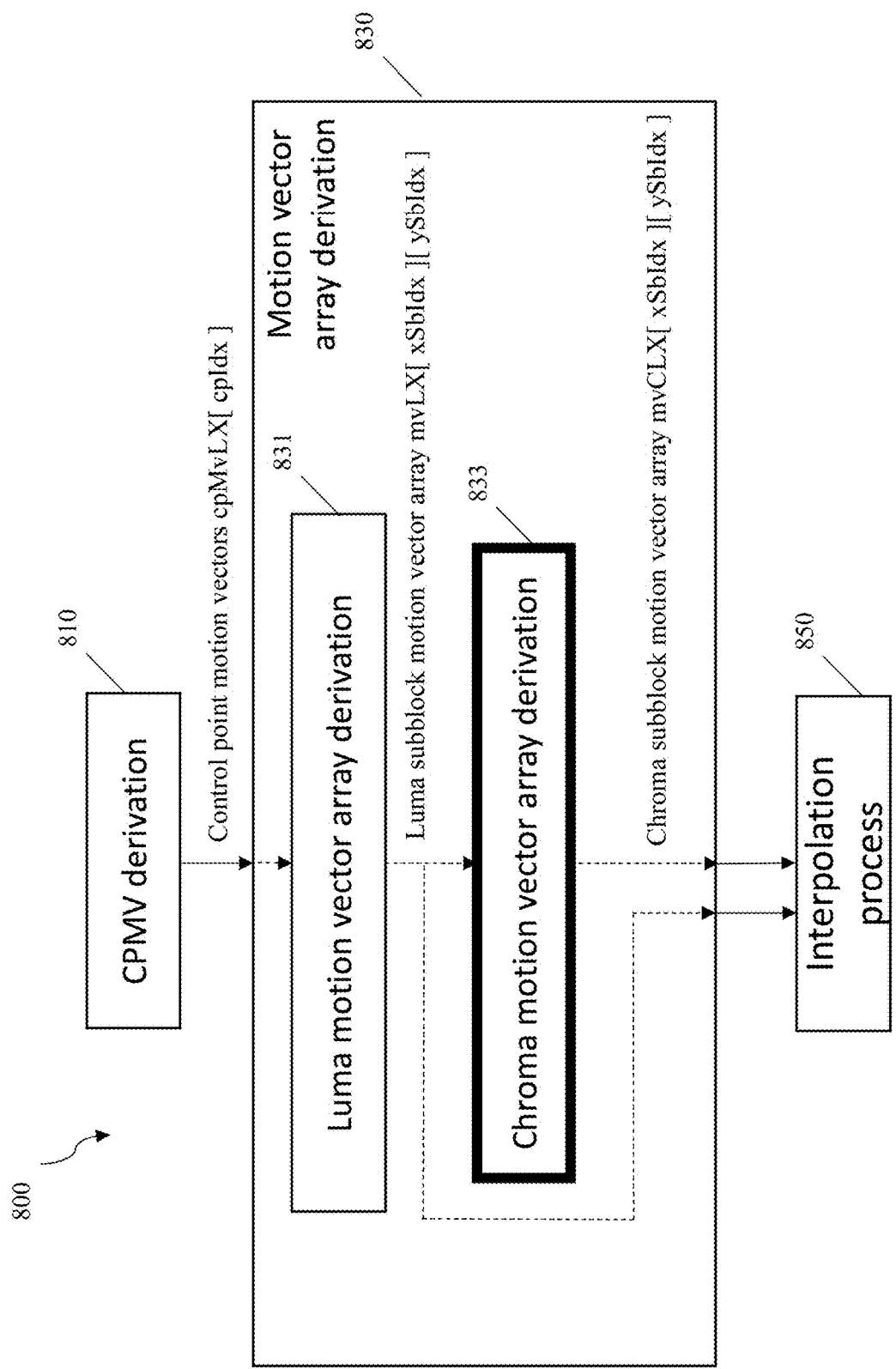
FIG. 8 is a block diagram illustrating motion compensation using affine motion model.

FIG. 8 shows an example of a flowchart depicting a process 800 for affine based inter prediction (i.e. motion compensation using an affine motion model). The process 800 may include following blocks:

At block 810, control point motion vector derivation is performed to generate control point motion vectors cpMvLX [cpIdx];

At block 830, motion vector array derivation is performed to generate a Luma subblock motion vector array mvLX [xSbIdx][ySbIdx] and a Chroma subblock motion vector array mvCLX[xSbIdx][ySbIdx]. Block 830 may include:

Block 831, where luma motion vector array derivation is performed to generate the Luma subblock motion vector array mvLX[xSbIdx][ySbIdx];

Block 833, where chroma motion vector array derivation is performed to generate the Chroma subblock motion vector array mvCLX[xSbIdx][ySbIdx];

At block 850, an interpolation process is carried out to generate the prediction of each sub-block with the derived motion vector, i.e. an array predSamples of prediction samples.

The embodiments presented herein mainly focus on block 833 for chroma motion vector array derivation (this block is indicated in bold in FIG. 8).

The details of derivation process for chroma motion vector in a previous design (in a conventional way) are described as follows:

Inputs for this process (Chroma motion vector array derivation) include:

the luma subblock motion vector array mvLX[xSbIdx][ySbIdx] with xSbIdx=0 . . . numSbX−1, ySbIdx=0 . . . numSbY−1 and X being 0 or 1 a chroma sampling ratio in horizontal direction, SubWidthC a chroma sampling ratio in vertical direction, SubHeightC Outputs:

the chroma subblock motion vector array mvCLX[xSbIdx][ySbIdx] with xSbIdx=0 . . . numSbX−1, ySbIdx=0 . . . numSbY−1 and X being 0 or 1.

This process is implemented as following:

The average luma motion vector mvAvgLX is derived as follows:

mvAvgLX=mvLX[(xSbIdx>>1<<1)][(ySbIdx>>1<<1)]+mvLX[(xSbIdx>>1<<1)+1][(ySbIdx<<1)+1]  (2)

mvAvgLX[0]=(mvAvgLX[0]>=0?(mvAvgLX[0]+1)>>1:−((−mvAvgLX[0]+1)>>1))  (3)

mvAvgLX[1]=(mvAvgLX[1]>=0?(mvAvgLX[1]+1)>>1:−((−mvAvgLX[1]+1)>>1))  (4)

Scale the mvAvgLX in accordance with the reference index value refIdxLX. Specifically, If the reference picture corresponding to refIdxLX for the current coding unit is not the current picture, the following applies:

mvCLX[0]=mvLX[0]*2/SubWidthC mvCLX[1]=mvLX[1]*2/SubHeightC

Otherwise (the reference picture corresponding to refIdxLX for the current coding unit is the current picture), the following applies:

$$mvCLX[0]=((mvLX[0]>>(3+SubWidthC))*32$$

$$mvCLX[1]=((mvLX[1]>>(3+SubHeightC))*32$$

In the above design, the calculation of mvAvgLX does not take into account the Chroma subsampling. This leads to inaccurate estimation of a motion field for cases where one of the variables SubWidthC and SubHeightC is equal to 1.

The embodiments of the present invention solve this problem by subsampling the luma motion field based on the chroma format of the picture thereby increasing the accuracy of the chroma motion field. More specifically, the embodiments of the present invention disclose a method to consider the chroma format of the picture when obtaining chroma motion vectors from luma motion vectors. By taking an average of luma motion vectors, linear subsampling of luma motion field is performed. Selecting luma motion vectors based on the picture chroma format leads to a more accurate chroma motion field due to a more accurate luma motion vector field subsampling. This dependency on chroma format enables the selection of the most appropriate luma blocks when averaging luma motion vectors. As a consequence of a more accurate motion field interpolation, prediction error is reduced, which has a technical result of compression performance improvement.

In one exemplary implementation, table 1-1 shows the chroma formats which can be supported in the present disclosure. Chroma format information, such as chroma_format_idc and/or separate_colour_plane_flag, which may be used to determine the values of the variables SubWidthC and SubHeightC.

TABLE 1-1

| chroma_format_idc | separate_colour_plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | chroma_format_idc specifies the chroma sampling relative to the luma sampling. The value of chroma_format_idc shall be in the range of 0 to 3, inclusive.

separate_colour_plane_flag equal to 1 specifies that the three colour components of the 4:4:4 chroma format are coded separately. separate_colour_plane_flag being equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax.

Chroma format determines precedence and subsampling of chroma arrays;

In monochrome sampling there is only one sample array, which is nominally considered the luma array.

In 4:2:0 sampling, each of the two chroma arrays has half the height and half the width of the luma array, as shown in FIG. 9A.

In 4:2:2 sampling, each of the two chroma arrays has the same height and half the width of the luma array, as shown in FIG. 9B.

In 4:4:4 sampling, depending on the value of separate_colour_plane_flag, the following applies:

If separate_colour_plane_flag is equal to 0, each of the two chroma arrays has the same height and width as the luma array, as shown in FIG. 9C.

Otherwise (separate_colour_plane_flag is equal to 1), the three colour planes are separately processed as monochrome sampled pictures.

In another exemplary implementation, Table 1-2 also shows the chroma formats which can be supported in the present disclosure. Chroma format information, such as chroma_format_idc and/or separate_colour_plane_flag, which may be used to determine the values of the variables SubWidthC and SubHeightC.

TABLE 1-2

| chroma_format_idc | separate_colour_plane_flag | Chroma format | Sub Width C | SubHeight C |
|---|---|---|---|---|
| 2(0) | 0 | 4:2:2 | 2 | 1 |
| 3(1) | 0 | 4:4:4 | 1 | 1 |
| 3(1) | 1 | 4:4:4 | 1 | 1 |

The number of bits necessary for the representation of each of the samples in the luma and chroma arrays in a video sequence is in the range of 8 to 16, inclusive, and the number of bits used in the luma array may differ from the number of bits used in the chroma arrays.

When the value of chroma_format_idc is equal to 1, the nominal vertical and horizontal relative locations of luma and chroma samples in pictures are shown in FIG. 9A. Alternative chroma sample relative locations may be indicated in video usability information.

When the value of chroma_format_idc is equal to 2, the chroma samples are co-sited with the corresponding luma samples and the nominal locations in a picture are as shown in FIG. 9B.

When the value of chroma_format_idc is equal to 3, all array samples are co-sited for all cases of pictures and the nominal locations in a picture are as shown in FIG. 9C.

In one exemplary implementation, the variables SubWidthC and SubHeightC are specified in Table 1-1 or 1-2, depending on the chroma format sampling structure, which is specified through chroma_format_idc and separate_colour_plane_flag. It can be understood that chroma format information, such as the chroma format sampling structure, is specified through chroma_format_idc and separate_colour_plane_flag.

Contrary to the previous design, in the present disclosure, derivation of positions within the luma subblock motion vector array may be applied for different chroma formats and depends on the value of the chroma scaling factor (e.g. SubWidthC and SubHeightC). It should be understood that the "chroma scaling factor in horizontal and vertical directions" can also be referred to as "chroma sampling ratio in horizontal and vertical directions".

Alternatively, in another exemplary implementation, SubWidthC and SubHeightC could be defined as SubWidthC=(1+log 2(wluma)−log 2(wchroma)) and SubHeightC=(1+log 2(hluma)−log 2(hchroma)), where wluma and hluma are the width and height of the luma array respectively, and wchroma and hchroma are the width and height of the chroma array respectively.

In possible implementations of some embodiments of the present disclosure, for a given chroma format, the process of determination of the positions or indexes within luma motion vector array for a given index of a co-located chroma subblock could be performed as follows:

At the outset, the values of SubWidthC and SubHeightC are determined based on the chroma format of the currently coding or decoding picture (or frame).

Then, for each of chroma spatial positions specified by indices xSbIdx=0 . . . numSbX−1, ySbIdx=0 . . . numSbY−1 and X being 0 or 1, the value of chroma motion vector is stored as a corresponding mvCLX element. The steps for determining chroma motion vector are as follows:

The first step is to perform rounding, to determine the x and y indices of the co-located luma subblock:

$$xSbIdxL=(xSbIdx>>(SubWidthC-1))<<(SubWidthC-1);$$

$$ySbIdxL=(ySbIdx>>(SubHeightC-1))<<(SubHeightC-1).$$

The second step is to determine the set of luma subblock positions that are further in determination of the chroma motion vector. A possible example for defining such a set S may be described below:

$$S_0=(xSbIdxL,ySbIdxL);$$

$$S_1=(xSbIdxL+(SubWidthC-1),ySbIdxL+(SubHeightC-1)).$$

The third step is to calculate the average vector mvAvgLX:

When a set S contains N elements, N is a power-of-two, in one exemplary implementation, a motion vector mvAvgLX is determined as follows:

$$mvAvgLX=\Sigma_i>mvLX[S_i^x][S_i^y]$$

$$mvAvgLX[0]=(mvAvgLX[0]+N>>1)>>\log 2(N)$$

$$mvAvgLX[1]=(mvAvgLX[1]+N>>1)>>\log 2(N)$$

where $S_i^x$ and $S_i^y$ are x and y coordinates of position Si.

To summarize, in one exemplary implementation, the determination of the average vector mvAvgLX for averaging can be formulated as follows:

$$mvAvgLX=mvLX[(xSbIdx>>(SubWidthC-1)<<(SubWidthC-1))][(ySbIdx>>(SubHeightC-1)<<(SubHeightC-1))]+mvLX[(xSbIdx>>(SubWidthC-1)<<(SubWidthC-1))+(SubWidthC-1)][(ySbIdx>>(SubHeightC-1)<<(SubHeightC-1))+(SubHeightC-1)] \quad (Eqn.1)$$

$$mvAvgLX[0](mvAvgLX[0]+N>>1)>>\log 2(N) \quad (Eqn.2)$$

$$mvAvgLX[1](mvAvgLX[1]+N>>1)>>\log 2(N) \quad (Eqn.3)$$

It is noted that the way for averaging luma motion vectors presented herein is not limited as above and that the average function in the present disclosure can be implemented in different implementations.

It should be understood that although the above describes the process as a 3-step process, the determination of the average vector mvAvgLX as formulated above in Eqn. 1-3 can be performed in any order.

In another exemplary implementation, the third step can be also implemented as follows:

$$mvAvgLX=\Sigma_i mvLX[S_i^x][S_i^y]$$

$$mvAvgLX[0]=(mvAvgLX[0]>=0?(mvAvgLX[0]+N>>1)>>\log 2(N): -((-mvAvgLX[0]+N>>1)>>\log 2(N)) \quad (5)$$

$$mvAvgLX[1]=(mvAvgLX[1]>=0?(mvAvgLX[1]+N>>1)>>\log 2(N):-((-mvAvgLX[1]+N>>1)>>\log 2(N))) \quad (6)$$

where $S_i^x$ and $S_i^y$ are x and y coordinates of position Si.

It should be noted that the way for averaging luma motion vectors presented herein is not limited as above and that the average function in the present disclosure can be implemented in different implementations.

The next step is to scale the mvAvgLX in accordance with the reference index value refIdxLX. In some examples, the scaling process is performed as follows by replacing mvLX with mvAvgLX (i.e., mvLX[0] will be replaced with mvAvgLX[0], and mvLX[1] will be replaced with mvAvgLX [1]):

If a reference picture corresponding to refIdxLX for the current coding unit is not the current picture, the following applies:

$$mvCLX[0]=mvLX[0]*2/SubWidthC$$

$$mvCLX[1]=mvLX[1]*2/SubHeightC$$

Otherwise (the reference picture corresponding to refIdxLX for the current coding unit is the current picture), the following applies:

$$mvCLX[0]=((mvLX[0]>>(3+SubWidthC))*32$$

$$mvCLX[1]=((mvLX[1]>>(3+SubHeightC))*32$$

Likewise, the derivation process for chroma motion vectors in clause 8.5.2.13 described below can be invoked with mvAvgLX and refIdxLX as inputs, and the chroma motion vector array mvCLXSub[xCSbIdx][yCSbIdx] as output. In the process described in clause 8.5.2.13, mvLX will be replaced with mvAvgLX, and in particular, mvLX[0] will be replaced with mvAvgLX[0], and mvLX[1] will be replaced with mvAvgLX[1].

The details of possible implementations of the average vector mvAvgLX calculation in a derivation process for chroma motion vector of the proposed method are described as follows in the format of the modification of the specification of the VVC draft. There are multiple variants of the process.

1. One of the variants of the average vector mvAvgLX calculation in derivation process for chroma motion vector of the proposed method could be described as follows in the format of the modification of the specification of the VVC draft:

. . .

The average luma motion vector mvAvgLX is derived as follows:

$$mvAvgLX=mvLX[(xSbIdx>>(SubWidthC-1)<<(SubWidthC-1))][(ySbIdx>>(SubHeightC-1)<<(SubHeightC-1))]+mvLX[(xSbIdx>>(SubWidthC-1))<<(SubWidthC-1))+(1>>(2-SubWidthC)]$$

$$[(ySbIdx>>(SubHeightC-1)<<(SubHeightC-1))+(1>>(2-SubHeightC))]$$

Explanatory notes: The above equation shows an example of selecting luma motion vectors for average motion vector calculation (e.g. selection of luma subblock positions for a given chroma subblock position). The selected luma subblocks (and thus their respective positions) are represented by their respective subblock indexes in the horizontal direction and in the vertical direction. For example, and as shown above, for a given chroma subblock (xSbIdx, ySbIdx) where xSbIdx and ySbIdx are the subblock indexes of the chroma subblock in the horizontal and vertical direction, respectively, two luman subblocks (and thus their respective positions, e.g. their respective subblock indices) can be selected. One of the two selected luma subblocks can be represented by a subblock index in the horizontal direction as [(xSbIdx>>(SubWidthC−1)<<(SubWidthC−1))] and a subblock index in the vertical direction as [(ySbIdx>>(SubHeightC−1)<<(SubHeightC−1))]. Another selected luma subblock can be represented by a subblock index in the horizontal direction as [(xSbIdx>>(SubWidthC−1)<<(SubWidthC−1))+(1>>(2−SubWidthC))] and a subblock index in the vertical direction as [(ySbIdx>>(SubHeightC−1)<<(SubHeightC−1))+(1>>(2−SubHeightC))]). Accordingly, the selection of the luma blocks for averaging luma motion vectors is dependent on the picture chroma format. In particular, selection of the luma blocks for averaging luma motion vectors, is dependent on the chroma scaling factors SubWidthC and SubHeightC which are determined based on the picture chroma format.

The mvAvgLX obtained above can be further processed by:

mvAvgLX[0]=(mvAvgLX[0]>=0?(mvAvgLX[0]+1)
>>1: −((−mvAvgLX[0]+1)>>1))

mvAvgLX[1]=(mvAvgLX[1]>=0?(mvAvgLX[1]+1)
>>1:−((−mvAvgLX[1]+1)>>1))

It is noted that the way for averaging luma motion vectors presented herein is not limited as above and that the average function in the present disclosure can be implemented in different ways.

The derivation process for chroma motion vectors in clause 8.5.2.13 presented later in this disclosure is invoked with mvAvgLX and refIdxLX as inputs, and the chroma motion vector mvCLX[xSbIdx][ySbIdx] as output.

2. Another variant of the average vector mvAvgLX calculation in a derivation process for chroma motion vector of the proposed method could be described as follows in the format of the modification of the specification of the VVC draft:

. . .

The average luma motion vector mvAvgLX is derived as follows:

mvAvgLX=mvLX[(xSbIdx>>(SubWidthC−1)<<(SubWidthC−1))]

[(ySbIdx>>(SubHeightC−1)<<(SubHeightC−1))]+
mvLX[(xSbIdx>>(SubWidthC−1)<<(SubWidthC−1))+(1>>(4−SubWidthC−SubHeightC))]

[(ySbIdx>>(SubHeightC−1)<<(SubHeightC−1))+
(1>>(4−SubWidthC−SubHeightC))]

Explanatory notes: the above equation shows an example of selecting luma motion vectors for calculation of average motion vector (e.g. selection of luma subblock positions for a given chroma subblock position). The selected luma subblocks (and thus their respective positions) are represented by their respective subblock indexes in the horizontal direction and in the vertical direction. For example, and as shown above, for a given chroma subblock (xSbIdx, ySbIdx) where xSbIdx and ySbIdx are the subblock indexes of the chroma subblock in the horizontal and vertical direction, respectively, two luma subblocks (and thus their respective positions, e.g. their respective subblock indices) can be selected. One of the two selected luma subblocks can be represented by a subblock index in the horizontal direction as [(xSbIdx>>(SubWidthC−1)<<(SubWidthC−1))] and a subblock index in the vertical direction as [(ySbIdx>>(SubHeightC−1)<<(SubHeightC−1))]. Another selected luma subblock can be represented by a subblock index in the horizontal direction as [(xSbIdx>>(SubWidthC−1)<<(SubWidthC−1))+(1>>(4−SubWidthC−SubHeightC))] and a subblock index in the vertical direction as [(ySbIdx>>(SubHeightC−1)<<(SubHeightC−1))+(1>>(4−SubWidthC−SubHeightC))]). Accordingly, the selection of the luma blocks for averaging luma motion vectors is dependent on the picture chroma format. In particular, selection of the luma blocks for averaging luma motion vectors, is dependent on the chroma scaling factors SubWidthC and SubHeightC which are determined based on the picture chroma format.

Compared with the first variant, this variant uses different ways to determine the set of luma subblocks. In particular, 1>>(4−SubWidthC−SubHeightC) is used to determine the index of the second luma subblock (the neighboring luma subblock of the first luma subblock) in this variant, whereas 1>>(2−SubWidthC) and 1>>(2−SubHeightC) are used in the first variant. In the first variant, the first luma subblock itself, its diagonal neighbor, or its horizontal neighbor may be used as the second subblock. In the second variant, either the first luma subblock itself or its diagonal neighbor can be used as the second luma subblock depending on the values of the chroma scaling factor.

The mvAvgLX obtained above can be further processed by:

mvAvgLX[0]=(mvAvgLX[0]>=
0?(mvAvgLX[0]+1)>>1:−
((−mvAvgLX[0]+1)>>1))

mvAvgLX[1]=(mvAvgLX[1]>=
0?(mvAvgLX[1]+1)>>1:−
((−mvAvgLX[1]+1)>>1))

The derivation process for chroma motion vectors in clause 8.5.2.13 is invoked with mvAvgLX and refIdxLX as inputs, and the chroma motion vector mvCLX[xSbIdx] [ySbIdx] as output.

. . .

It is noted that the way for averaging luma motion vectors presented herein is not limited as above and that the average function in the present disclosure can be implemented in different ways.

3. Another variant of a derivation process for chroma motion vector of the proposed method could be described as follows in the format of the modification of the specification of the VVC draft:

. . .

The average luma motion vector mvAvgLX is derived as follows:

mvAvgLX=mvLX[(xSbIdx>>(SubWidthC−1)<<(SubWidthC−1))][(ySbIdx>>(SubHeightC−1)<<(SubHeightC−1))]

The derivation process for chroma motion vectors in clause 8.5.2.13 is invoked with mvAvgLX and refIdxLX as inputs, and the chroma motion vector mvCLX[xSbIdx] [ySbIdx] as output.

. . .

4. Another variant of a derivation process for a chroma motion vector of the proposed method could be described as follows in the format of the modification of the specification of the VVC draft:

. . .

The average luma motion vector mvAvgLX is derived as follows:

---

If SubWidthC==1 and SubHeightC==1:
    mvAvgLX = mvLX[xSbIdx][ySbIdx]
Otherwise
    xSbIdxL = (xSbIdx >> (SubWidthC − 1)) << (SubWidthC − 1);
    ySbIdxL = (ySbIdx >> (SubHeightC − 1)) << (SubHeightC − 1).

-continued mvAvgLX = mvLX[ xSbIdxL ][ ySbIdxL ] + mvLX[ xSbIdxL + (SubWidthC−1) ][ ySbIdxL+ (SubHeightC−1) ]

Explanatory notes: the above equation shows an example of selecting luma motion vectors for average motion vector calculation (e.g. selection of luma subblock positions for a given chroma subblock position). The selected luma subblocks (and thus their respective positions) are represented by their respective subblock indexes in the horizontal direction and in the vertical direction. For example, and as shown above, for a given chroma subblock (xSbIdx, ySbIdx) where xSbIdx and ySbIdx are the subblock indexes of the chroma subblock in the horizontal and vertical direction, respectively, two luma subblocks (and thus their respective positions, e.g. their respective subblock indices) can be selected. One of the two selected luma subblocks can be represented by a subblock index in the horizontal direction as [(xSbIdx>>(SubWidthC−1)<<(SubWidthC−1))] and a subblock index in the vertical direction as [(ySbIdx>>(SubHeightC−1)<<(SubHeightC−1))]. Another selected luma subblock can be represented by a subblock index in the horizontal direction as [(xSbIdx>>(SubWidthC−1)>>(SubWidthC−1))+(SubWidthC−1)] and a subblock index in the vertical direction as [(ySbIdx>>(SubHeightC−1)<<(SubHeightC−1))+(SubHeightC−1)]). Accordingly, the selection of the luma blocks for averaging luma motion vectors is dependent on the picture chroma format. In particular, selection of the luma blocks for averaging luma motion vectors is dependent on the chroma scaling factors SubWidthC and SubHeightC which are determined based on the picture chroma format.

The mvAvgLX obtained above can be further processed by:

mvAvgLX[0]=mvAvgLX[0]>=0?mvAvgLX[0]>>1−((−mvAvgLX[0])>>1)

mvAvgLX[1]=mvAvgLX[1]>=0?mvAvgLX[1]>>1−((−mvAvgLX[1])>>1)

It is noted that the way for averaging luma motion vectors presented herein is not limited as above and that the average function in the present disclosure can be implemented in different ways.

The details of determination of luma subblock positions, for example, further details in determination of the chroma motion vector for different chroma formats, will be explained in combination with FIG. 10A-10C and FIGS. 11A-11C as below.

Figure 10A:
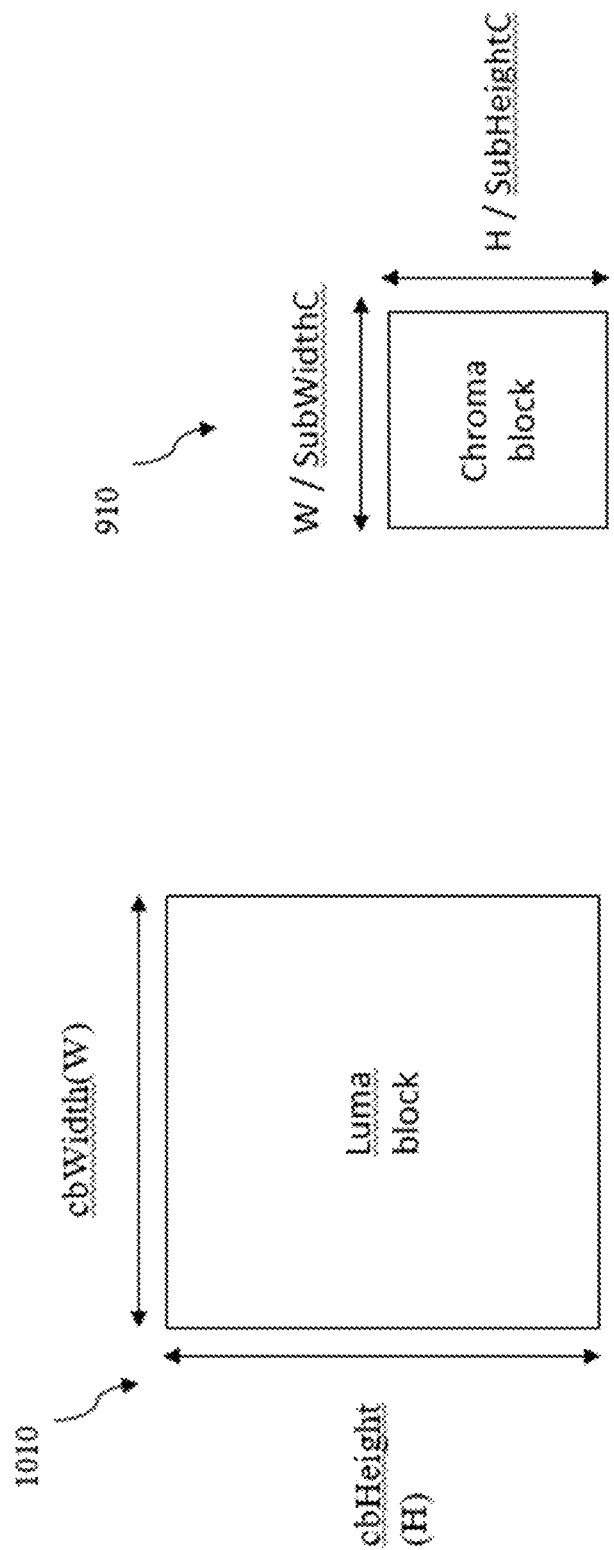
FIG. 10A shows an example illustrating co-located luma and chroma blocks which are included in a current image block of a current picture, where the chroma format of the current picture is 4:2:0.

FIG. 10A shows an example illustrating co-located luma and chroma blocks which are included in a current image block (e.g. a coding block) of a current picture, where the chroma format of the current picture is 4:2:0. As shown in FIG. 10A and table 1-1, when the chroma format of the current picture is 4:2:0, the SubWidthC=2 and SubHeightC=2. If the width of the luma block is W and the height of the luma block is H, the width of the corresponding chroma block is W/SubWidthC and the height of a corresponding chroma block is H/SubHeightC. Specifically, for the current image block comprising the co-located luma and chroma blocks, the luma block generally contains four times the number of samples of the corresponding chroma block.

Figure 10B:
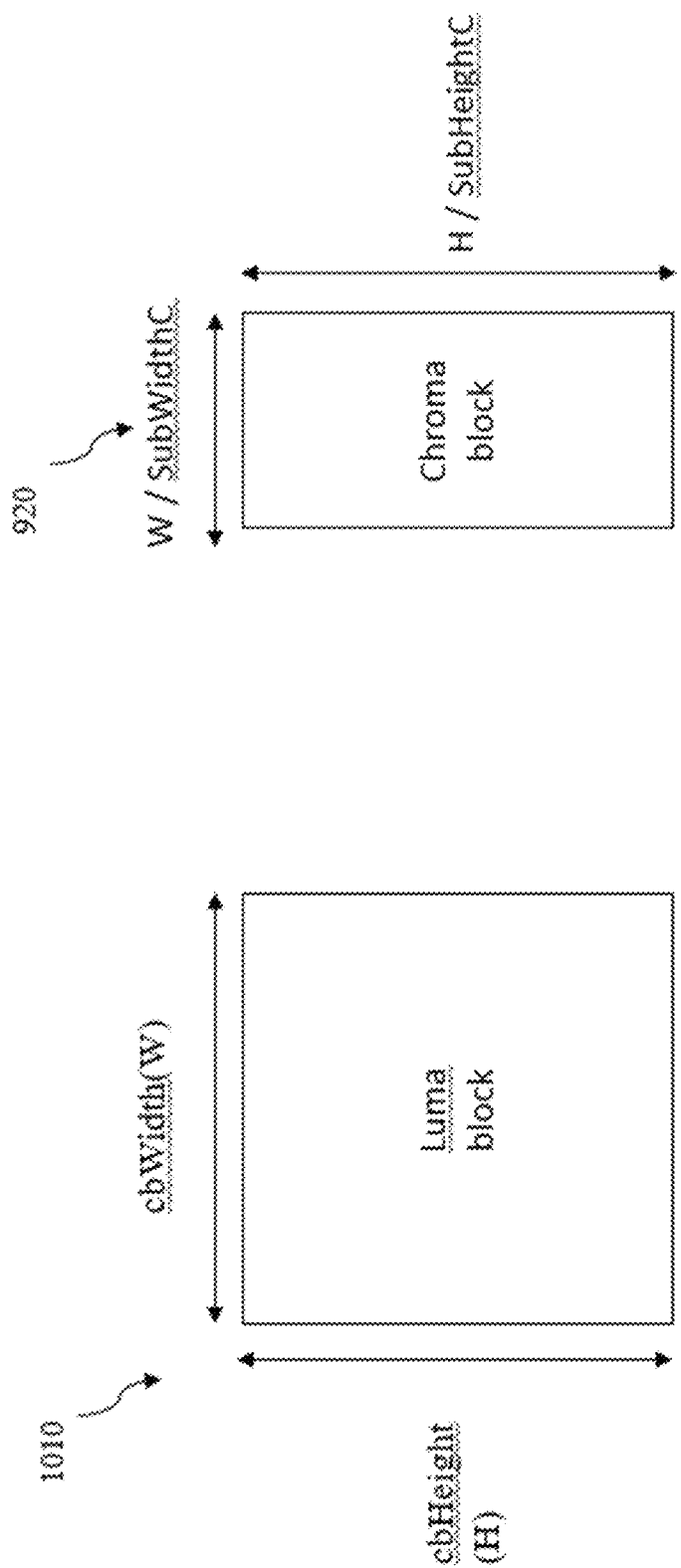
FIG. 10B shows an example illustrating co-located luma and chroma blocks which are included in a current image block of a current picture, where the chroma format of the current picture is 4:2:2.

FIG. 10B is an example illustrating co-located luma and chroma blocks which are included in a current image block of a current picture, where the chroma format of the current picture is 4:2:2. As shown in FIG. 10B and table 1-1 or 1-2, when the chroma format of the current picture is 4:2:2, the SubWidthC=2 and SubHeightC=1. If the width of the luma block is W and the height of the luma block is H, the width of the corresponding chroma block is W/SubWidthC and the height of a corresponding chroma block is H/SubHeightC. Specifically, for the current image block comprising the co-located luma and chroma blocks, the luma block generally contains two times the number of samples of the corresponding chroma block.

Figure 10C:
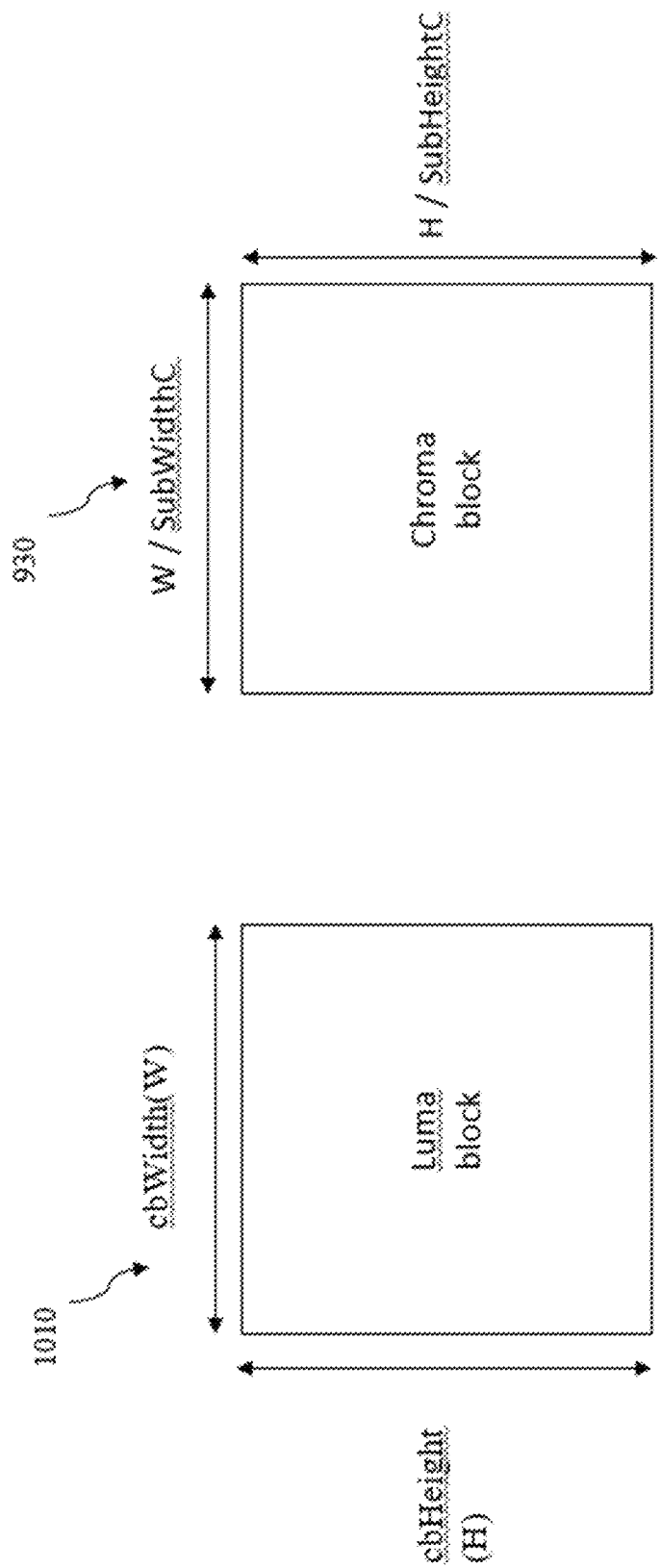
FIG. 10C shows an example illustrating co-located luma and chroma blocks which are included in a current image block of a current picture, where the chroma format of the current picture is 4:4:4.

FIG. 10C is an example illustrating co-located luma and chroma blocks which are included in a current image block of a current picture where the chroma format of the current picture is 4:4:4. As shown in FIG. 10C and table 1-1 or 1-2, when the chroma format of the current picture is 4:4:4, the SubWidthC=1 and SubHeightC=1. If the width of the luma block is W and the height of the luma block is H, the width of the corresponding chroma block is W/SubWidthC and the height of a corresponding chroma block is H/SubHeightC. Specifically, for the current image block comprising the co-located luma and chroma blocks, the luma block generally contains the same number of samples of the corresponding chroma block.

Figure 11A:
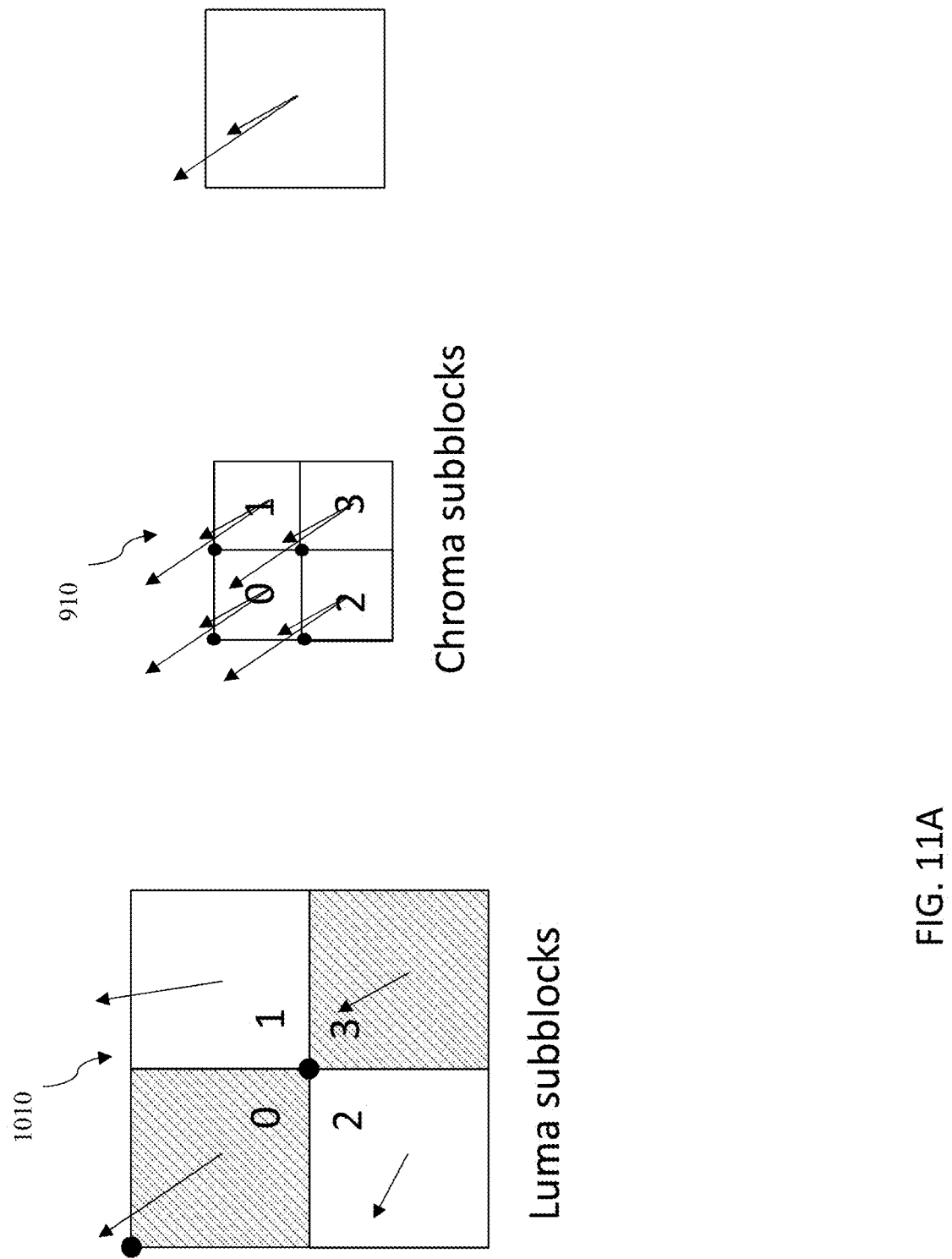
FIG. 11A is an example illustrating positions of two luma subblocks for a given position of a chroma subblock during chroma motion vectors derivation from luma motion vectors when the chroma format of the current picture is 4:2:0 as shown in FIG. 10A.

FIG. 11A is an example illustrating positions of two luma subblocks for a given position of a chroma subblock during chroma motion vectors derivation from luma motion vectors when the chroma format of the current picture is 4:2:0 as shown in FIG. 10A.

The x and y indices of the co-located luma subblock are determined using corresponding x and y indices of the chroma subblock (denoted as xSbIdx, ySbIdx):

xSbIdxL=(xSbIdx>>(SubWidthC−1))<<(SubWidthC−1);

ySbIdxL=(ySbIdx>>(SubHeightC−1))<<(SubHeightC−1).

Two affine luma subblocks are selected for further averaging of their motion vectors. Positions of these two subblocks are defined as:

(xSbIdxL,ySbIdxL) and (xSbIdxL+(SubWidthC−1),ySbIdxL+(SubHeightC−1)).

As shown in FIG. 11A, in the case of YUV 4:2:0 format, motion vectors of two luma sub-blocks of a luma block 1010 (8×8 luma size) on diagonal are used for averaging, and the averaged MV is used for affine sub-block motion vector derivation process for chroma subblock. In particular,
Index of the luma subblock or chroma subblock 0: xSbIdx=0, ySbIdx=0,
Index of the luma subblock or chroma subblock 1: xSbIdx=1, ySbIdx=0
Index of the luma subblock or chroma subblock 2: xSbIdx=0, ySbIdx=1, and
Index of the luma subblock or chroma subblock 3: xSbIdx=1, ySbIdx=1.

Following the variant 4 design, motion vector of each chroma sublock is derived based on an averaged value, and the averaged value is obtained based on the motion vector of the luma sublock 0 (mvLX[0][0]) and the luma sublock 3 (mvLX[1][1]) which are diagonal.

Figure 11B:
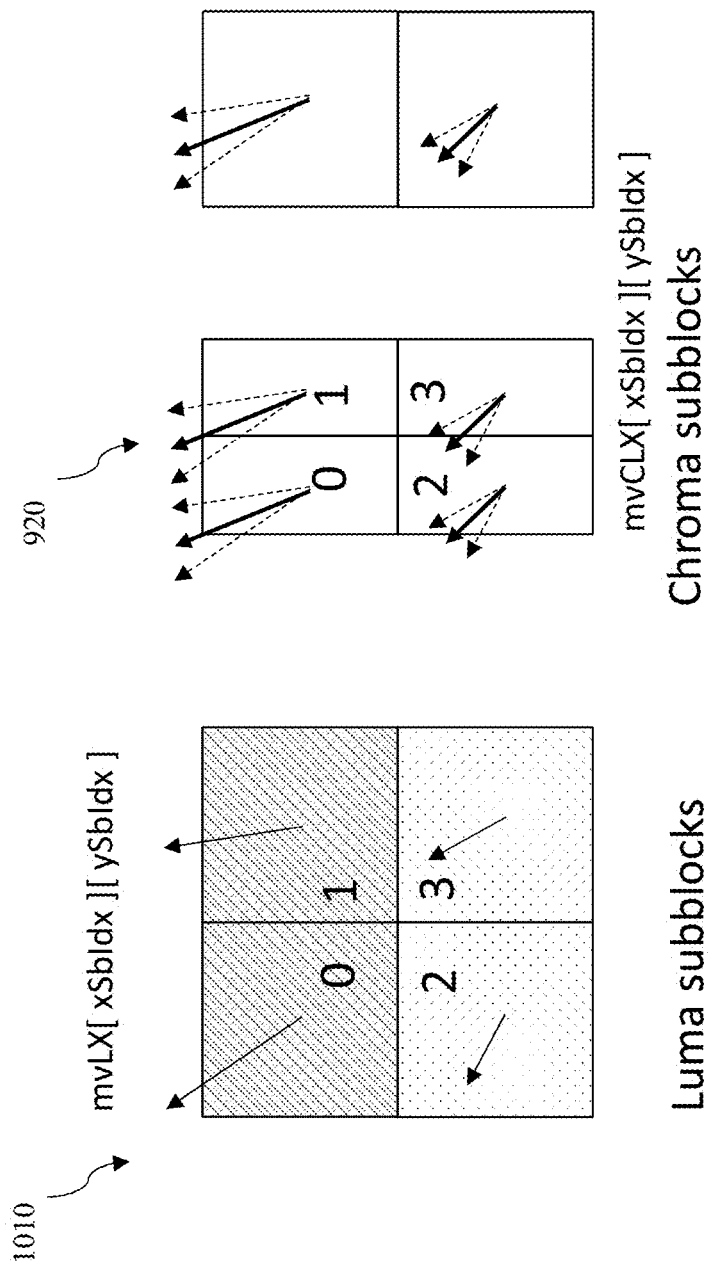
FIG. 11B is an example illustrating positions of two luma subblocks for a given position of a chroma subblock during chroma motion vectors derivation from luma motion vectors when the chroma format of the current picture is 4:2:2 as shown in FIG. 10B.

FIG. 11B is an example illustrating positions of two luma subblocks for a given position of a chroma subblock during chroma motion vectors derivation from luma motion vectors when the chroma format of the current picture is 4:2:2 as shown in FIG. 10B. As shown in FIG. 11B, in the case of YUV 4:2:2 format, motion vectors of two horizontally-adjacent luma sub-blocks of a luma block 1010 (8×8 luma size) are used for averaging, and the averaged MV is used for affine sub-block motion vector derivation process for chroma subblock. In particular, Index of the luma subblock or chroma subblock 0: xSbIdx=0, ySbIdx=0,
Index of the luma subblock or chroma subblock 1: xSbIdx=1, ySbIdx=0,
Index of the luma subblock or chroma subblock 2: xSbIdx=0, ySbIdx=1, and
Index of the luma subblock or chroma subblock 3: xSbIdx=1, ySbIdx=1.

Following the above variant 4 design, the motion vector of each chroma sublock on the first row of a chroma block 920 is derived based on an averaged value, and the averaged value is obtained based on the motion vectors of the luma sublock 0 (mvLX[0][0]) and the luma sublock 1 (mvLX[1][0]) which are horizontally adjacent. The motion vector of each chroma sublock on the second row of the chroma block 920 is derived based on averaged value, and the averaged value is obtained based on the motion vectors of the luma sublock 2(mvLX[0][1]) and the luma sublock 3 (mvLX[1][1]) which are horizontally adjacent.

Figure 11C:
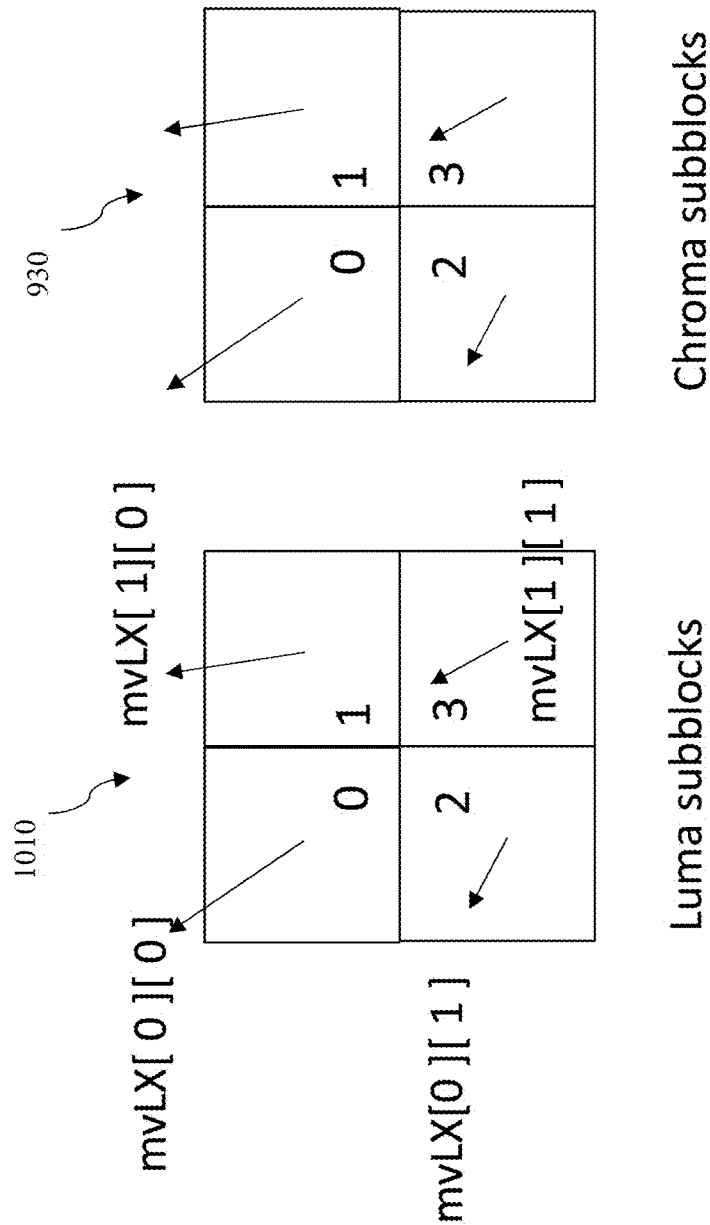
FIG. 11C is an example illustrating a position of a luma subblock for a given position of a chroma subblock during chroma motion vectors derivation from luma motion vectors when the chroma format of the current picture is 4:4:4 as shown in FIG. 10C.

FIG. 11C is an example illustrating a position of a luma subblock for a given position of a chroma subblock during chroma motion vectors derivation from luma motion vectors when the chroma format of the current picture is 4:4:4 as shown in FIG. 10C.

As shown in FIG. 11C, in the case of YUV 4:4:4 format, the motion vector(s) of the co-located luma subblock of a luma block 1010 (8×8 luma size) is used for each chroma subblock to perform affine prediction, i.e., a affine sub-block motion vector derivation process for chroma is same as that for luma.

It should be understood that no averaging is required, i.e. the motion vector can be determined by using the motion vector of the co-located luma sub-block or this averaging operation will take as an input the same MV twice and generate the same motion vector as the output. The luma or chroma subblock size may be 4×4 size.

Figure 12A:
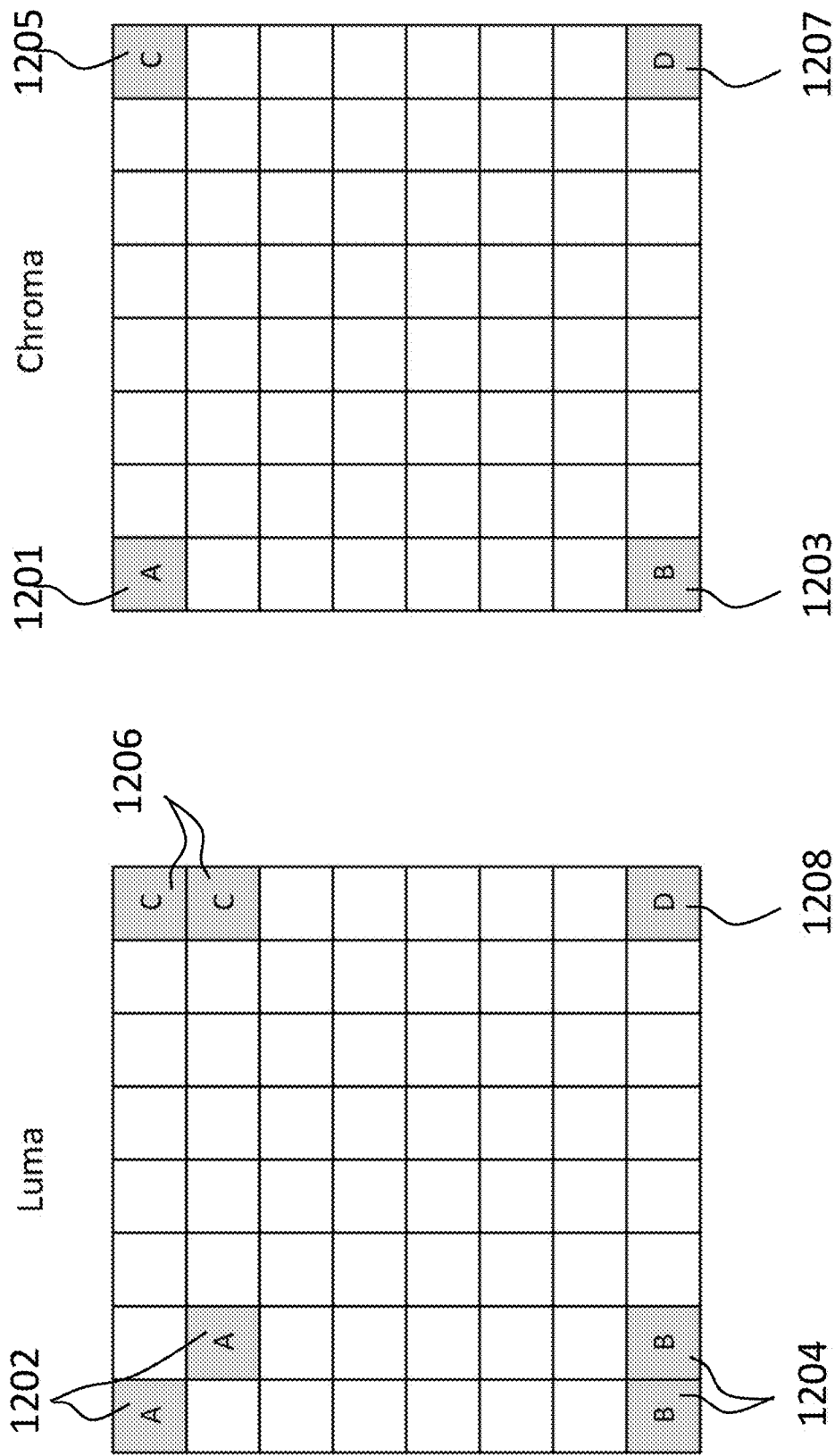
FIG. 12A shows various examples of a subset S that comprises positions of luma subblocks for a given position of chroma subblock when the chroma format is set to 4:4:4.

FIG. 12A shows several examples of a subset S that comprises positions of luma subblocks for the given position of chroma subblock when the chroma format is set to 4:4:4. In this example, four cases of subset S derivation are considered.

In a first case, a chroma position "A" (1201) has corresponding neighboring luma blocks located at positions "A" (1202).

In a second case, a chroma position "B" (1203) is selected on the bottom boundary of the chroma block. In this case (except for the right-bottom position), the corresponding positions 1204 of luma subblocks belonging to S are selected to be horizontally-adjacent.

In a third case, a chroma position "C" (1205) is selected on the right boundary of the chroma block. In this case (except for the right-bottom position), the corresponding positions 1206 of luma subblocks belonging to S are selected to be vertically-adjacent.

In a fourth case, a chroma position "D" (1207) is selected on the bottom-right corner of the chroma block. In this case, the set S comprises a single luma subblock that is located at the bottom-right corner of the luma block.

Figure 12B:
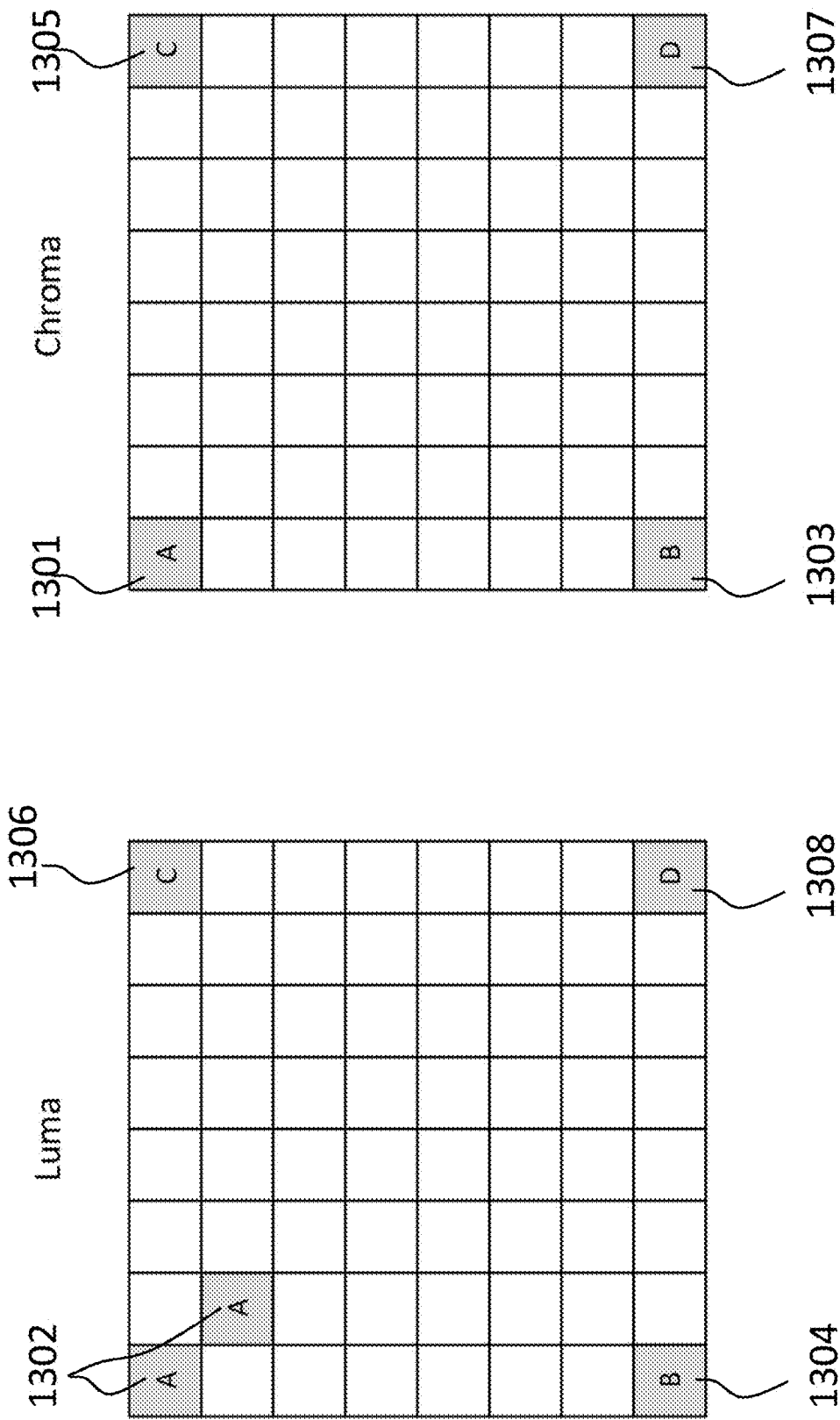
FIG. 12B shows various examples of a subset S, in which chroma subblocks located on the boundary of a chroma block have corresponding positions in the luma block as in the fourth case "D" shown in FIG. 12A.

FIG. 12B shows another embodiment of obtaining a subset S. In this embodiment, chroma blocks located on the boundary of chroma block have corresponding positions in the luma block as in the fourth case "D" shown in FIG. 12A.

In the embodiments of the present disclosure described above, the number of chroma subblocks are the same as the number of co-located luma subblocks in case when chroma subsampling is used. In particular, the number of luma subblocks in the horizontal direction numSbX is the same as the number of chroma subblocks in the horizontal direction numSbX, and the number of luma subblocks in the vertical direction numSbY is the same as the number of chroma subblocks in vertical direction numSbY. Accordingly, chroma subblock sizes are different from the sizes of co-located luma subblocks in case when chroma subsampling is used.

In other scenarios, the sizes of the chroma subblocks and luma subblocks are kept the same regardless of the chroma format. In these scenarios, the number of chroma subblocks in a chroma block and the number of luma subblocks in a co-located luma block can be different. The following embodiment is directed to the chroma motion vector derivation for subblocks of the same size for chroma and luma component. That is, for a current picture comprising a current image block comprising co-located luma and chroma blocks, the luma block of the current picture includes a set of equally sized luma subblocks, and the chroma block of the current picture includes a set of equally sized chroma subblocks, and the size of a chroma subblock is set to be equal to the size of a luma subock. It can be understood that the number of chroma subblocks are different from the number of co-located luma subblocks in case when chroma subsampling is used. In particular, the number of luma subblocks along the horizontal direction, numSbX, is different from the number of chroma subblocks along the horizontal direction, numSbX, and the number of luma subblocks along the vertical direction, numSbY, is different from the number of chroma subblocks along the vertical direction, numSbY.

Figure 13A:
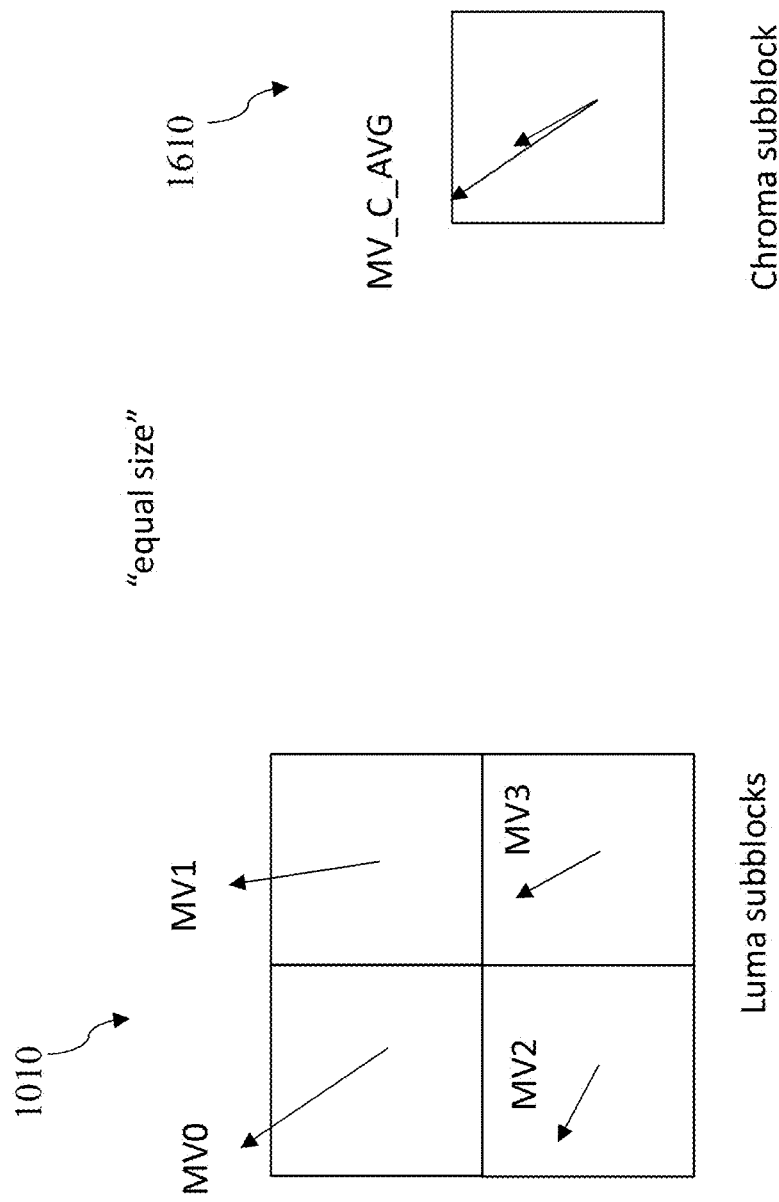
FIG. 13A shows an example illustrating the selection of two luma subblocks to derive the motion vector for a given chroma subblock during chroma motion vectors derivation from luma motion vectors when the chroma format of the current picture is 4:2:0.

As shown in FIG. 13A, in the case of YUV 4:2:0 format, for example, the luma block of the current picture has a size of 8×8, four equally sized luma subblocks are included in the luma block, and a set of equally sized chroma subblocks are included in the chroma block of the current picture (a chroma subblock=the chroma block), wherein the size of a chroma subblock is set to be equal to the size of a luma subblock. Motion vectors of two luma sub-blocks on diagonal are averaged, and the averaged MV is used for affine sub-block motion vector derivation process for the chroma subblock. In particular, since the number of subblocks is different, xSbIdx (the subblock index of the luma subblock in the horizontal direction) would change with a step size of SubWidth and ySbIdx (the subblock index of the luma subblock in the vertical direction) would change with a step size of SubHeightC. For example, for the 4:2:0 format, xSbIdx=0, 2, 4, 6 . . . , and ySbIdx=0, 2, 4, 6 . . . .

Figure 13B:
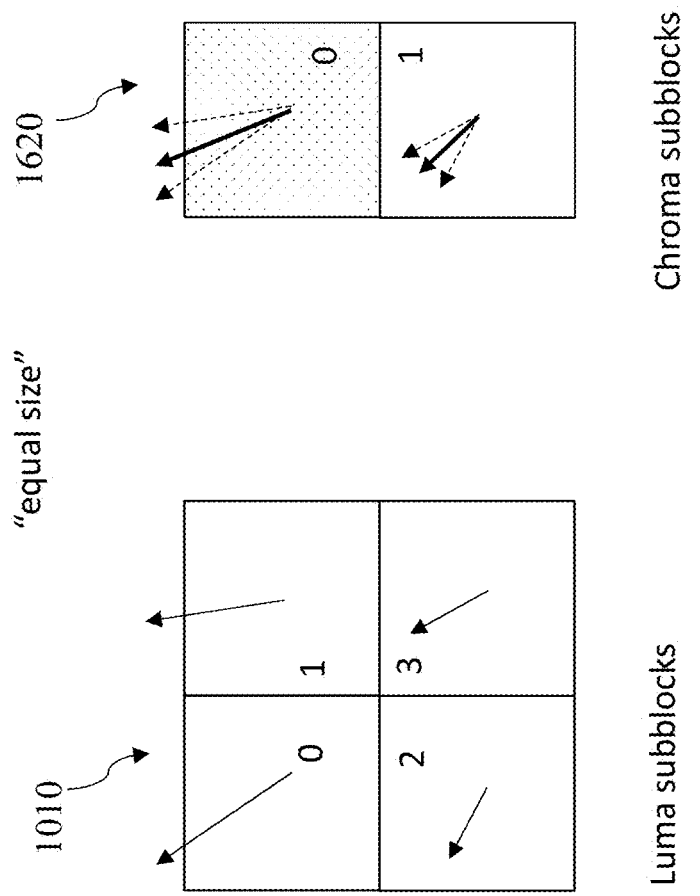
FIG. 13B shows an example illustrating the selection of two luma subblocks for a given chroma subblock during chroma motion vectors derivation from luma motion vectors when the chroma format of the current picture is 4:2:2.

As shown in FIG. 13B, in the case of YUV 4:2:2 format, motion vectors of two horizontally-adjacent luma sub-blocks are used for averaging according to equation of the above variant 4 in order to generate the motion vector for a chroma sub-block. The averaged MV is used for affine sub-block motion vector derivation process for the chroma subblock. In particular, since the number of subblocks is different, xSbIdx would change with a step size of SubWidth and ySbIdx would change with a step size of SubHeightC. For example, for 4:2:2, xSbIdx=0, 2, 4, 8 . . . and ySbIdx=0, 1, 2, 3 . . . .

Figure 13C:
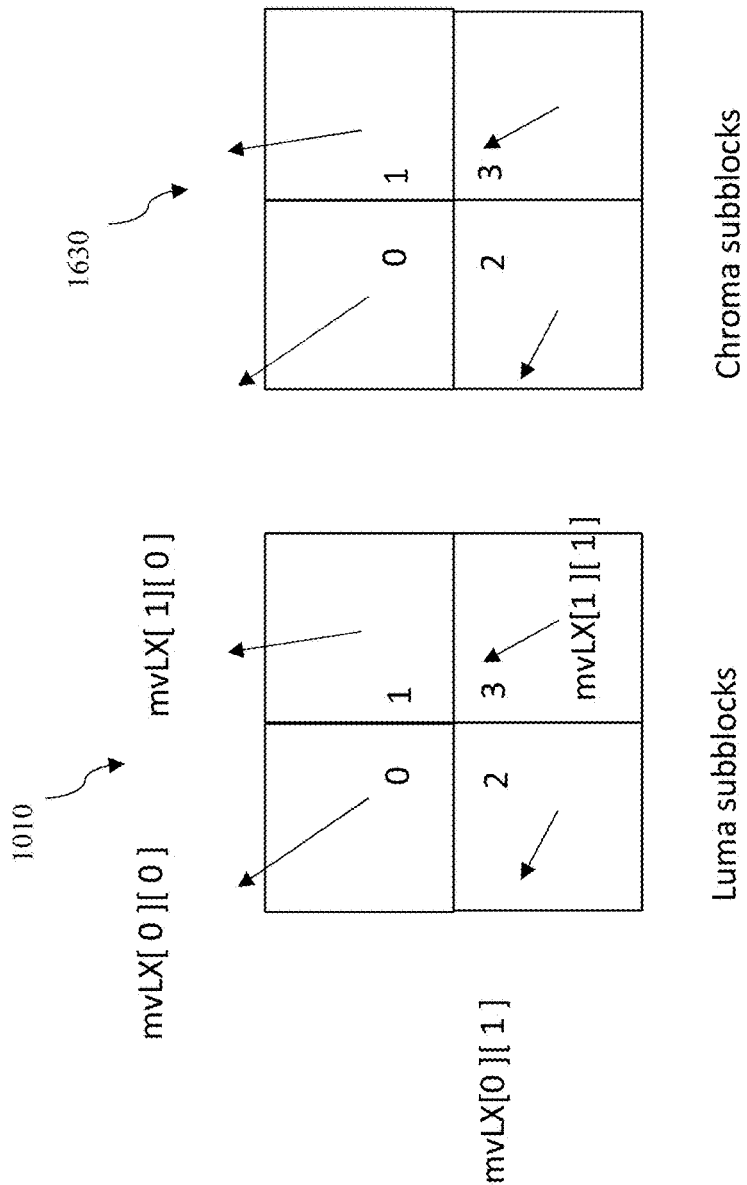
FIG. 13C shows an example illustrating the selection of a luma subblock for a given chroma subblock during chroma motion vectors derivation from luma motion vectors when the chroma format of the current picture is 4:4:4.

As shown in FIG. 13C, in the case of YUV 4:4:4 format, both number and size are equal for luma subblocks and chroma subblocks. In this case, for each chroma subblock, the motion vector(s) of the co-located luma subblock is used to perform affine prediction. In other words, the affine sub-block motion vector derivation process for the chroma block is same as that for the luma block. For example, for the 4:4:4 format, xSbIdx=0, 1, 2, 3 . . . and ySbIdx= 0, 1, 2, 3 . . . . It should be noted that in this case, the averaging operation specified in equation of the above variant 4 does not need to be performed because the two sub-blocks used for averaging are the same and the averaging operation would output the same value as the input. As such, in this case, the motion vector of the luma subblock can be selected for the chroma subblock without going through the averaging operation formulated in equation of any previous variant.

Figure 14A:
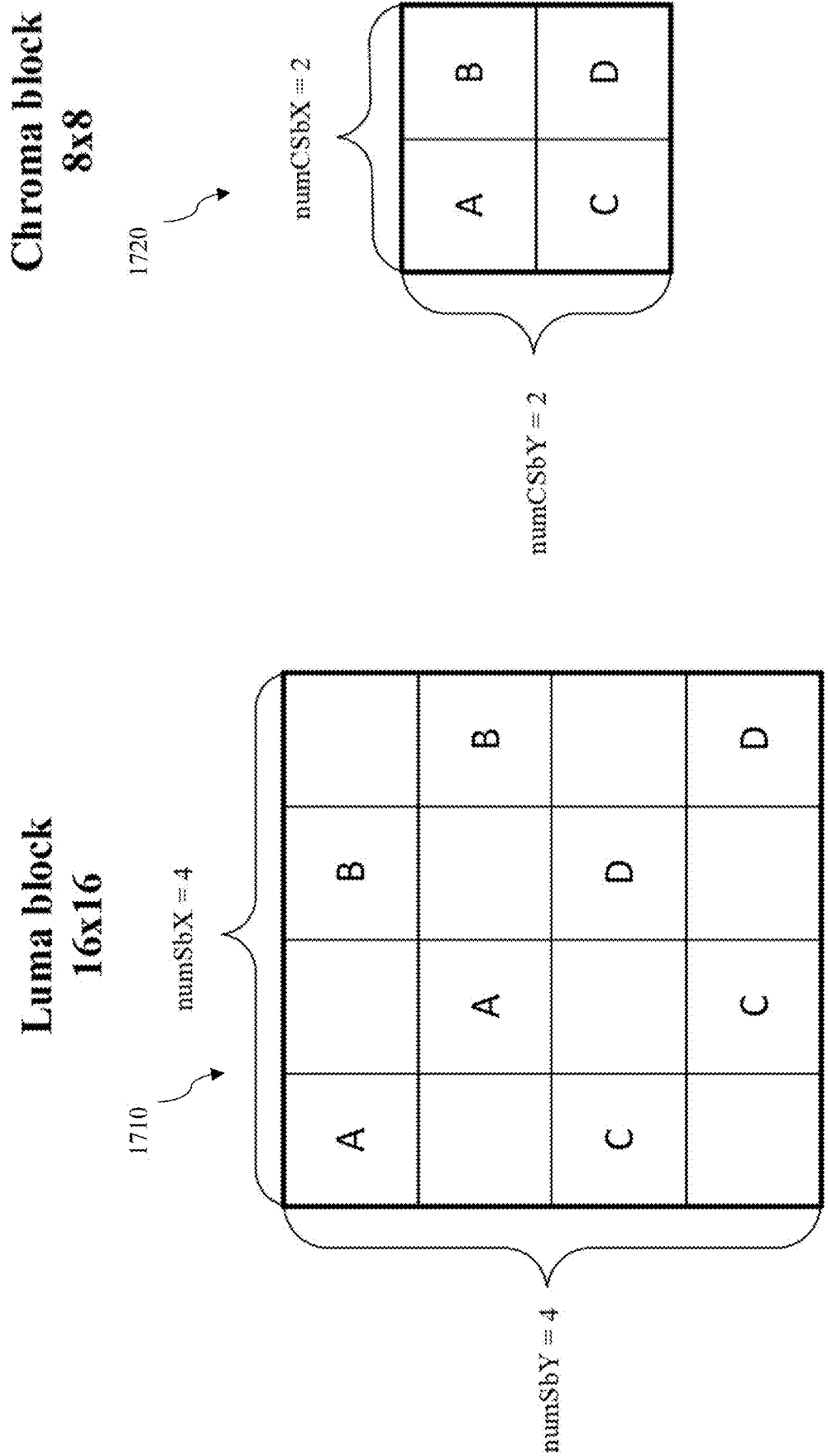
FIG. 14A shows an example of subdivision of a 16×16 luma block into subblocks and the subdivision of a chroma block co-located with the luma block when the chroma format is YUV 4:2:0.

From the above, it can be seen that a block will have a number of chroma subblocks that differs from the number of luma subblocks when SubWidthC is greater than 1 or SubHeightC is greater than 1. FIG. 14A shows an example of subdivision of a 16×16 luma block and the subdivision of a collocated chroma block for the YUV 4:2:0 chroma format. In this example, the luma block is divided into 16 subblocks each having a size of 4×4. The chroma block has a size of 8×8 samples and is subdivided into a total of 4 subblocks each having a size of 4×4 samples. These 4 chroma subblocks are grouped into 2 rows with each row having 2 subblocks. Letters "A", "B", "C" and "D" indicate which luma subblocks are used to derive a motion vector for a corresponding chroma subblock denoted with the same letter.

Figure 14B:
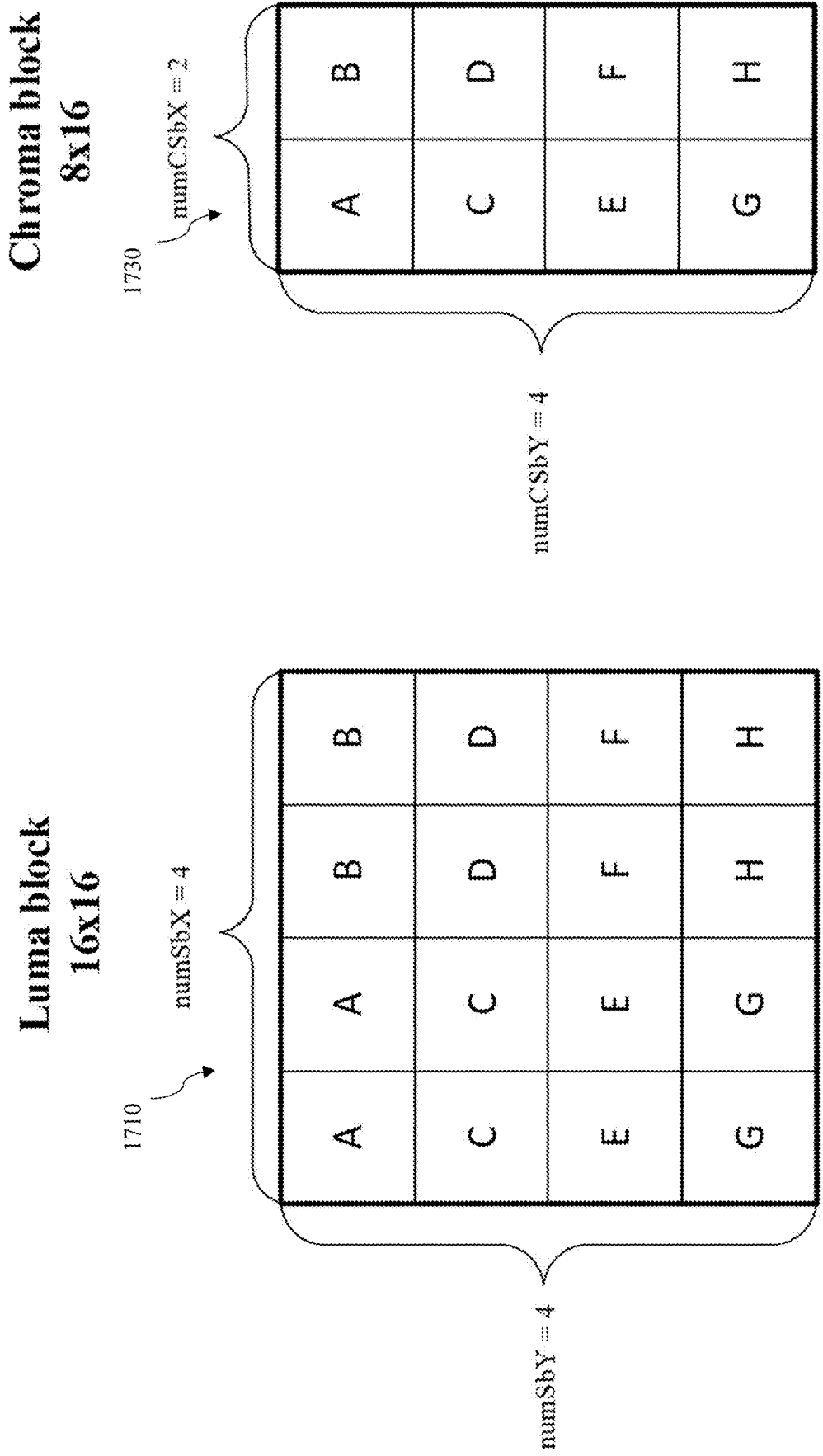
FIG. 14B shows an example of subdivision of a 16×16 luma block into subblocks and the subdivision of a chroma block co-located with the luma block when the chroma format is YUV 4:2:2.
Figure 14C:
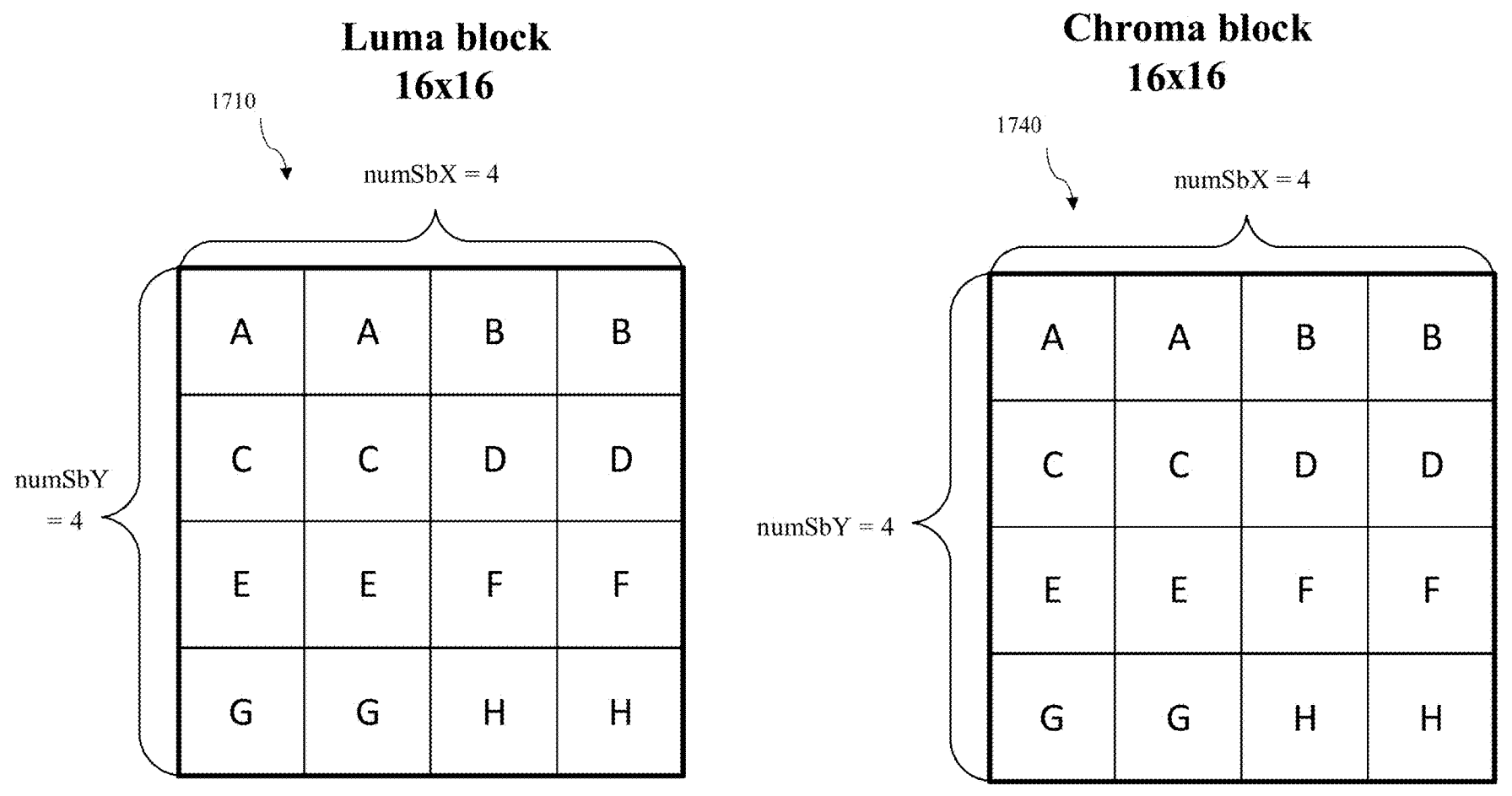

FIG. 14B illustrates the subdivision of a 16×16 luma block and its co-located chroma block in a picture having a YUV 4:2:2 chroma format. In this case, the chroma block has a size of 8×16 samples and is subdivided into a total of 8 subblocks grouped into 4 rows with each row having 2 subblocks. Each luma subblock and chroma subblock has a size of 4×4 samples. Letters "A", "B", "C", "D", "E", "F", "G" and "H" indicate which luma subblocks are used to derive a motion vector for a corresponding chroma subblock denoted with the same letter.

Assuming that the luma block is subdivided into numSbY rows of subblocks, each row having numSbX subblocks, and that a motion vector is specified or obtained for each of the luma subblocks, the embodiment presented herein could be specified as follows:
1. The first step is to determine values of SubWidthC and SubHeightC based on the chroma format information indicating the chroma format of the current coding or decoding picture (or frame). For example, the chroma format information can be contain information presented in the above table 1-1 or 1-2.
2. The second step may include: obtaining the number of chroma subblocks along the horizontal direction, numCSbX, and the number of chroma subblocks along the vertical directions, numCSbY, as follows:

numCSb$X$=numSb$X$>>(SubWidth$C$−1), wherein
    numSb$X$ is the number of luma subblocks in a luma block along the horizontal direction;

numCSb$Y$=numSb$Y$>>(SubHeight$C$−1), wherein
    numSb$Y$ is the number of luma subblocks in the luma block along the vertical direction.

The luma block can be a currently encoding or decoding block of a currently coding or decoding picture.
3. Denoting a chroma subblock located on row yCSbIdx and column xCSbIdx using the spatial indices (xCSbIdx, yCSbIdx), where xCSbIdx=0, . . . , numCSbX−1 and yCSbIdx=0 . . . numCSbY−1, the value of the chroma motion vector for the chroma subblock can be determined as follows:

Spatial indices (xSbIdxL, ySbIdxL) of the co-located luma subblock are determined as follows:

$x$SbIdxL=$x$CSbIdx<<(SubWidth$C$−1);

$y$SbIdxL=$y$CSbIdx<<(SubHeight$C$−1).

Spatial position of a chroma subblock (sbX, sbY) within a chroma block could be derived using spatial indices (xCSbIdx, yCSbIdx) as follows:

sb$X$=$x$CSbIdx*sb$X$;

sb$Y$=$y$CSbIdx*sb$Y$.

The same applies to determination of a spatial position for luma subblock within a luma block spatial indices (xSbIdx, ySbIdx) of a luma subblock:

sb$X$=$x$SbIdx*sb$X$;

sb$Y$=$y$SbIdx*sb$Y$.

The determined spatial indices of the collocated luma subblock (xSbIdxL, ySbIdxL) can be further used in determination of the chroma motion vector. For example, a set of luma subblocks can be defined as described below:

$S_0 = (x\text{SbIdx}_L, y\text{SbIdx}_L)$ $S_1 = (x\text{SbIdx}_L + (\text{SubWidth}C-1), y\text{SbIdx}_L + (\text{SubHeight}C-1))$ In this example, the set of luma subblocks includes two subblocks indexed by $S_0$ and $S_1$ calculated above. Each of $S_0$ and $S_1$ includes a pair of spatial indices defining a subblock position.

The set of luma subblocks is used to calculate the average motion vector mvAvgLX. Here and in motion vector denotations used in the following, X could be either 0 or 1, correspondingly indicating reference list index for a motion vector being either L0 or L1. L0 indicates a reference list 0, and L1 indicates a reference list 1. It is assumed that calculations of a motion vector is performed by apply corresponding formulas independently to horizontal component mvAvgLX[0] and vertical component mvAvgLX[1] of the motion vector.

If a luma motion vector of a subblock with spatial indices (xSbIdx$_L$, ySbIdxL) is denoted as mvLX[xSbIdx$_L$][ySbIdxL], average motion vector mvAvgLX could be obtained as follows:

$$mvAvgLX = \sum_i mvLX[S_i^x][S_i^y]$$

$mvAvgLX = mvAvgLX >= 0\ ?\ mvAvgLX >> 1 : -((-mvAvgLX) >> 1)$ where $S_i^x$ and $S_i^y$ are horizontal and vertical spatial indices of an element Si as discussed above, wherein i=0, 1 . . . .

The motion vector of a chroma subblock mvCLX with spatial indices (xCSbIdx, yCSbIdx) is obtained from the average motion vector mvAvgLX as follows:

mvCLX[0]=mvAvgLX[0]*2/SubWidth$C$ mvCLX[1]=mvAvgLX[1]*2/SubHeight$C$

The details of the derivation process for the luma and chroma motion vector according to the embodiments presented herein are described as follows in the format of a part of the specification of the VVC draft:

8.5.5.9 Derivation Process for Motion Vector Arrays from Affine Control Point Motion Vectors Inputs to this process are:
a luma location (xCb, yCb) of the top-left sample of the current luma coding block relative to the top-left luma sample of the current picture,
two variables cbWidth and cbHeight specifying the width and the height of the luma coding block, respectively,
the number of control point motion vectors numCpMv,
the control point motion vectors cpMvLX[cpIdx], with cpIdx=0 . . . numCpMv−1 and X being 0 or 1,
the reference index refIdxLX and X being 0 or 1,
the number of luma coding subblocks in horizontal direction (numSbX) and in vertical direction (numSbY).

Outputs of this process are:
the luma subblock motion vector array mvLX[xSbIdx][ySbIdx] with xSbIdx=0 . . . numSbX−1, ySbIdx=0 . . . numSbY−1 and X being 0 or 1,
the chroma subblock motion vector array mvCLX[xSbIdx][ySbIdx] with xSbIdx=0 . . . numSbX−1, ySbIdx=0 . . . numSbY−1 and X being 0 or 1.

The following assignments are made for x=xCb . . . xCb+cbWidth−1 and y=yCb . . . yCb+cbHeight−1:

$$CpMvLX[x][y][0]=cpMvLX[0]$$

$$CpMvLX[x][y][1]=cpMvLX[1]$$

$$CpMvLX[x][y][2]=cpMvLX[2]$$

The variables log 2CbW and log 2CbH are derived as follows:

$$\log 2CbW=\text{Log }2(cbWidth)$$

$$\log 2CbH=\text{Log }2(cbHeight)$$

The variables mvScaleHor, mvScaleVer, dHorX and dVerX are derived as follows:

$$mvScaleHor=cpMvLX[0][0]<<7$$

$$mvScaleVer=cpMvLX[0][1]<<7$$

$$dHorX=(cpMvLX[1][0]-cpMvLX[0][0])<<(7-\log 2CbW)$$

$$dVerX=(cpMvLX[1][1]-cpMvLX[0][1])<<(7-\log 2CbW)$$

The variables dHorY and dVerY are derived as follows:
If numCpMv is equal to 3, the following applies:

$$dHorY=(cpMvLX[2][0]-cpMvLX[0][0])<<(7-\log 2CbH)$$

$$dVerY=(cpMvLX[2][1]-cpMvLX[0][1])<<(7-\log 2CbH)$$

Otherwise (numCpMv is equal to 2), the following applies:

$$dHorY=-dVerX$$

$$dVerY=dHorX$$

For xSbIdx=0 . . . numSbX−1 and ySbIdx=0 . . . numSbY−1, the following applies:
The luma motion vector mvLX[xSbIdx][ySbIdx] is derived as follows:

$$xPosCb=2+(xSbIdx<<2)$$

$$yPosCb=2+(ySbIdx<<2)$$

$$mvLX[xSbIdx][ySbIdx][0]=(mvScaleHor+dHorX*xPosCb+dHorY*yPosCb)$$

$$mvLX[xSbIdx][ySbIdx][1]=(mvScaleVer+dVerX*xPosCb+dVerY*yPosCb)$$

The rounding process for motion vectors as specified in clause 8.5.2.14 is invoked with mvX set equal to mvLX[xSbIdx][ySbIdx], rightShift set equal to 7, and leftShift set equal to 0 as inputs and the rounded mvLX[xSbIdx][ySbIdx] as output.

The motion vectors mvLX[xSbIdx][ySbIdx] are clipped as follows:

$$mvLX[xSbIdx][ySbIdx][0]=\text{Clip3}(-2^{17},2^{17}-1,mvLX[xSbIdx][ySbIdx][0])$$

$$mvLX[xSbIdx][ySbIdx][1]=\text{Clip3}(-2^{17},2^{17}-1,mvLX[xSbIdx][ySbIdx][1])$$

The variables numCSbX and numCSbY are defined as follows:

$$numCSbX=numCSbX>>(\text{SubWidth}C-1)$$

$$numCSbY=numCSbY>>(\text{SubHeight}C-1)$$

It should be noted that this embodiment is different from previous embodiments. In the previous embodiments, the number of luma subblocks in a luma block and the number of chroma subblocks in the co-located chroma block are same. In this embodiment, however, for chroma formats 4:2:0 and 4:2:2, the number of luma subblocks in a luma block and the number of chroma subblocks in the co-located chroma block are different. Because the number of subblocks is different in the chroma block and the luma block, xSbIdx would change with a step size of SubWidth and ySbIdx would change with a step size of SubHeightC as can be seen from below.

For xCSbIdx=0 . . . numCSbX−1 and yCSbIdx=0 . . . numCSbY−1, the following applies:
The average luma motion vector mvAvgLX is derived as follows:
If SubWidthC==1 and SubHeightC==1

$$mvAvgLX=mvLX[xCSbIdx][yCSbIdx]$$

Otherwise, $$xSbIdx_L=xCSbIdx<<(\text{SubWidth}C-1)$$

$$ySbIdxL=yCSbIdx<<(\text{SubHeight}C-1)$$

$$mvAvgLX=mvLX[xSbIdxL][ySbIdxL]+mvLX[xSbIdxL+(\text{SubWidth}C-1)][ySbIdxL+(\text{SubHeight}C-1)]$$

$$mvAvgLX[0]=mvAvgLX[0]>=0?(mvAvgLX[0])>>1-((-mvAvgLX[0])>>1)$$

$$mvAvgLX[1]=mvAvgLX[1]>=0?(mvAvgLX[1])>>1-((-mvAvgLX[1])>>1)$$

The derivation process for chroma motion vectors in clause 8.5.2.13 presented below is invoked with mvAvgLX and refIdxLX as inputs, and the chroma motion vector array mvCLXSub[xCSbIdx][yCSbIdx] as output.

The chroma subblock motion vector array mvCLX[xSbIdx][ySbIdx] with xSbIdx=0 . . . numSbX−1, ySbIdx=0 . . . numSbY−1 is being derived from mvCLXSub as follows:

$$mvCLX[xSbIdx][ySbIdx]=mvCLXSub[xSbIdx>>(\text{SubWidth}C-1)][ySbIdx>>(\text{SubHeight}C-1)]$$

It should be noted that the averaging operation presented above is for illustration purpose and should not be construed as limiting. Various other ways for performing an averaging operation can be utilized in the determination of the chroma motion vectors from luma motion vectors.

8.5.2.13 Derivation Process for Chroma Motion Vectors 8.5.2.14 Input to this Process are:

a luma motion vector in 1/16 fractional-sample accuracy mvLX, the reference index refIdxLX.

Output of this process is a chroma motion vector in 1/32 fractional-sample accuracy mvCLX.

A chroma motion vector is derived from the corresponding luma motion vector.

The chroma motion vector mvCLX, is derived as follows:

mvCLX[0]=mvLX[0]*2/SubWidthC mvCLX[1]=mvLX[1]*2/SubHeightC

The operations of this derivation process depend on how this process is invoked. For example, previously it has been described that "the derivation process for chroma motion vectors in clause 8.5.2.13 is invoked with mvAvgLX and refIdxLX as inputs, and the chroma motion vector array mvCLXSub[xCSbIdx] [yCSbIdx] as output." In this example, mvLX in section 8.5.2.13 described herein will be replaced with mvAvgLX in order to carry out the operations as it is invoked.

There are additional aspects relating to the embodiments that consider an offset between subsampled positions of chroma samples with respect to the position of luma samples.

Exemplary embodiment is to define or determine a set S of luma subblocks in accordance with the value of "sps_c-clm_colocated_chroma_flag". In specific, When SubHeightC=1 and SubWidthC=2 and sps_cclm_colocated_chroma_flag is set equal to 1, the set S is composed of a single element $S_0$=(xSbIdxL, ySbIdxL)

Otherwise, the set S includes $S_0$=(xSbIdxL,ySbIdxL)

$S_1$=(xSbIdxL+(SubWidthC−1),ySbIdxL+(SubHeightC−1))

Another exemplary embodiment introduces a dependency between the determination of average motion vector and the value of "sps_cclm_colocated_chroma_flag". In particular, weights are introduced in the averaging operations and may be specified differently for different luma subblocks. An exemplary process of average motion vector derivation is as follows:

xSbIdxL=xCSbIdx<<(SubWidthC−1)

ySbIdx$_L$=yCSbIdx<<(SubHeightC−1)

sps_cclm_colocated_chroma_flag is set equal to 1, weighting coefficients w0 and w1 are set as follows: w0=5, w1=3;

mvAvgLX=w0*mvLX[xSbIdx$_L$][ySbIdx$_L$]++
    w1*mvLX[xSbIdx$_L$+(SubWidthC−1)][ySbIdx$_L$+(SubHeightC−1)]

mvAvgLX[0]=mvAvgLX[0]>=
    0?(mvAvgLX[0]+3)>>3:
    −((−mvAvgLX[0]+3)>>3)

mvAvgLX[1]=mvAvgLX[1]>=
    0?(mvAvgLX[1]+3)>>3:
    −((−mvAvgLX[1]+3)>>3)

It should be noted that the averaging operation presented in this example is for illustration purpose and should not be construed as limiting. Various other ways for performing an averaging operation can be utilized in the determination of the chroma motion vectors from luma motion vectors.

Figure 15:
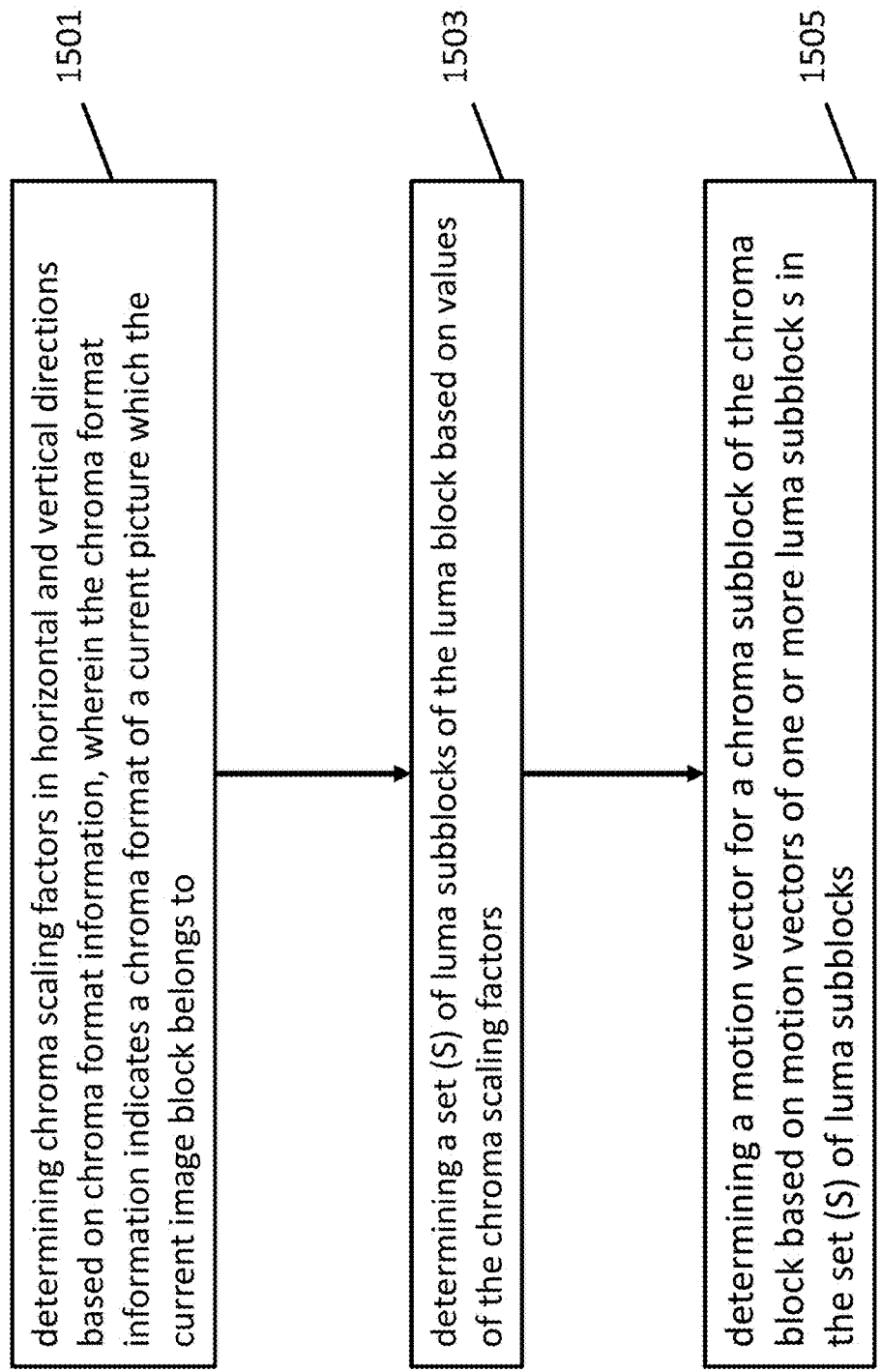
FIG. 15 shows a flow diagram depicting an exemplary process for motion vector derivation for affine based inter prediction of chroma subblocks based on a chroma format according to some aspects of the present disclosure.

FIG. 15 is a flowchart of an example method 1300 for affine based inter prediction of chroma subblocks, the method comprising:

At step 1501, determining chroma scaling factors in horizontal and vertical directions based on chroma format information, wherein the chroma format information indicates a chroma format of a current picture which the current image block belongs to;

At step 1503, determining a set (S) of luma subblocks of the luma block based on values of the chroma scaling factors; and At step 1505, determining a motion vector for a chroma subblock of the chroma block based on motion vectors of one or more luma subblocks in the set (S) of luma subblocks.

Figure 16:
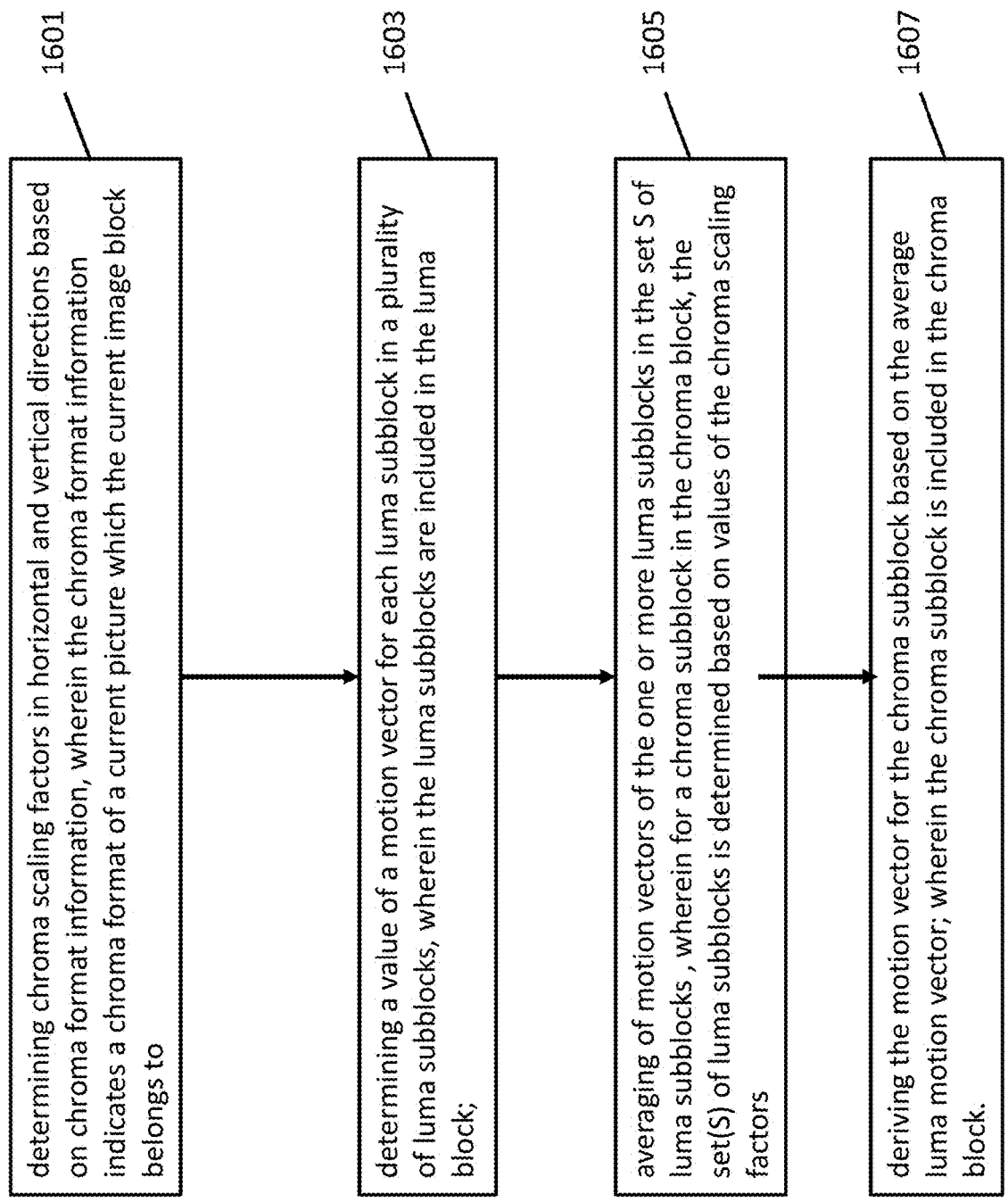
FIG. 16 shows a flow diagram depicting another exemplary process for motion vector derivation for affine based inter prediction of chroma subblocks based on a chroma format according to some aspects of the present disclosure.

FIG. 16 is a flowchart of another example method 1300 for affine based inter prediction of chroma subblocks, the method comprising:

At step 1601, determining chroma scaling factors in horizontal and vertical directions based on chroma format information, wherein the chroma format information indicates a chroma format of a current picture which the current image block belongs to;

At step 1603, determining a value of a motion vector for each luma subblock in a plurality of luma subblocks, wherein the N luma subblocks are included in the luma block;

At step 1605, averaging of motion vectors of the luma subblocks in the set S of luma subblocks, wherein the set (S) is determined based on the chroma scaling factors; and At step 1607, for a chroma subblock in a plurality of chroma subblocks, deriving the motion vector for the chroma subblock based on the average luma motion vector, wherein the chroma subblocks are included in the chroma block.

The present invention discloses a method to consider the chroma format of the picture when obtaining chroma motion vectors from luma motion vectors. By taking an average of luma vectors, linear subsampling of luma motion field is performed. When chroma color planes have the same height as that of a luma plane, it is found more appropriate to select motion vectors from luma blocks that are horizontally adjacent, so that they have the same vertical position. Selection of luma motion vectors depending on a picture chroma format leads to a more accurate chroma motion field due to a more accurate luma motion vector field subsampling. This dependency on a chroma format enables the selection of the most appropriate luma blocks' positions when averaging luma motion vectors. As a consequence of a more accurate motion field interpolation, prediction errors are reduced, which has a technical result in a compression performance improvement.

Further, when a number of chroma subblocks is defined to be equal to the number of luma subblocks, and when a size of a chroma color plane is not equal to a size of a luma plane, motion vectors of adjacent chroma subblocks may assume the same value. When implementing this processing steps, an optimization could be performed by skipping the repeated value calculation step. The proposed invention discloses a method to define a size of chroma subblocks equal to a size of luma subblocks. In this case, implementation could be simplified by unifying luma and chroma processing, and redundant motion vector calculations are naturally avoided.

Figure 17:
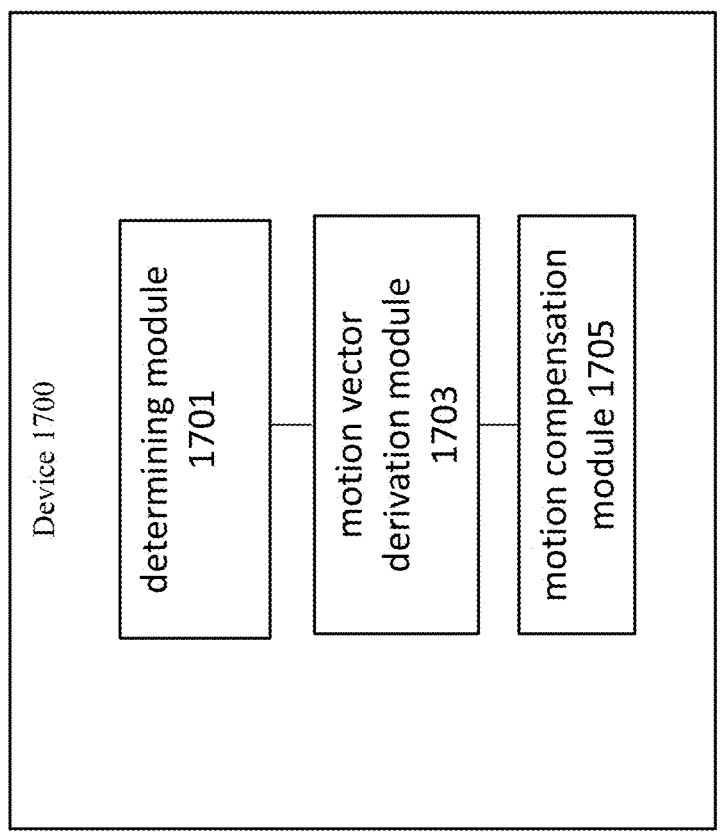
FIG. 17 shows a schematic diagram of a device for affine based inter prediction according to some aspects of the present disclosure.

FIG. 17 illustrates a device for affine based inter prediction according to another aspect of the invention. The device 1700 comprises:

a determining module 1701 configured to determine chroma scaling factors in horizontal and vertical directions respectively based on chroma format information, wherein the chroma format information indicates a chroma format of a current picture which the current image block belongs to; and determine a set (S) of luma subblocks of the luma block based on values of the chroma scaling factors; and a motion vector derivation module 1703 configured to determine a motion vector for a chroma subblock of the chroma block based on motion vectors of one or more luma subblocks in the set (S) of luma subblocks.

In an example, a motion vector derivation module 1703 may comprise:

a luma motion vector derivation module 1703a configured for determining a value of a motion vector for each luma subblock in a plurality of luma subblocks, wherein a plurality of luma subblocks are included in the luma block;

a chroma motion vector derivation module 1703b configured for, for a chroma subblock in a plurality of chroma subblocks, determining a motion vector for the chroma subblock based on the motion vector of at least one luma subblock in a set (S) of luma subblocks, wherein the set (S) is determined based on the chroma scaling factors; wherein the chroma subblocks are included in the chroma block. In an equal size design, a plurality of chroma subblocks may comprise only one chroma subblock.

The device 1700 further comprises: a motion compensation module 1705 configured for generating the prediction of the chroma subblock based on the determined motion vector.

Correspondingly, in an example, an example structure of the device 1700 may be corresponding to encoder 200 in FIG. 2. In another example, an example structure of the device 1700 may be corresponding to the decoder 300 in FIG. 3.

In another example, an example structure of the device 1700 may be corresponding to inter prediction unit 244 in FIG. 2. In another example, an example structure of the device 1700 may be corresponding to the inter prediction unit 344 in FIG. 3.

The present disclosure provides the following further aspects.

According to a first aspect of the invention, a method of chroma motion vector derivation used in affine motion compensation of an inter predicted unit (PU), a PU comprises co-located luma and chroma blocks is provided, the method comprising determining chroma scaling factors in horizontal and vertical directions (SubWidthC and SubHeightC) based on a chroma format of a current picture (for example, current coding or decoding picture);

splitting a luma block of the current picture into a first set of luma subblocks; obtaining a value of a motion vector for each luma subblock in the first set of luma subblocks;

splitting a chroma block of the current picture (in an example, the chroma block and the luma block are comprised in same PU) into a set of chroma subblocks;

for a chroma subblock in the set of chroma subblocks, determining a second set of luma subblocks (S), wherein the positions of luma subblocks in the second set are determined by the chroma format of the current picture; and deriving a motion vector for the chroma subblock based on the motion vectors of the luma subblocks in the second set S.

In a possible implementation form of the method according to the first aspect as such, the second set of luma subblocks (S) comprises any combination of the following subblocks:

$S_0 = (x\text{SbIdxL}, y\text{SbIdxL})$, $S_1 = (x\text{SbIdxL}, y\text{SbIdxL}+(\text{SubHeight}C-1))$, $S_2 = (x\text{SbIdxL}+(\text{SubWidth}C-1), y\text{SbIdxL})$, or $S_3 = (x\text{SbIdxL}+(\text{SubWidth}C-1), y\text{SbIdxL}+(\text{SubHeight}C-1))$.

In a possible implementation form of the method according to any preceding implementation of the first aspect or the first aspect as such, wherein the second set of luma subblocks (S) comprises two subblocks:

$S_0 = (x\text{SbIdxL}, y\text{SbIdxL})$, and $S_1 = (x\text{SbIdxL}+(\text{SubWidth}C-1), y\text{SbIdxL}+(\text{SubHeight}C-1))$.

In a possible implementation form of the method according to any preceding implementation of the first aspect or the first aspect as such, wherein deriving a motion vector for the chroma subblock based on the motion vectors of the luma subblocks in the second set S comprises averaging of motion vectors of the luma subblocks in the second set S.

In a possible implementation form of the method according to any preceding implementation of the first aspect or the first aspect as such, wherein averaging of motion vectors of the luma subblocks in the second set S comprises following steps:

$\Sigma_i \text{mvLX}[S_i^x][S_i^y]S_i^x S_i^y \text{mvLX}[S_i^x][S_i^y]S_i^x S_i^y \text{mvAvgLX} =$ $\Sigma_i \text{mvLX}[S_i^x][S_i^y]S_i^x S_i^y \text{mvLX}[S_i^x][S_i^y]S_i^x S_i^y \text{mvAvgLX}[0] = (\text{mvAvgLX}[0]+N>>1)>>\log 2(N)$ $\Sigma_i \text{mvLX}[S_i^x][S_i^y]S_i^x S_i^y \text{mvLX}[S_i^x][S_i^y]S_i^x S_i^y \text{mvAvgLX}[1] = (\text{mvAvgLX}[1]+N>>1)>>\log 2(N)$, $\Sigma_i \text{mvLX}[S_i^x][S_i^y] S_i^x S_i^y \text{mvLX}[S_i^x][S_i^y]S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the first aspect or the first aspect as such, wherein averaging of motion vectors of the luma subblocks in the second set S comprises following steps:

$\Sigma_i \text{mvLX}[S_i^x][S_i^y]S_i^x S_i^y \text{mvLX}[S_i^x][S_i^y]$
$S_i^x S_i^y \text{mvAvgLX} = \Sigma_i \text{mvLX}[S_i^x][S_i^y]S_i^x S_i^y \text{mvLX}[S_i^x][S_i^y]S_i^x S_i^y$ if mvAvgLX[0] is greater or equal to 0 then $\Sigma_i \text{mvLX}[S_i^x][S_i^y]S_i^x S_i^y \text{mvLX}[S_i^x][S_i^y]S_i^x S_i^y \text{mvAvgLX}[0] = (\text{mvAvgLX}[0]+N>>1)>>\log 2(N)$, otherwise, $\Sigma_i \text{mvLX}[S_i^x][S_i^y]S_i^x S_i^y \text{mvLX}[S_i^x][S_i^y]S_i^x S_i^y \text{mvAvgLX}[0] = -((-\text{mvAvgLX}[0]+N>>1)>>\log 2(N))$ $\Sigma_i \text{mvLX}[S_i^x][S_i^y]S_i^x S_i^y \text{mvLX}[S_i^x][S_i^y]S_i^x S_i^y$ if mvA-vgLX[1] is greater or equal to 0 then $\Sigma_i \text{mvLX}[S_i^x][S_i^y]S_i^x S_i^y \text{mvLX}[S_i^x][S_i^y]S_i^x S_i^y \text{mvAvgLX}[1] = (\text{mvAvgLX}[1] + N >> 1) >> \log 2(N)$, otherwise, $\Sigma_i \text{mvLX}[S_i^x][S_i^y]S_i^x S_i^y \text{mvLX}[S_i^x][S_i^y]S_i^x S_i^y \text{mvAvgLX}[1] = -((-\text{mvAvgLX}[1] + N >> 1) >> \log 2(N))$, $\Sigma_i \text{mvLX}[S_i^x][S_i^y] S_i^x S_i^y \text{mvLX}[S_i^x][S_i^y]S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

According to a second aspect of the invention, a method of chroma motion vector derivation used in affine motion compensation of an inter predicted unit, PU comprising co-located luma and chroma blocks is provided, the method comprising:

obtaining a first set of luma subblocks, wherein the first set of luma subblocks are included in a luma block of a current picture (for example, current coding or decoding picture);

obtaining a value of a motion vector for each luma subblock in the first set of luma subblocks;

obtaining a set of chroma subblocks, wherein the set of chroma subblocks are included in a chroma block of the current picture (in an example, the chroma block and the luma block are comprised in same PU); and deriving a motion vector for the chroma subblock based on the motion vectors of the luma subblocks in a second set (S) of luma subblocks, wherein for a chroma subblock in the set of chroma subblocks, the second set (S) of luma subblocks (S) is determined from the first set of luma subblocks according to a chroma format of the current picture.

In a possible implementation form of the method according to the second aspect as such, wherein the second set of luma subblocks (S) comprises any combination of the following subblocks:

$S_0 = (x\text{SbIdxL}, y\text{SbIdxL})$, $S_1 = (x\text{SbIdxL}, y\text{SbIdxL} + (\text{SubHeight}C - 1))$, $S_2 = (x\text{SbIdxL} + (\text{SubWidth}C - 1), y\text{SbIdxL})$, or $S_3 = (x\text{SbIdxL} + (\text{SubWidth}C - 1), y\text{SbIdxL} + (\text{SubHeight}C - 1))$.

In a possible implementation form of the method according to any preceding implementation of the second aspect or the second aspect as such, wherein the second set of luma subblocks (S) comprises two subblocks:

$S_0 = (x\text{SbIdxL}, y\text{SbIdxL})$, and $S_1 = (x\text{SbIdxL} + (\text{SubWidth}C - 1), y\text{SbIdxL} + (\text{SubHeight}C - 1))$.

In a possible implementation form of the method according to any preceding implementation of the second aspect or the second aspect as such, wherein the deriving a motion vector for the chroma subblock based on the motion vectors of the luma subblocks in the second set S comprises:

averaging of motion vectors of the luma subblocks in the second set S.

In a possible implementation form of the method according to any preceding implementation of the second aspect or the second aspect as such, wherein averaging of motion vectors of the luma subblocks in the second set S comprise:

averaging of horizontal component of motion vectors of the luma subblocks in the second set S; and/or, averaging of vertical component of motion vectors of the luma subblocks in the second set S.

In a possible implementation form of the method according to any preceding implementation of the second aspect or the second aspect as such, wherein averaging of elements comprise checking whether the sum of elements (such as mvLX[S-x] [$S_i^y$]) is greater or equal to 0, in the case that the sum of elements is greater or equal to 0, the sum of elements is divided by shifting operation depend on the number of elements;

otherwise the absolute of the sum of elements is divided by shifting operation depend on the number of elements, and negative value is obtained from the shifted result.

In a possible implementation form of the method according to any preceding implementation of the second aspect or the second aspect as such, wherein the dividing step by shifting operation comprising:

rounding towards zero;

rounding away from zero;

rounding away from infinity; or rounding towards infinity.

In a possible implementation form of the method according to any preceding implementation of the second aspect or the second aspect as such, wherein averaging step comprising: averaging or rounding away from zero.

In a possible implementation form of the method according to any preceding implementation of the second aspect or the second aspect as such, wherein averaging step comprising averaging or rounding towards zero.

In a possible implementation form of the method according to any preceding implementation of the second aspect or the second aspect as such, wherein averaging step comprising averaging or rounding away from infinity.

In a possible implementation form of the method according to any preceding implementation of the second aspect or the second aspect as such, wherein averaging step comprising averaging or rounding towards infinity.

In a possible implementation form of the method according to any preceding implementation of the second aspect or the second aspect as such, wherein averaging of motion vectors of the luma subblocks in the second set S comprises following steps:

$\Sigma_i \text{mvLX}[S_i^x][S_i^y]S_i^x S_i^y \text{mvLX}[S_i^x][S_i^y]S_i^x S_i^y \text{mvAvgLX} =$ $\Sigma_i \text{mvLX}[S_i^x][S_i^y]S_i^x S_i^y \text{mvLX}[S_i^x][S_i^y]S_i^x S_i^y \text{mvAvgLX}[0] = (\text{mvAvgLX}[0] + N >> 1) >> \log 2(N)$ $\Sigma_i \text{mvLX}[S_i^x][S_i^y]S_i^x S_i^y \text{mvLX}[S_i^x][S_i^y]S_i^x S_i^y \text{mvAvgLX}[1] = (\text{mvAvgLX}[1] + N >> 1) >> \log 2(N)$, $\Sigma_i \text{mvLX}[S_i^x][S_i^y] S_i^x S_i^y \text{mvLX}[S_i^x][S_i^y]S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the second aspect or the second aspect as such, wherein averaging of motion vectors of the luma subblocks in the second set S comprises following steps:

$$\Sigma_i mvLX[S_i^x][S_i^y]S_i^xS_i^y mvLX[S_i^x][S_i^y]$$
$$S_i^xS_i^y mvAvgLX = \Sigma_i mvLX[S_i^x][S_i^y]S_i^xS_i^y mvLX$$
$$[S_i^x][S_i^y]S_i^xS_i^y \text{ if } mvAvgLX[0] \text{ is greater or equal to 0 then}$$

$$\Sigma_i mvLX[S_i^x][S_i^y]S_i^xS_i^y mvLX[S_i^x][S_i^y]S_i^xS_i^y mvAvgLX$$
$$[0]=(mvAvgLX[0]+N>>1)>>\log 2(N), \text{otherwise,}$$

$$\Sigma_i mvLX[S_i^x][S_i^y]S_i^xS_i^y mvLX[S_i^x][S_i^y]S_i^xS_i^y mvAvgLX$$
$$[0]=-((-mvAvgLX[0]+N>>1)>>\log 2(N))$$

$$\Sigma_i mvLX[S_i^x][S_i^y]S_i^xS_i^y mvLX[S_i^x][S_i^y]S_i^xS_i^y \text{ if } mvAvgLX[1] \text{ is greater or equal to 0 then}$$

$$\Sigma_i mvLX[S_i^x][S_i^y]S_i^xS_i^y mvLX[S_i^x][S_i^y]S_i^xS_i^y mvAvgLX$$
$$[1]=(mvAvgLX[1]+N>>1)>>\log 2(N), \text{otherwise,}$$

$$\Sigma_i mvLX[S_i^x][S_i^y]S_i^xS_i^y mvLX[S_i^x][S_i^y]S_i^xS_i^y mvAvgLX$$
$$[1]=-((-mvAvgLX[1]+N>>1)>>\log 2(N)),$$

$\Sigma_i mvLX[S_i^x][S_i^y] S_i^xS_i^y mvLX[S_i^x][S_i^y]S_i^xS_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the second aspect or the second aspect as such, wherein averaging of motion vectors of the luma subblocks in the second set S comprises following steps:

$$\Sigma_i mvLX[S_i^x][S_i^y]S_i^xS_i^y mvLX[S_i^x][S_i^y]$$
$$S_i^xS_i^y mvAvgLX = \Sigma_i mvLX[S_i^x][S_i^y]S_i^xS_i^y mvLX$$
$$[S_i^x][S_i^y]S_i^xS_i^y \text{ if } mvAvgLX[0] \text{ is greater or equal to 0 then}$$

$$\Sigma_i mvLX[S_i^x][S_i^y]S_i^xS_i^y mvLX[S_i^x][S_i^y]S_i^xS_i^y mvAvgLX$$
$$[0]=(mvAvgLX[0]+(N>>1)-1)>>\log 2(N), \text{otherwise,}$$

$$\Sigma_i mvLX[S_i^x][S_i^y]S_i^xS_i^y mvLX[S_i^x][S_i^y]S_i^xS_i^y mvAvgLX$$
$$[0]=-((-mvAvgLX[0]+(N>>1)-1)>>\log 2(N))$$

$$\Sigma_i mvLX[S_i^x][S_i^y]S_i^xS_i^y mvLX[S_i^x][S_i^y]S_i^xS_i^y \text{ if } mvAvgLX[1] \text{ is greater or equal to 0 then}$$

$$\Sigma_i mvLX[S_i^x][S_i^y]S_i^xS_i^y mvLX[S_i^x][S_i^y]S_i^xS_i^y mvAvgLX$$
$$[1]=(mvAvgLX[1]+(N>>1)-1)>>\log 2(N), \text{otherwise,}$$

$$Z\, mvLX[S_i^x][S_i^y]S_i^xS_i^y mvLX[S_i^x][S_i^y]S_i^xS_i^y mvAvgLX$$
$$[1]=-((-mvAvgLX[1]+(N>>1)-1)>>\log 2(N)),$$

$\Sigma_i mvLX[S_i^x][S_i^y]\ S_i^xS_i^y mvLX[S_i^x][S_i^y]\ S_i^xS_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 is raised to obtain the value N and ">>" is a right arithmetic shift.

According to a third aspect of the invention, a method for affine motion compensation of a current picture is provided, the method comprises:
splitting the luma block of the current picture into a set of equally sized luma subblocks, and
splitting the chroma block of the current picture into a set of equally sized chroma subblocks, wherein a size of a chroma subblock is set equal to a size of a luma sublock.

In a possible implementation form of the method according to the third aspect as such, wherein the method further comprises:
determining the number of chroma subblocks in horizontal and vertical directions based on values of chroma scaling factors.

In a possible implementation form of the method according to any preceding implementation of the third aspect or the third aspect as such, wherein the chroma scaling factors in horizontal and vertical directions (SubWidthC and SubHeightC) are determined based on a chroma format of a current picture (for example, current coding or decoding picture).

In a possible implementation form of the method according to any preceding implementation of the third aspect or the third aspect as such, wherein numCSb$X$=numSb$X$>>(SubWidth$C$−1) and numCSb$Y$=numSb$Y$>>(SubHeight$C$−1);

numCSbX and numCSbY represent the number of chroma subblocks in horizontal and vertical directions, respectively.

In a possible implementation form of the method according to any preceding implementation of the third aspect or the third aspect as such, wherein the splitting the chroma block of the current picture comprises:
splitting the chroma block of the current picture (in an example, the chroma block and the luma block are comprised in same PU) into numCSbY rows, each row having numCSbX of chroma subblocks.

In a possible implementation form of the method according to any preceding implementation of the third aspect or the third aspect as such, wherein the method further comprises:
for each of chroma subblocks, determine a set of luma subblocks (S), wherein the positions of luma subblocks in the set are determined by the chroma format of the current picture; and
deriving a motion vector for the chroma subblock based on the motion vectors of the luma subblocks in the set S.

In a possible implementation form of the method according to any preceding implementation of the third aspect or the third aspect as such, wherein the motion vector is defined for each of the luma subblocks belonging to the set S.

In a possible implementation form of the method according to any preceding implementation of the third aspect or the third aspect as such, wherein the set of luma subblocks (S) comprises any combination of following subblocks:

$S_0$=($x$SbIdxL,$y$SbIdxL), $S_1$=($x$SbIdxL,$y$SbIdxL+(SubHeight$C$−1)), $S_2$=($x$SbIdxL+(SubWidth$C$−1),$y$SbIdxL), or $S_3$=($x$SbIdxL+(SubWidth$C$−1),$y$SbIdxL+(SubHeight$C$−1)).

In a possible implementation form of the method according to any preceding implementation of the third aspect or the third aspect as such, wherein the set of luma subblocks (S) comprises two subblocks:

$S_0=(xSbIdxL, ySbIdxL)$, and $S_1=(xSbIdxL+(SubWidthC-1), ySbIdxL+(SubHeightC-1))$.

In a possible implementation form of the method according to any preceding implementation of the third aspect or the third aspect as such, wherein deriving a motion vector for the chroma subblock based on the motion vectors of the luma subblocks in the set S comprises averaging of motion vectors of the luma subblocks in the set S.

In a possible implementation form of the method according to any preceding implementation of the third aspect or the third aspect as such, wherein averaging of motion vectors of the luma subblocks in the set S comprise:

averaging of horizontal component of motion vectors of the luma subblocks in the set S averaging of vertical component of motion vectors of the luma subblocks in the set S.

In a possible implementation form of the method according to any preceding implementation of the third aspect or the third aspect as such, wherein averaging of elements comprise checking whether sum of elements is greater or equal to 0.

In a possible implementation form of the method according to any preceding implementation of the third aspect or the third aspect as such, wherein averaging means averaging away from zero.

In a possible implementation form of the method according to any preceding implementation of the third aspect or the third aspect as such, wherein averaging means averaging towards zero.

In a possible implementation form of the method according to any preceding implementation of the third aspect or the third aspect as such, wherein averaging means averaging away from infinity.

In a possible implementation form of the method according to any preceding implementation of the third aspect or the third aspect as such, wherein averaging means averaging towards infinity.

In a possible implementation form of the method according to any preceding implementation of the third aspect or the third aspect as such, wherein averaging of motion vectors of the luma subblocks in the set S comprises following steps:

$\Sigma_i mvLX[S_i^x][S_i^y]S_i^x S_i^y mvLX[S_i^x][S_i^y]S_i^x S_i^y mvAvgLX=$, $\Sigma_i mvLX[S_i^x][S_i^y]S_i^x S_i^y mvLX[S_i^x][S_i^y]S_i^x S_i^y mvAvgLX[0]=(mvAvgLX[0]+N>>1)>>\log 2(N)$, and $\Sigma_i mvLX[S_i^x][S_i^y]S_i^x S_i^y mvLX[S_i^x][S_i^y]S_i^x S_i^y mvAvgLX[1]=(mvAvgLX[1]+N>>1)>>\log 2(N)$, $\Sigma_i mvLX[S_i^x][S_i^y] S_i^x S_i^y mvLX[S_i^x][S_i^y]S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the third aspect or the third aspect as such, wherein averaging of motion vectors of the luma subblocks in the set S comprises following steps:

$\Sigma_i mvLX[S_i^x][S_i^y]S_i^x S_i^y mvLX[S_i^x][S_i^y]$
$S_i^x S_i^y mvAvgLX=\Sigma_i>mvLX[S_i^x][S_i^y]S_i^x S_i^y mvLX[S_i^x][S_i^y]S_i^x S_i^y$ if mvAvgLX[0] is greater or equal to 0 then $\Sigma_i mvLX[S_i^x][S_i^y]S_i^x S_i^y mvLX[S_i^x][S_i^y]S_i^x S_i^y mvAvgLX[0]=(mvAvgLX[0]+N>>1)>>\log 2(N)$, otherwise, $\Sigma_i mvLX[S_i^x][S_i^y]S_i^x S_i^y mvLX[S_i^x][S_i^y]S_i^x S_i^y mvAvgLX[0]=-((-mvAvgLX[0]+N>1)>>\log 2(N))$ $\Sigma_i mvLX[S_i^x][S_i^y]S_i^x S_i^y mvLX[S_i^x][S_i^y]S_i^x S_i^y$ if mvAvgLX[1] is greater or equal to 0 then $\Sigma_i mvLX[S_i^x][S_i^y]S_i^x S_i^y mvLX[S_i^x][S_i^y]S_i^x S_i^y mvAvgLX[1]=(mvAvgLX[1]+N>>1)>>\log 2(N)$, otherwise, $\Sigma_i mvLX[S_i^x][S_i^y]S_i^x S_i^y mvLX[S_i^x][S_i^y] S_i^x S_i^y mvAvgLX[1]=-((-mvAvgLX[1]+N>1)>>\log 2(N))$, $\Sigma_i mvLX[S_i^x][S_i^y] S_i^x S_i^y mvLX[S_i^x][S_i^y] S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the third aspect or the third aspect as such, wherein averaging of motion vectors of the luma subblocks in the set S comprises following steps:

$\Sigma_i mvLX[S_i^x][S_i^y]S_i^x S_i^y mvLX[S_i^x][S_i^y]$
$S_i^x S_i^y mvAvgLX=\Sigma_i>mvLX[S_i^x][S_i^y]S_i^x S_i^y mvLX[S_i^x][S_i^y]S_i^x S_i^y$ if mvAvgLX[0] is greater or equal to 0 then $\Sigma_i mvLX[S_i^x][S_i^y]S_i^x S_i^y mvLX[S_i^x][S_i^y]S_i^x S_i^y mvAvgLX[0]=(mvAvgLX[0]+(N>>1)-1)>>\log 2(N)$, otherwise, $\Sigma_i mvLX[S_i^x][S_i^y]S_i^x S_i^y mvLX[S_i^x][S_i^y]S_i^x S_i^y mvAvgLX[0]=-((-mvAvgLX[0]+(N>>1)-1)>>\log 2(N))$ $\Sigma_i mvLX[S_i^x][S_i^y]S_i^x S_i^y mvLX[S_i^x][S_i^y]S_i^x S_i^y$ if mvAvgLX[1] is greater or equal to 0 then $\Sigma_i mvLX[S_i^x][S_i^y]S_i^x S_i^y mvLX[S_i^x][S_i^y]S_i^x S_i^y mvAvgLX[1]=(mvAvgLX[1]+(N>>1)-1)>>\log 2(N)$, otherwise, $\Sigma_i mvLX[S_i^x][S_i^y]S_i^x S_i^y mvLX[S_i^x][S_i^y]S_i^x S_i^y mvAvgLX[1]=-((-mvAvgLX[1]+(N>>1)-1)>>\log 2(N))$, $\Sigma_i mvLX[S_i^x][S_i^y] S_i^x S_i^y mvLX[S_i^x][S_i^y]S_i^x S_i^y$ where mvAvgLX is a result of averaging, mvAvgLX[0] is a horizontal component of motion vector mvAvgLX, mvAvgLX[1] is a vertical component of motion vector mvAvgLX, and are horizontal and vertical indices of subblock Si in a motion vector array, is a motion vector of Luma subblock with indices and, N—is a number of elements in the second set of luma subblocks (S), log 2(N) is the power to which the number 2 must be raised to obtain the value N and ">>" is a right arithmetic shift.

In a possible implementation form of the method according to any preceding implementation of the third aspect or the third aspect as such, wherein N is equal to 1.

In a possible implementation form of the method according to any preceding implementation of the third aspect or the third aspect as such, wherein the set S is determined on the basis of the value of sps_cclm_colocated_chroma_flag.

In a possible implementation form of the method according to any preceding implementation of the third aspect or the third aspect as such, wherein the average motion vector derivation is performed on the basis of the value of sps_cclm_colocated_chroma_flag.

In a possible implementation form of the method according to any preceding implementation of the third aspect or the third aspect as such, wherein the chroma format is defined as YUV 4:2:2.

In a possible implementation form of the method according to any preceding implementation of the third aspect or the third aspect as such, wherein the chroma block and the luma block are comprised in same PU, and the luma and chroma blocks are co-located.

A fourth aspect of an encoder (20) comprises processing circuitry for carrying out the method according to any one of the first to third aspects.

A fifth aspect of a decoder (30) comprises processing circuitry for carrying out the method according to any one of the first to third aspects.

An sixth aspect of a computer program product comprises a program code for performing the method according to any one of the first to third aspects.

An seventh aspect of a decoder, comprising:
one or more processors; and a non-transitory computer-readable storage medium coupled to the processors and storing program for execution by the processors, wherein the program, when executed by the processors, configures the decoder to carry out the method according to any one of the first to third aspects.

A eighth aspect of an encoder, comprises:
one or more processors; and a non-transitory computer-readable storage medium coupled to the processors and storing programming for execution by the processors, wherein the programming, when executed by the processors, configures the encoder to carry out the method according to any one of the first to third aspects.

Based on the above, the present disclosure is directed to discloses a method to consider the chroma format of the picture when obtaining chroma motion vectors from luma motion vectors. By taking an average of luma motion vectors, linear subsampling of luma motion field is performed. When chroma color planes have the same height as the luma plane, it is found more appropriate to select motion vectors from luma blocks that are horizontally adjacent, so that they have the same vertical position. Selecting luma motion vectors depending on the picture chroma format leads to a more accurate chroma motion field due to a more accurate luma motion vector field subsampling. This dependency on chroma format enables the selection of the most appropriate luma blocks when averaging luma motion vectors to generate the chroma motion vector. As a consequence of a more accurate motion field interpolation, prediction error is reduced, which leads to a technical result of a compression performance improvement.

Following is an explanation of the applications of the encoding method as well as the decoding method as shown in the above-mentioned embodiments, and a system using them.

Figure 18:
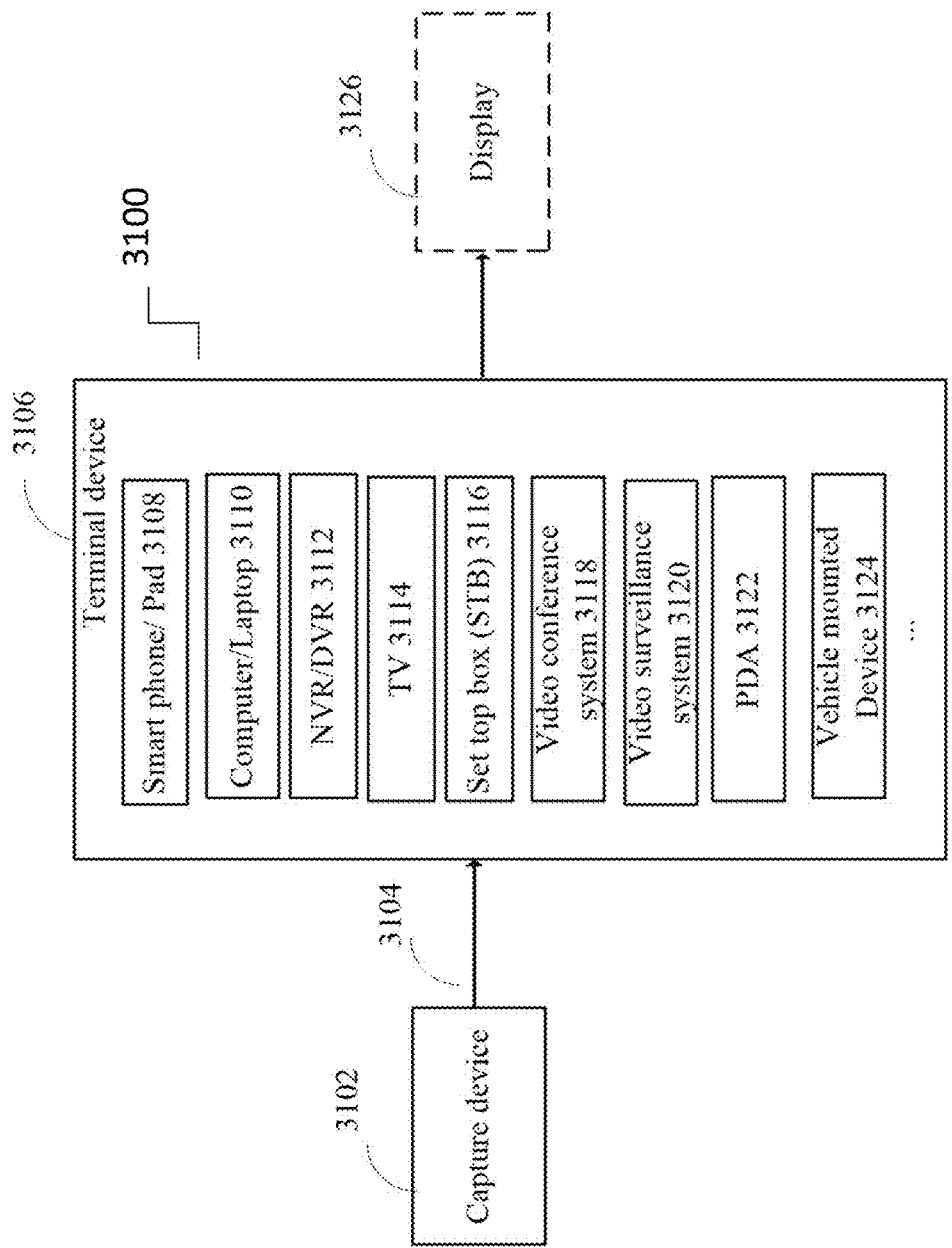
FIG. 18 is a block diagram showing an example structure of a content supply system which realizes a content delivery service.

FIG. 18 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 3106 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 19:
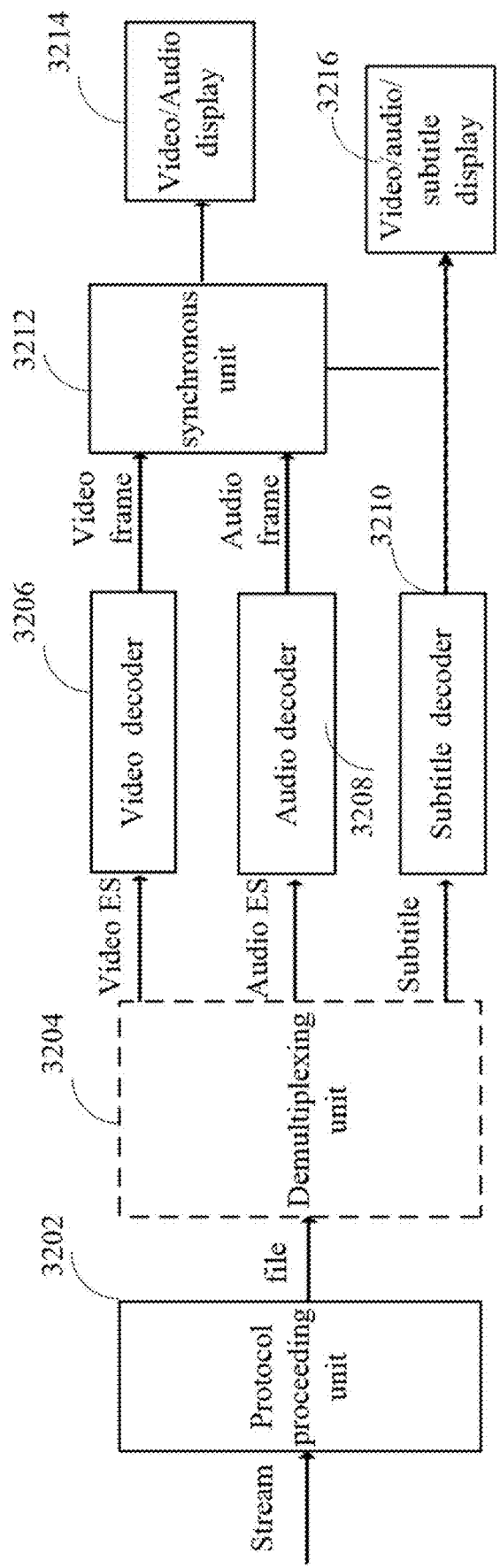
FIG. 19 is a block diagram showing a structure of an example of a terminal device.

FIG. 19 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 19) before feeding it to the synchronous unit 3212. Similarly, the audio frame may store in a buffer (not shown in FIG. 19) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present invention is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.
Modulus. Remainder of x divided by y, defined only for integers x and y with x>=0 x % y and y>0.

Logical Operators

The following logical operators are defined as follows:
x && y Boolean logical "and" of x and y
x||y Boolean logical "or" of x and y
l Boolean logical "not"
x? y: z If x is TRUE or not equal to 0, evaluates to the value of y; otherwise, evaluates to the value of z.

Relational Operators

The following relational operators are defined as follows:
>Greater than
>=Greater than or equal to
<Less than
<=Less than or equal to
==Equal to
!=Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z, x takes on integer values starting from y to z, inclusive, with x, y, and z being integer numbers and z being greater than y.

Mathematical Functions

The following mathematical functions are defined:

$$\mathrm{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$A\tan 2(y, x) = \begin{cases} \mathrm{Atan}\left(\frac{y}{x}\right); & x > 0 \\ \mathrm{Atan}\left(\frac{y}{x}\right) + \pi; & x < 0 \,\&\&\, y >= 0 \\ \mathrm{Atan}\left(\frac{y}{x}\right) - \pi; & x < 0 \,\&\&\, y < 0 \\ +\frac{\pi}{2}; & x == 0 \,\&\&\, y >= 0 \\ -\frac{\pi}{2}; & \text{otherwise} \end{cases}$$

Ceil(x) the smallest integer greater than or equal to x.

Clip1$_Y$(x)=Clip3(0, (1<<BitDepth$_Y$)−1, x)

Clip1$_C$(x)=Clip3(0, (1<<BitDepth$_C$)−1, x)

$$\mathrm{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$\mathrm{GetCurrMsb}(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\mathrm{Min}(x, y) = \begin{cases} x; & x <= y \\ y; & x > y \end{cases}$$

$$\mathrm{Max}(x, y) = \begin{cases} x; & x >= y \\ y; & x < y \end{cases}$$

Round(x) = Sign(x) * Floor(Abs(x) + 0.5)

$$\mathrm{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)
"x++", "x− −"
"!x", "−x" (as a unary prefix operator)
$x^y$
"x * y", "x / y", "x ÷ y", "$\frac{x}{y}$", "x % y"
"x + y", "x − y" (as a two-argument operator), "$\sum_{i=x}^{y} f(i)$"
"x << y", "x >> y"
"x < y", "x <= y", "x > y", "x >= y"
"x == y", "x != y"
"x & y"
"x | y"
"x && y"
"x | | y"
"x ? y : z"
"x . . . y"
"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
may be described in the following manner:
    ... as follows / ... the following applies:
        – If condition 0, statement 0
        – Otherwise, if condition 1, statement 1
        – ...
        – Otherwise (informative remark on remaining condition),
          statement n
```

Each "If . . . Otherwise, if . . . Otherwise, . . . "statement in the text is introduced with" . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . "statements can be identified by matching" . . . as follows" or " . . . the following applies" with the ending "Otherwise . . . ".

In the text, a statement of logical operations as would be described mathematically in the following form:

```
if( condition 0a && condition 0b )
    statement 0
else if( condition 1a || condition 1b )
    statement 1
...
else
    statement n
``` may be described in the following manner:
. . . as follows/ . . . the following applies:
    If all of the following conditions are true, statement 0:
        condition 0a
        condition 0b
    Otherwise, if one or more of the following conditions are true, statement 1:
        condition 1a
        condition 1b
    . . .
    Otherwise, statement n In the text, a statement of logical operations as would be described mathematically in the following form:

```
if( condition 0)
    statement 0
if( condition 1)
    statement 1
``` may be described in the following manner:
    When condition 0, statement 0
    When condition 1, statement 1

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Embodiments of the invention may further comprise an apparatus, e.g. encoder and/or decoder, which comprises a processing circuitry configured to perform any of the methods and/or processes described herein.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform processing unit 206, quantization 208, inverse quantization 210/310, (inverse) transform 212/312, partitioning 262/362, intra-prediction 254/354, and/or loop filtering 220, 320, and entropy coding 270 and entropy decoding unit 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. An image encoding method, comprising:
performing an image encoding process for an image block coded in an inter prediction mode, to output an encoded bitstream, wherein the image block comprises a luma block and a co-located chroma block, and wherein the performing the image encoding process comprises a chroma motion vector derivation process, comprising:
obtaining an averaged luma motion vector mvAvgLX by:
determining chroma scaling factors in horizontal and vertical directions based on chroma format information indicating a chroma format of a current picture which the image block belongs to, wherein the chroma format comprises one of a YUV 4:2:2 format, a YUV 4:2:0 format or a YUV 4:4:4 format;
determining a set (S) of luma subblocks of the luma block based on values of the chroma scaling factors; and
generating the averaged luma motion vector mvAvgLX by averaging motion vectors of the luma subblocks in the set (S), in a case that more than one luma subblocks in the set (S);
deriving a chroma motion vector for a chroma subblock mvCLX[xSbIdx][ySbIdx] of the chroma block based on the averaged luma motion vector mvAvgLX;
wherein a process of deriving the chroma motion vector is invoked as follows with the mvAvgLX as input, and the chroma motion vector mvCLX[xSbIdx][ySbIdx] as output:

mvCLX[0]=mvLX[0]*2/SubWidth$C$ mvCLX[1]=mvLX[1]*2/SubHeight$C$-, if a reference picture corresponding to refIdxLX for the image block is not a current picture; or mvCLX[0]=((mvLX[0]>>(3+SubWidth$C$))*32 mvCLX[1]=((mvLX[1]>>(3+SubHeight$C$))*32, if the reference picture corresponding to the refIdxLX for the image block is the current picture, wherein mvLX[0] corresponds to a horizontal component of the mvAvgLX, and mvLX[1] corresponds to a vertical component of the mvAvgLX,
wherein when both SubWidthC and SubHeightC are equal to 1, the set of luma subblocks (S) is a luma subblock indexed by $S_0$=(xSbIdx, ySbIdx);
when at least one of SubWidthC and SubHeightC is not equal to 1, the set of luma subblocks (S) is: a first luma subblock indexed by $S_0$=

(($x$SbIdx>>(SubWidth$C$−1)<<(SubWidth$C$−1)), ($y$SbIdx>>(SubHeight$C$−1)<<(SubHeight$C$−1))), and a second luma subblock indexed by $S_1$=(($x$SbIdx>>(SubWidth$C$−1)<<(SubWidth$C$−1))+ (SubWidth$C$−1),($y$SbIdx>>(SubHeight$C$−1)<< (SubHeight$C$−1))+(SubHeight$C$−1))

wherein SubWidthC and SubHeightC represent the chroma scaling factors in horizontal and vertical directions, respectively;

xSbIdx and ySbIdx represent a subblock index in the horizontal direction and a subblock index in the vertical direction, respectively, for a luma subblock in the set (S);

"<<" represents a left arithmetic shift;

">>" represents a right arithmetic shift;

xSbIdx is an integer number ranging from 0 to numSbX−1 and ySbIdx is an integer ranging from 0 to numSbY−1;

numSbX indicates the number of luma subblocks in the luma block along the horizontal direction; and numSbY indicates the number of luma subblocks in the luma block along the vertical direction.

2. The method of claim 1, wherein each of the one or more luma subblocks in the set (S) is represented by a subblock index in a horizontal direction and a subblock index in a vertical direction.

3. The method of claim 1, wherein the number of the chroma subblocks in the chroma block along the horizontal direction and the vertical direction are the same as the number of the luma subblocks in the luma block along the horizontal and vertical directions, respectively.

4. The method of claim 1,
wherein when the chroma format is 4:4:4, the set (S) is one luma subblock co-located with the chroma subblock;
wherein when the chroma format is 4:2:2, the set (S) is two luma subblocks horizontally adjacent to each other;
wherein when the chroma format is 4:2:0, the set (S) is two luma subblocks which are diagonal.

5. The method of claim 1, wherein the averaging motion vectors of the luma subblocks in the set (S) comprise one or more of:
averaging horizontal component of the motion vectors of the luma subblocks in the set (S); or
averaging vertical component of the motion vectors of the luma subblocks in the set (S).

6. The method of claim 1, wherein the generating an averaged luma motion vector by averaging motion vectors of the luma subblocks in the set (S) comprises calculating the averaged luma motion vector based on an equation:

$$mvAvgLX = \Sigma_i\, mvLX[S_i^x][S_i^y]$$

when mvAvgLX[0] is greater or equal to 0,mvAvgLX[0](mvAvgLX[0]+(N>>1)−1)>>log 2(N), otherwise, mvAvgLX[0]=−((−mvAvgLX[0]+(N>>1)−1)>>log 2(N));

when mvAvgLX[1] is greater or equal to 0,mvAvgLX[1](mvAvgLX[1]+(N>>1)−1)>>log 2(N), otherwise, mvAvgLX[1]=−((−mvAvgLX[1]+(N>>1)−1)>>log 2(N)), wherein:
mvAvgLX is a resulting motion vector of the averaging;
$S_i^x$ and $S_i^y$ are horizontal and vertical indices of subblock Si in the set of luma subblocks (S) in motion vector array,
$mvLX[S_i^x][S_i^y]$ is a motion vector of a luma subblock with indices $S_i^x$ and $S_i^y$, N is a number of elements in the set (S) of luma subblocks, log 2(N) represents the logarithm of N to the base 2 and is the power to which the number 2 is raised to obtain the value N.

7. The method of claim 1, wherein the averaging of motion vectors of the luma subblocks in the set (S) comprises:

mvAvgLX=mvLX[(xSbIdx>>(SubWidthC−1)<<(SubWidthC−1))][(ySbIdx>>(SubHeightC−1)<<(SubHeightC−1))]+mvLX[(xSbIdx>>(SubWidthC−1)<<(SubWidthC−1))+(SubWidthC−1)][(ySbIdx>>(SubHeightC−1)<<(SubHeightC−1))+(SubHeightC−1)]

if mvAvgLX[0]>=0 then mvAvgLX[0]=(mvAvgLX[0]+1−(mvAvgLX[0]>=0))>>1 if mvAvgLX[1]>=0 then mvAvgLX[1]=(mvAvgLX[1]+1−(mvAvgLX[1]>=0))>>1.

8. The method of claim 1, wherein the determining chroma scaling factors in horizontal and vertical directions respectively based on chroma format information comprises: determining the chroma scaling factors in the horizontal and vertical directions based on a mapping between the chroma format information and a pair of chroma scaling factors in the horizontal and vertical directions respectively.

9. The method of claim 1, wherein the performing the image encoding process further comprises:
generating a prediction of the chroma subblock based on the determined chroma motion vector;
obtaining a residual of the chroma subblock according to a prediction of the chroma subblock, wherein a residual of the image block comprises the residual of the chroma subblock of the chroma block; and
performing transformation, quantization, and entropy coding on the residual of the image block, to output the encoded bitstream.

10. The method of claim 1, wherein the image block is coded in an affine based inter prediction mode.

11. An encoding apparatus, comprising:
a video data memory; and
a video encoder configured to:
perform an image encoding process for an image block coded in an inter prediction mode, to output an encoded bitstream, wherein the image block comprises a luma block and a co-located chroma block, and wherein the performing the image encoding process comprises a chroma motion vector derivation process, comprising:
obtaining an averaged luma motion vector mvAvgLX by:
determining chroma scaling factors in horizontal and vertical directions based on chroma format information, wherein the chroma format information indicates a chroma format of a current picture which the image block belongs to, wherein the chroma format comprises one of a YUV 4:2:2 format, a YUV 4:2:0 format or a YUV 4:4:4 format;
determining a set (S) of luma subblocks of the luma block based on values of the chroma scaling factors; and
generating the averaged luma motion vector mvAvgLX by averaging motion vectors of the luma subblocks in the set (S), in a case that more than one luma subblocks in the set (S); and
deriving a chroma motion vector for a chroma subblock mvCLX[xSbIdx][ySbIdx] of the chroma block based on the averaged luma motion vector mvAvgLX;

wherein a process of deriving the chroma motion vector is invoked as follows with the mvAvgLX as input, and the chroma motion vector mvCLX[xSbIdx][ySbIdx] as output:

mvCLX[0]=mvLX[0]*2/SubWidth$C$ mvCLX[1]=mvLX[1]*2/SubHeight$C$, if a reference picture corresponding to refIdxLX for the image block is not a current picture; or mvCLX[0]=((mvLX[0]>>(3+SubWidth$C$))*32 mvCLX[1]=((mvLX[1]>>(3+SubHeight$C$))*32, if the reference picture corresponding to the refIdxLX for the image block is the current picture, wherein mvLX[0] corresponds to a horizontal component of the mvAvgLX, and mvLX[1] corresponds to a vertical component of the mvAvgLX, wherein when both SubWidthC and SubHeightC are equal to 1, the set of luma subblocks (S) is a luma subblock indexed by $S_0$=(xSbIdx, ySbIdx);

when at least one of SubWidthC and SubHeightC is not equal to 1, the set of luma subblocks (S) is: a first luma subblock indexed by $S_0$=

((xSbIdx>>(SubWidth$C$-1)<<(SubWidth$C$-1)), (ySbIdx>>(SubHeight$C$-1)<<(SubHeight$C$-1))), and a second luma subblock indexed by $S_1$=((xSbIdx>>(SubWidth$C$-1)<<(SubWidth$C$-1))+(SubWidth$C$-1),(ySbIdx>>(SubHeight$C$-1)<<(SubHeight$C$-1))+(SubHeight$C$-1))

wherein SubWidthC and SubHeightC represent the chroma scaling factors in horizontal and vertical directions, respectively;

xSbIdx and ySbIdx represent a subblock index in the horizontal direction and a subblock index in the vertical direction, respectively, for a luma subblock in the set (S);

"<<" represents a left arithmetic shift;
">>" represents a right arithmetic shift;
xSbIdx is an integer number ranging from 0 to numSbX-1 and ySbIdx is an integer ranging from 0 to numSbY-1;
numSbX indicates the number of luma subblocks in the luma block along the horizontal direction; and
numSbY indicates the number of luma subblocks in the luma block along the vertical direction.

12. The apparatus of claim 11, wherein each of the one or more luma subblocks in the set (S) is represented by a subblock index in a horizontal direction and a subblock index in a vertical direction.

13. The apparatus of claim 11, wherein the number of the chroma subblocks in the chroma block along the horizontal direction and the vertical direction are the same as the number of the luma subblocks in the luma block along the horizontal and vertical directions, respectively.

14. The apparatus of claim 11,
wherein when the chroma format is 4:4:4, the set (S) is one luma subblock co-located with the chroma subblock;
wherein when the chroma format is 4:2:2, the set (S) is two luma subblocks horizontally adjacent to each other; and
wherein when the chroma format is 4:2:0, the set (S) is two luma subblocks which are diagonal.

15. The apparatus of claim 11, wherein the video encoder is further configured to:
average horizontal component of the motion vectors of the luma subblocks in the set (S); or
average vertical component of the motion vectors of the luma subblocks in the set (S).

16. The apparatus of claim 11, wherein the video encoder is further configured to generate an averaged luma motion vector by averaging motion vectors of the luma subblocks in the set (S) as follows:

mvAvgLX=$\Sigma_i$ mvLX[$S_i^x$][$S_i^y$]

when mvAvgLX[0] is greater or equal to 0,mvAvgLX[0](mvAvgLX[0]+($N$>>1)-1)>>log 2($N$), otherwise, mvAvgLX[0]-((-mvAvgLX[0]+($N$>>1)-1)>>log 2($N$));

when mvAvgLX[1] is greater or equal to 0,mvAvgLX[1]=(mvAvgLX[1]+($N$>>1)-1)>>log 2($N$), otherwise, mvAvgLX[1]-((-mvAvgLX[1]+($N$>>1)-1)>>log 2($N$)), wherein:
mvAvgLX is a resulting motion vector of the averaging;
$S_i^x$ and $S_i^y$ are horizontal and vertical indices of subblock Si in the set of luma subblocks (S) in motion vector array,
mvLX[$S_i^x$][$S_i^y$] is a motion vector of a luma subblock with indices $S_i^x$ and $S_i^y$, N is a number of elements in the set (S) of luma subblocks, log 2(N) represents the logarithm of N to the base 2 and is the power to which the number 2 is raised to obtain the value N.

17. The apparatus of claim 11, wherein the encoder is further configured to generate an averaged luma motion vector by averaging motion vectors of the luma subblocks in the set (S) as follows:

mvAvgLX=mvLX[(xSbIdx>>(SubWidth$C$-1)<<(SubWidth$C$-1))][(ySbIdx>>(SubHeight$C$-1)<<(SubHeight$C$-1))]+mvLX[(xSbIdx>>(SubWidth$C$-1)<<(SubWidth$C$-1))+(SubWidth$C$-1)][(ySbIdx>>(SubHeight$C$-1)<<(SubHeight$C$-1))+(SubHeight$C$-1)]

if mvAvgLX[0]>=0 then mvAvgLX[0]=(mvAvgLX[0]+1-(mvAvgLX[0]>=0))>>1 if mvAvgLX[1]>=0 then mvAvgLX[1]=(mvAvgLX[1]+1-(mvAvgLX[1]>=0))>>1.

18. The apparatus of claim 11, wherein the video encoder is further configured to determine the chroma scaling factors in the horizontal and vertical directions based on a mapping between the chroma format information and a pair of chroma scaling factors in the horizontal and vertical directions respectively.

19. The apparatus of claim 11, wherein the video encoder is further configured to:
generate a prediction of the chroma subblock based on the determined chroma motion vector;
obtain a residual of the chroma subblock according to a prediction of the chroma subblock, wherein a residual of the image block comprises the residual of the chroma subblock of the chroma block; and perform transformation, quantization, and entropy coding on the residual of the image block, to output the encoded bitstream.

20. The apparatus of claim 11, wherein the image block is coded in an affine based inter prediction mode.

21. A non-transitory computer-readable medium storing program instructions which, when executed by one or more processors, cause the one or more processors to perform operations of chroma motion vector derivation used in an affine based inter prediction of a current image block comprises a luma block and a co-located chroma block, the operations comprising:

performing an image encoding process for an image block coded in an inter prediction mode, to output an encoded bitstream, wherein the image block comprises a luma block and a co-located chroma block, and wherein the performing the image encoding process comprises a chroma motion vector derivation process, comprising:

obtaining an averaged luma motion vector mvAvgLX by:
determining chroma scaling factors in horizontal and vertical directions based on chroma format information, wherein the chroma format information indicates a chroma format of a current picture which the image block belongs to, wherein the chroma format comprises one of a YUV 4:2:2 format, a YUV 4:2:0 format or a YUV 4:4:4 format;
determining a set (S) of luma subblocks of the luma block based on values of the chroma scaling factors; and
generating the averaged luma motion vector mvAvgLX by averaging motion vectors of the luma subblocks in the set (S), in a case that more than one luma subblocks in the set (S);

deriving a chroma motion vector for a chroma subblock mvCLX[xSbIdx][ySbIdx] of the chroma block based on the averaged luma motion vector mvAvgLX;
wherein a process of deriving the chroma motion vector is invoked as follows with the mvAvgLX as input, and the chroma motion vector mvCLX[xSbIdx][ySbIdx] as output:

mvCLX[0]=mvLX[0]*2/SubWidth$C$ mvCLX[1]=mvLX[1]*2/SubHeight$C$, if a reference picture corresponding to refIdxLX for the image block is not a current picture; or mvCLX[0]=((mvLX[0]>>(3+SubWidth$C$))*32 mvCLX[1]=((mvLX[1]>>(3+SubHeight$C$))*32, if the reference picture corresponding to the refIdxLX for the image block is the current picture, wherein mvLX[0] corresponds to a horizontal component of the mvAvgLX, and mvLX[1] corresponds to a vertical component of the mvAvgLX,
wherein when both SubWidthC and SubHeightC are equal to 1, the set of luma subblocks (S) is a luma subblock indexed by $S_0$=(xSbIdx, ySbIdx);
when at least one of SubWidthC and SubHeightC is not equal to 1, the set of luma subblocks (S) is: a first luma subblock indexed by $S_0$=

((xSbIdx>>(SubWidth$C$−1)<<(SubWidth$C$−1)), (ySbIdx>>(SubHeight$C$−1)<<(SubHeight$C$−1))), and a second luma subblock indexed by $S_1$=((xSbIdx>>(SubWidth$C$−1)<<(SubWidth$C$−1))+ (SubWidth$C$−1),(ySbIdx>>(SubHeight$C$−1)<< (SubHeight$C$−1))+(SubHeight$C$−1))

wherein SubWidthC and SubHeightC represent the chroma scaling factors in horizontal and vertical directions, respectively;
xSbIdx and ySbIdx represent a subblock index in the horizontal direction and a subblock index in the vertical direction, respectively, for a luma subblock in the set (S);
"<<" represents a left arithmetic shift;
">>" represents a right arithmetic shift;
xSbIdx is an integer number ranging from 0 to numSbX−1 and ySbIdx is an integer ranging from 0 to numSbY−1;
numSbX indicates the number of luma subblocks in the luma block along the horizontal direction; and
numSbY indicates the number of luma subblocks in the luma block along the vertical direction.

22. A non-transitory computer-readable medium storing an encoded bitstream for a video signal and one or more instructions executable by one or more processors to perform operations of encoding of the bitstream, the operations comprising:

performing an image encoding process for an image block coded in an inter prediction mode, to output the encoded bitstream, wherein the image block comprises a luma block and a co-located chroma block, and wherein the performing the image encoding process comprises a chroma motion vector derivation process, comprising:

obtaining an averaged luma motion vector mvAvgLX by:
determining chroma scaling factors in horizontal and vertical directions based on chroma format information, wherein the chroma format information indicates a chroma format of a current picture which the image block belongs to, wherein the chroma format comprises one of a YUV 4:2:2 format, a YUV 4:2:0 format or a YUV 4:4:4 format;
determining a set (S) of luma subblocks of the luma block based on values of the chroma scaling factors; and
generating the averaged luma motion vector mvAvgLX by averaging motion vectors of the luma subblocks in the set (S), in a case that more than one luma subblocks in the set (S);

deriving a chroma motion vector for a chroma subblock mvCLX[xSbIdx][ySbIdx] of the chroma block based on the averaged luma motion vector mvAvgLX;
wherein a process of deriving the chroma motion vector is invoked as follows with the mvAvgLX as input, and the chroma motion vector mvCLX[xSbIdx][ySbIdx] as output:

mvCLX[0]=mvLX[0]*2/SubWidth$C$ mvCLX[1]=mvLX[1]*2/SubHeight$C$, if a reference picture corresponding to refIdxLX for the image block is not a current picture; or mvCLX[0]=((mvLX[0]>>(3+SubWidth$C$))*32 mvCLX[1]=((mvLX[1]>>(3+SubHeight$C$))*32, if the reference picture corresponding to the refIdxLX for the image block is the current picture, wherein mvLX[0] corresponds to a horizontal component of the mvAvgLX, and mvLX[1] corresponds to a vertical component of the mvAvgLX,
wherein when both SubWidthC and SubHeightC are equal to 1, the set of luma subblocks (S) is a luma subblock indexed by $S_0$=(xSbIdx, ySbIdx);

when at least one of SubWidthC and SubHeightC is not equal to 1, the set of luma subblocks (S) is: a first luma subblock indexed by $S_0=$ $$((xSbIdx >> (SubWidthC-1) << (SubWidthC-1)),$$

$$(ySbIdx >> (SubHeightC-1) << (SubHeightC-1))), \text{ and}$$
a second luma subblock indexed by $$S_1 = ((xSbIdx >> (SubWidthC-1) << (SubWidthC-1)) + (SubWidthC-1), (ySbIdx >> (SubHeightC-1) << (SubHeightC-1)) + (SubHeightC-1))$$

wherein SubWidthC and SubHeightC represent the chroma scaling factors in horizontal and vertical directions, respectively;

xSbIdx and ySbIdx represent a subblock index in the horizontal direction and a subblock index in the vertical direction, respectively, for a luma subblock in the set (S);

"<<" represents a left arithmetic shift;

">>" represents a right arithmetic shift;

xSbIdx is an integer number ranging from 0 to numSbX−1 and ySbIdx is an integer ranging from 0 to numSbY−1;

numSbX indicates the number of luma subblocks in the luma block along the horizontal direction; and numSbY indicates the number of luma subblocks in the luma block along the vertical direction.

\* \* \* \* \*